US009309669B2

(12) United States Patent
Duran Ariza

(10) Patent No.: US 9,309,669 B2
(45) Date of Patent: Apr. 12, 2016

(54) ACOUSTIC PANEL, PARTITION, AND SYSTEM

(71) Applicant: Gonzalo Duran Ariza, Rockville, MD (US)

(72) Inventor: Gonzalo Duran Ariza, Rockville, MD (US)

( * ) Notice: Subject to any disclaimer, the term of this patent is extended or adjusted under 35 U.S.C. 154(b) by 171 days.

(21) Appl. No.: 13/684,151

(22) Filed: Nov. 21, 2012

(65) Prior Publication Data

US 2014/0137495 A1    May 22, 2014
US 2015/0345131 A9    Dec. 3, 2015

Related U.S. Application Data

(60) Provisional application No. 61/673,325, filed on Jul. 19, 2012.

(51) Int. Cl.
    *E04B 2/74*      (2006.01)
    *E04B 2/82*      (2006.01)

(52) U.S. Cl.
    CPC .............. *E04B 2/7403* (2013.01); *E04B 2/7425* (2013.01); *E04B 2/827* (2013.01); *E04B 2/828* (2013.01); *E04B 2/7409* (2013.01)

(58) Field of Classification Search
    CPC ....... E04B 1/74; E04B 1/8209; E04B 1/8263; E04B 1/84; E04B 2/827; E04B 8/828; E04B 2/7403; E04B 2/7409; E04B 2/7425; E04B 2001/8452; E05Y 2900/142; E06B 5/20; E06B 7/16; E06B 7/2316
    USPC .................. 52/238.1, 243.1, 144, 145, 126.3; 160/40, 196.1; 181/287
    See application file for complete search history.

(56) References Cited

U.S. PATENT DOCUMENTS

| 3,072,975 | A | * | 1/1963 | Burmeister | 49/317 |
| 3,161,229 | A | * | 12/1964 | Sanders | 160/40 |
| 3,253,552 | A | * | 5/1966 | Stein | 104/94 |
| 3,295,257 | A | * | 1/1967 | Douglass | 49/317 |
| 3,374,821 | A | * | 3/1968 | White | 160/40 |

(Continued)

FOREIGN PATENT DOCUMENTS

| CN | 201635216 U | 11/2010 |
| CO | 11 035.695 | 11/2011 |

(Continued)

OTHER PUBLICATIONS

Colombian Office Action from (unconnected) Colombian Office Action 11035.695 dated Mar. 21, 2013. Please see accompanying letter.

*Primary Examiner* — Robert Canfield

(57) ABSTRACT

The invention(s) disclosed herein include various panels, components of panels, partitions, systems, and/or methods that increase acoustic insulation by mitigating sound (e.g., before it enters an area and/or a room). For example, some embodiments include a movable partition that is comprised of a plurality of panels that each hang from the ceiling, where the interface between two partitioned panels includes various gaskets, damping elements, and perforations that mitigate sound transmission from one side of the partition to the other. Other features of the partition (and panels that make up the partition) include upper and lower drops seals that in some embodiments have a labyrinth-like design and thus mitigate the flow of air between the partition and the ceiling/floor. Also, a membrane positioned inside the panel is disclosed that is especially effective at mitigating low frequency sound, for example.

33 Claims, 29 Drawing Sheets

(56) References Cited

U.S. PATENT DOCUMENTS

| | | | | |
|---|---|---|---|---|
| 3,755,968 | A | * | 9/1973 | Williams .................... 49/489.1 |
| 3,871,133 | A | * | 3/1975 | Ellingson, Jr. ................ 49/308 |
| 3,972,167 | A | * | 8/1976 | Vogeli ........................ 52/481.2 |
| 4,045,913 | A | * | 9/1977 | Wright ........................... 49/307 |
| 4,103,463 | A | * | 8/1978 | Dixon ......................... 52/126.4 |
| 4,277,920 | A | * | 7/1981 | Dixon ............................. 52/64 |
| 4,535,578 | A | * | 8/1985 | Gerken ........................ 52/243.1 |
| 5,467,559 | A | * | 11/1995 | Owens ........................... 49/321 |
| 5,471,791 | A | * | 12/1995 | Keller ............................ 49/317 |
| 5,551,499 | A | * | 9/1996 | McRoberts .................... 160/40 |
| 5,603,192 | A | * | 2/1997 | Dickson ...................... 52/238.1 |
| 6,112,466 | A | * | 9/2000 | Smith et al. .................... 49/306 |
| 7,861,474 | B2 | * | 1/2011 | Houle et al. .................... 52/242 |
| 8,033,068 | B2 | * | 10/2011 | Luttmann et al. ............ 52/243.1 |
| 8,091,301 | B2 | * | 1/2012 | Van Klaveren .............. 52/243.1 |
| 8,511,015 | B2 | * | 8/2013 | Behrens ........................ 52/238.1 |
| 2014/0059933 | A1 | * | 3/2014 | Jones et al. ..................... 49/316 |

FOREIGN PATENT DOCUMENTS

| | | | | | |
|---|---|---|---|---|---|
| GB | 1494854 | A | * | 12/1977 | |
| GB | 2032507 | A | | 8/1980 | |
| JP | 06057835 | A | * | 3/1994 | ............... E04B 1/82 |
| JP | 2001049968 | A | * | 2/2001 | ............... E06B 7/18 |

* cited by examiner

ACOUSTIC PANEL, PARTITION, AND SYSTEM

CROSS-REFERENCE TO RELATED APPLICATIONS

The present application claims the benefit of U.S. Provisional Patent Application No. 61/673,325, filed Jul. 19, 2012 on behalf of the present inventor, the entire contents of which are incorporated herein by reference.

TECHNICAL FIELD

One or more embodiments of the invention(s) described herein relate to the field of acoustics and, more specifically, architectural acoustics. Even more particularly, one or more embodiments of the invention(s) involve an acoustic panel, while others involve a partition of a plurality of acoustic panels. While the embodiments described herein typically relate to movable acoustic panels and partitions, i.e., panels and partitions that are movable as part of a movable panel system and/or a movable partition system, a number of the aspects/components of these that are discussed herein also are applicable to non-movable acoustic panels and partitions. Accordingly, various panels, components of panels, partitions, systems, and/or methods that increase acoustic insulation by mitigating sound (e.g., before it enters an area and/or a room) are discussed herein, among others.

BACKGROUND OF THE INVENTION

There are few things more frustrating than being disturbed by unwanted sound, more commonly referred to as noise. For instance, employees gathered in a room/area to conduct a meeting generally do not want to hear conversations, music, etc., from an adjacent room/area—which is true regardless of whether the two rooms/areas are separated by a wall or a partition of panels. With respect to the latter, it is therefore desirable that the partition, and/or each panel of the partition, mitigate sound from the adjacent area/room as much as possible before it enters the partitioned room/area (as noise).

As is commonly known, air and vibration are two of the main ways that sound is typically transmitted from one side of a partition (i.e., from a first area/room) to the other (i.e., to a second area/room). In terms of air, there are three locations that are particularly important to seal as best as possible: the interfaces respectively between each of the partition's panels, the interface between each panel (and/or the partition as a whole) and the ceiling (and/or an interface associated with the ceiling, such as those that interface with wheels connected to one or more panels), and the interface between each panel (and/or the partition as a whole) and the floor. In fact, prior art partitions typically include some methods/components for limiting air flow in one or more of these areas; however, they are not very effective.

For example, because a panel-floor gap is necessary to prevent ceiling-hung panels from dragging on the floor when they are being repositioned, some prior art panels include a drop seal to mitigate the flow of air between the panel and floor (i.e., the panel-floor interface) once the panel has been repositioned. The problem is that as the prior art drop seal 420 (e.g., depicted in FIG. 12 interfacing with a prior art panel 410) is extended to the floor, a passageway/channel 414 is simultaneously opened—which enables air, and thus sound, to pass relatively freely between the panel body 405 and the drop seal 420. In essence, prior art drop seals tend to create a new problem (i.e., creating or enlarging a gap/channel between the drop seal and the panel body) by attempting to solve the original one (i.e., minimizing the gap between the panel and the floor). It is also important to bear in mind that whatever amount of air/sound that is flowing between the drop seal and the panel body, i.e., with respect to a drop seal that is adjacent to the floor, that amount is effectively doubled by the addition of a drop seal adjacent to the ceiling, which is quite common.

On the other hand, one of the reasons that vibration can be so problematic is that panel frames are typically constructed out of materials that transmit it well, such as sheet steel or aluminum. Accordingly, when sound from one area/room encounters one side/face of the panel/partition, it produces a vibration, which is transmitted through the (e.g., sheet steel or aluminum) frame of the panel/partition to the other side/face of the panel/partition to another area/room.

Finally, an additional way in which sound/noise is often transmitted from one side of a panel to the other is through the panel's non-interface/body region. Despite the fact that exteriors and interiors (i.e., non-frame portions) of acoustic panels are often comprised of various sound insulating materials—such as drywall, laminates, wood agglomerates, polyurethane, polystyrene, glass, mineral fibers, acoustic blankets, or a mixture of two or more of these, among other materials known to those skilled in the art—many prior art panels still typically do not sufficiently/significantly mitigate sound of certain frequencies, such as low octave bands in the audible spectrum (e.g., 125 Hz, 63 Hz and 31.5 Hz), from substantially passing from one side of the panel and/or partition to the other.

SUMMARY OF THE INVENTION

It is an object of the invention to solve one or more of the above-mentioned problems/issues. Accordingly, among others, the invention(s) disclosed herein relate to various panels, components of panels, partitions, systems, and/or methods that increase acoustic insulation by mitigating sound. While many of the embodiments disclosed relate to movable panels/partitions, some aspects of the invention(s) disclosed need not be limited to movable embodiments.

For example, various gaskets are disclosed that mitigate the flow of air/sound through two panels in a partition. Also, a drop seal design is disclosed that minimizes air/sound that may otherwise flow (e.g., via prior art drop seals) from one side of a panel/partition to the other. Various damping components are also discussed that mitigate vibration through a panel/partition. A membrane is also disclosed that also absorbs sound. Perforated members of panels are also discussed, which allow sound to flow out of a passage between two panels, where at least some of the sound is absorbed by insulation after it flows out of the passage.

BRIEF DESCRIPTION OF THE DRAWINGS

FIGS. 7B and 7C show cross-sectional views similar to that of FIG. 7A and FIG. 8, but instead depict portions of an alternative embodiment of the acoustic panel, where the alternative acoustic panel is similar to the acoustic panel shown in FIG. 1B but includes the damping systems shown in FIG. 7B and FIG. 7C rather than the damping system of FIG. 7A;

DETAILED DESCRIPTION OF THE INVENTION

Figure 1A:
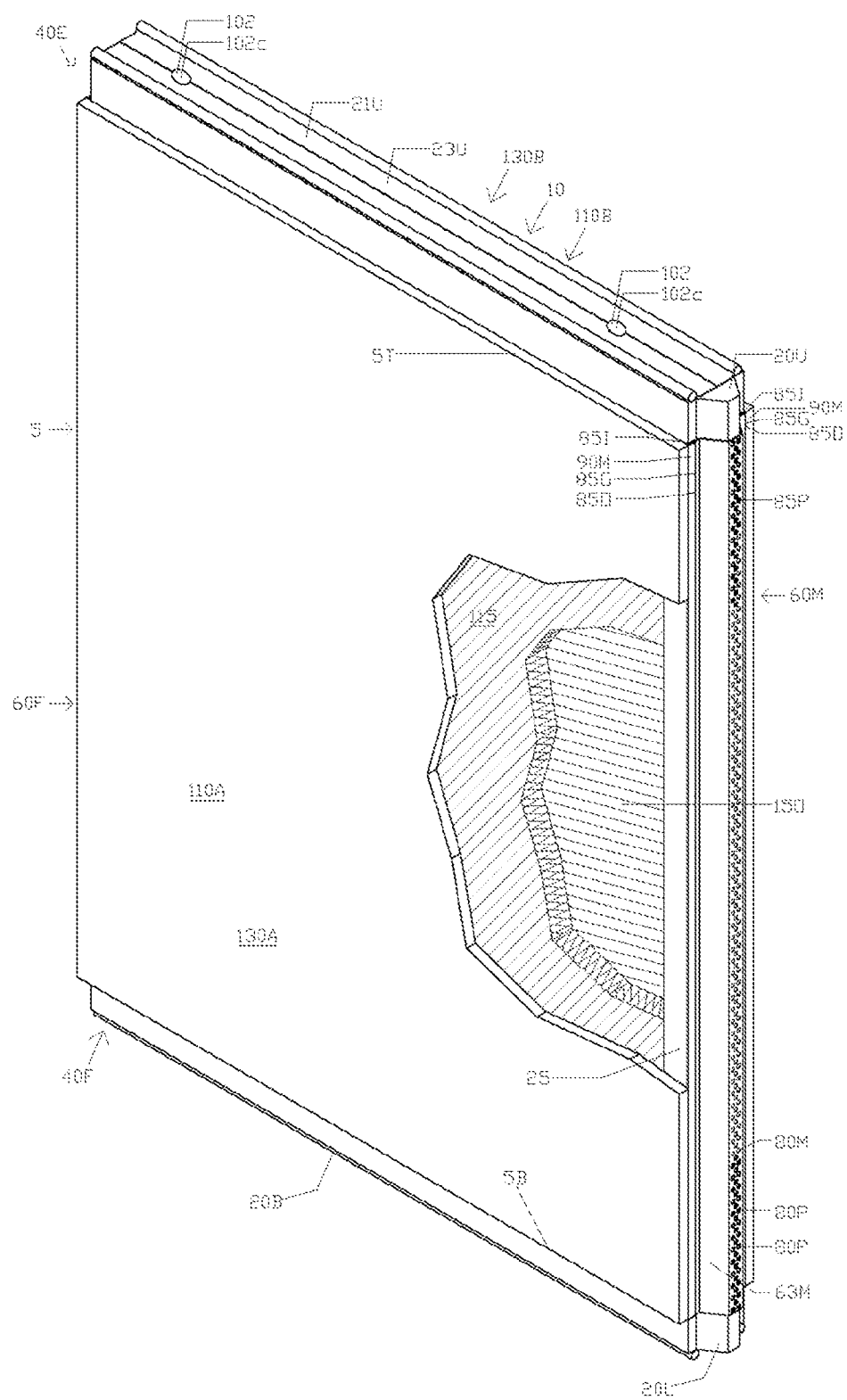
FIG. 1A is a front perspective view of an embodiment of the acoustic panel, where each of the two drop seals is depicted in an extended position and where each of the first (i.e., male) and second (i.e., female) ends includes a perforated section.
Figure 2:
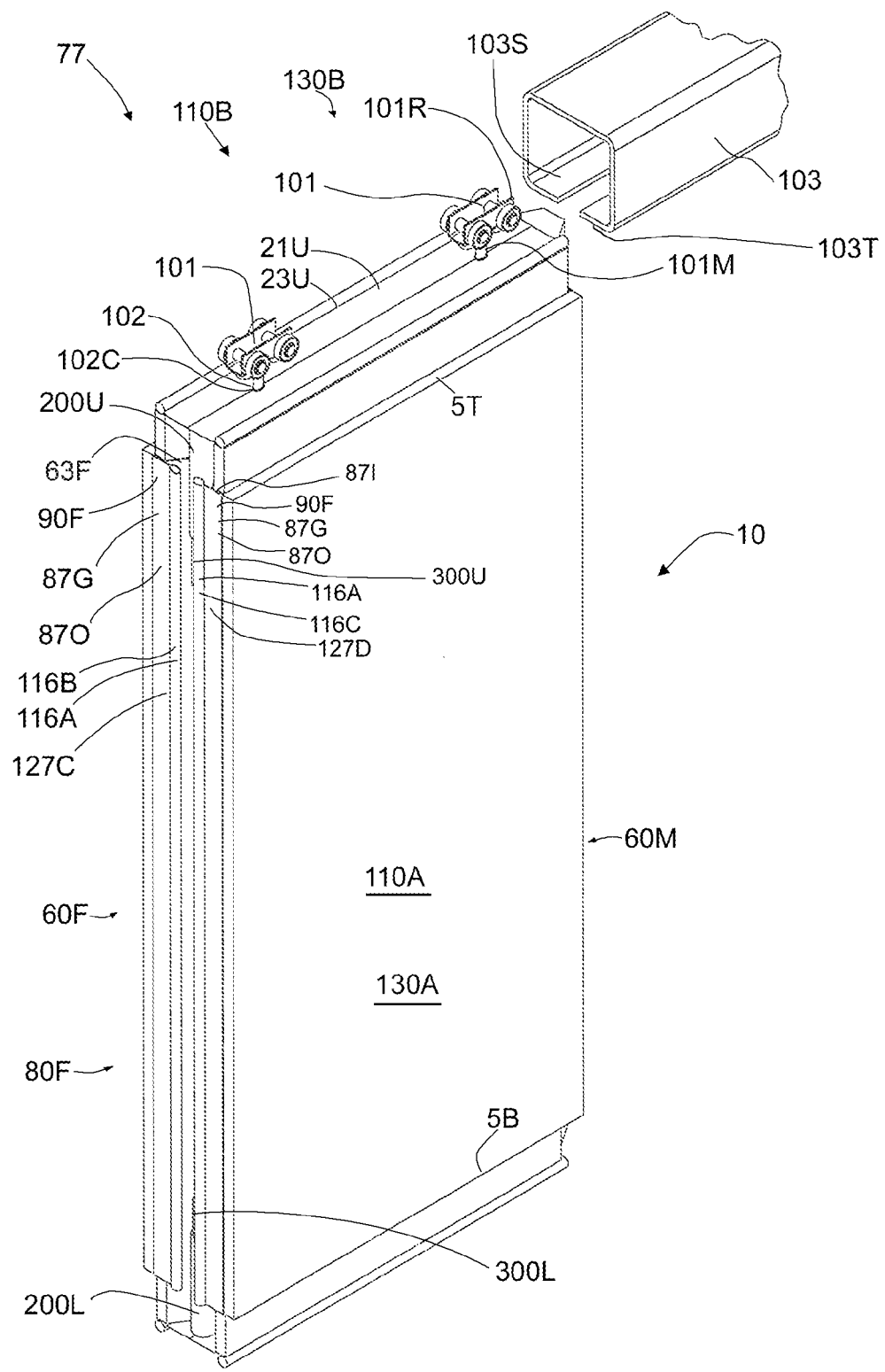
FIG. 2 is a rear perspective view of the embodiment of the acoustic panel depicted in FIG. 1A.

FIGS. 1A and 2 depict an embodiment of an acoustic panel 10 that includes a body portion 5 as well as an upper drop seal 20U and a lower drop seal 20L, which are each extendable and retractable with respect to the body portion 5. As is further evident from FIGS. 1A and 2, each of the two drop seals 20U, 20L are shown in their respective extended positions 40E, 40F (and their retracted positions 40R, 40S are shown in other figures). As will be discussed later, the design of each of the drop seals 20U, 20L is not only different from prior art drop seals but achieves various advantages relative to them. (Other panel embodiments only include one drop seal, i.e., the upper drop seal 20U or the lower drop seal 20L, but not both.)

In some but not all embodiments, the acoustic panel 10 hangs relative to a ceiling, or other comparable surface, and is moveable (relative to the ceiling or other surface) via one or more panel-ceiling connectors 101, such as the two shown in FIG. 2. (Though two are shown in FIG. 2, in other embodiments, there is only one panel-ceiling connector 101.) As can be seen, the panel-ceiling connector 101 includes a member 101M and one or more wheels 101R—which interface(s) with a panel-ceiling connector interface 103, such the one shown in FIG. 2 that includes a wheel-receiving surface 103S. Those skilled in the art will further readily recognize that various alternative panel-ceiling/surface connectors and panel-ceiling connector interfaces are possible in alternative embodiments; thus, neither the member 101M and the (one or more) wheels 101R, nor the surface 103S, are meant to be limiting in any way in this regard.

Before going into more detail, it should be noted that FIGS. 1A and 2 depict identical panels 10. More specifically, the only difference between these two figures (aside from the fact that one depicts a front perspective view and the other depicts a rear perspective view) is that FIG. 2 also depicts a movable panel system 77 (which is discussed below). In other words, FIG. 2 essentially depicts the panel-ceiling connector 101 interfaced with/attached to the panel 10 via a panel-connector interface 102, wherein the panel-connector interface 102 in the FIG. 2 embodiment is a cavity 102C. Those skilled in the art will appreciate that various types of alternative panel-connector interfaces and/or guiding cavities are possible in various alternative embodiments of the invention. This same group will also appreciate that while the panel-connector interface/guiding cavity 102/102C is often included in the manufacturing process, it can be added later (e.g., prior to and/or during installation of the panel) and, thus, there are alternative embodiments of the panel without the panel-connector interface 102 (e.g., the guiding cavity 102C).

Figure 1B:
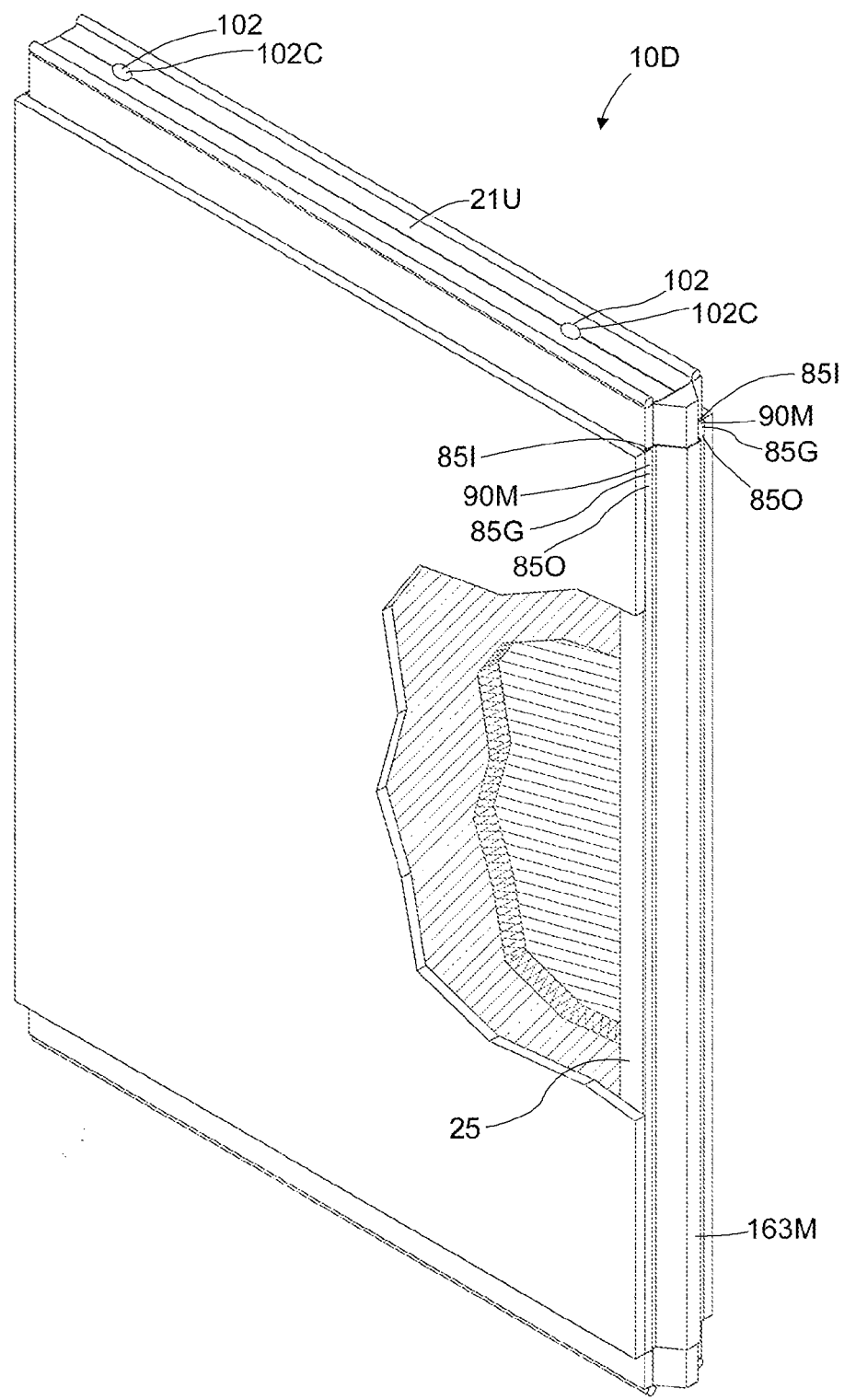
FIG. 1B is a front perspective view of an embodiment of the acoustic panel, which is identical to the embodiment depicted in FIG. 1A, except that neither the first/male nor second/female ends includes a perforated section.

Accordingly, the movable acoustic panel system 77 includes (a) at least one panel 10 (or 10D for the non-perforated panel system 77D depicted in FIG. 3C), (b) the panel-ceiling connector 101, and (c) the panel-ceiling (or surface) connector interface 103 for the panel-ceiling connector 101. It thus should be understood that the panel-ceiling connector 101 and the panel-ceiling/surface connector interface 103 are implied in FIGS. 3A, 3B, 3C, and 3D (where any of these are not explicitly shown) since all four of these figures depict one or more panels hung from the ceiling (or other appropriate surface) as part of the movable acoustic panel system 77. In embodiments that satisfy (a), (b) and (c), the system is sometimes referred to herein as a movable acoustic partition system 77P when two of the panels are included and have been positioned as a partition, which is defined below (e.g., FIGS. 3B and 3C show both the movable acoustic panel system 77 and the movable acoustic partition system 77P). With respect to the movable acoustic partition system 77P, the two or more panels in the partition are two of the (perforated) panels 10, two of the (non-perforated) panels 10D (e.g., as depicted in FIG. 1B), or one of each.

Having made that clear, it should be noted that an alternative panel is identical to the panel 10 (or the non-perforated version of panel 10, namely panel 10D) but includes the panel-ceiling connector 101. Similarly, an alternative movable acoustic panel system includes (a) the alternative panel just described (i.e., that is identical to the panel 10 (or 10D) but includes the panel-ceiling connector 101) and (b) the panel-ceiling connector interface 103. And, an alternative movable acoustic partition system is identical to the movable acoustic panel system just described, but includes at least two panels position as a partition.

Returning to the drop seals 20U, 20L, the upper drop seal 20U is extendable and extends to the extended position 40E, which in some embodiments is any distance away from the retracted position that does not exceed the length of the drop seal members 555, 557 (which are discussed below with reference to the lower drop seal 20L but are essentially identical with respect to the upper drop seal 20U). In some but not all embodiments, the upper drop seal is designed with respect to the dimensions of the panel body 5 so that it can extend up to (and touch) a ceiling 103C for which it is intended or up to a surface 103T associated with the panel-ceiling connector interface 103, depending on how the panel-ceiling connector interface 103 is connected to the ceiling (as will be readily understood by those skilled in the art). In any event, it will be readily understood that the distance between the upper surface 21U of the upper drop seal 20U and the surface/ceiling will decrease when it moved to its extended position 40E from its retracted position 40S (not shown in FIGS. 1A and 2 but shown in other figures). Similarly, the lower drop seal 20L is extendable (and extends) to touch/interface with a second surface, such as a floor 103F (not shown in FIG. 1A or 2, but shown in other figures).

As further seen from FIGS. 1A and 2, a first end 60M (that is often referred to as the male end) of the panel 10 includes a first member 63M (that is often referred to as the male member), which has a male shape in this embodiment, though it has other shapes in alternative embodiments. Similarly, a second end 60F (that is often referred to as the female end) of the panel 10 includes a second member 63F (that is often referred to as the female member), which has a female shape (which perhaps can be better appreciated in other figures discussed herein) in this embodiment, though it has other shapes in alternative embodiments. Generally speaking, the respective male and female shapes of the male and female members 63M, 63F facilitate the formation of an interface 199 (or 199D with respect to an interface of two perforated panels 10D) between the male end 60M of a first panel 10A and the female end 63F of a second panel 10B (as depicted in FIG. 3B, where each of the two panels 10A, 10B is identical to the panel 10 depicted in FIGS. 1A and 2). As mentioned above, in other embodiments, the members 63M, 63F and/or first and second ends 60M, 60F will take on other shapes. And, as those skilled in the art will appreciate, innumerable alternative shapes are possible. As one example, a first end and/or member can have both a male/tongue and a female/groove shape, and the second end and/or member can have a female/groove shape and male/tongue shape, which more-or-less would match up/able to mate with the shape of the first end and/or member.

In this regard, it should be emphasized that the shape of the member (e.g. male 63M or female 63F) is distinguishable from the same as the shape of the end (e.g., 60M, 60F) of which the member is included. For instance, in some but not all embodiments, the first/male end 60M includes the first/male member 63M, the male damping element 90M, the male outer gasket 85G (which, as explained below, in some but not all embodiments also functions as the male outer damping element portion 85O; and, thus it is the exact same component in some embodiments) and the male inner damping element portion 85I. In turn, in some but not all embodiments, the female end 60F includes the female member 63F, female damping element 90F, the female outer gasket 87G (which, as explained below, in some embodiments can also function as the female outer damping element portion 87O; and, thus it is the exact same component in some embodiments), the female inner damping element portion 87I, the upper and lower gaskets 200U, 200L, the inner gasket 116A (which includes two tubes 116B, 166C), and two connecting elements 127C, 127D. Also, an upper window 300U for the upper gasket 200U and a lower window 300L for the lower gasket 200L are also depicted in FIG. 2 relative to the second/female end 60F.

Also, though this will be discussed in more detail below, in this document the word 'partition' is meant to refer to at least two panels—such as, for (a non-limiting) example, two panels like the acoustic panel 10 (or 10D)—that have formed an interface. In turn, the word 'interface' is meant to describe a relationship where at least the first end (e.g., male end) of a first panel is touching the second end (e.g., female end) of a second panel. In some embodiments, like the ones depicted in FIGS. 3B and 3C, 'interface' also implies that some amount of force is (or was) associated with respect to the touching ends of the two panels, though some other embodiments do not require the touching to further include such force. In some embodiments, the force required to move/position the panels together to form a partition is a human force, a mechanical force, an electromechanical force, a magnetic force, or combination of these forces, or any other force known to those skilled in the art. It is thus important to point out that while the male end 60M of a first panel and the female end 60F of a second panel touch in the formation of an interface, this does not necessarily mean that the male and female members 63M, 63F touch in the formation of the interface. Further, in some of these embodiments, like the partitions 169, 169D depicted in FIG. 3B and FIG. 3C respectively, one or more components (e.g., which are listed above) associated with at least one of the two interfaced ends (e.g., end 60M of the first panel 10A and end 60F of the second panel 10B) is/are at least partially compressed. While the respective interfaced male and female members 63M, 63F of the two panels do not touch in the FIG. 3B partition (or the FIG. 3C partition), members 63M, 63F do at least partially touch in some alternative embodiments— e.g., in some alternative embodiments that do not include the damping elements 90F, 90M.

Moreover, in various portions of this document, the word 'passage' will be used to refer to the space, with respect to a partition 169 depicted in FIG. 3B, between the male member 63M of the first interfaced panel 10A (or panel 10E, with respect to the non-perforated partition 169D, where panel 10E is identical to the panel 10D depicted in FIG. 1B) and female member 63F of the second interfaced panel 10B (or panel 10F, with respect to the non-perforated partition 169D, where panel 10F is identical to the panel 10D depicted in FIG. 1B). Similarly, the space between interfaced/mated and extended upper drop seals will be referred to as an 'upper passage', and the space between interfaced/mated and extended lower drop seals will be referred to as a 'lower passage.' As will become clearer below, one of the objectives of some aspects of the invention(s) described herein is to seal, or at least partially block, at least one of: the passage 99, the upper passage 99U, and the lower passage 99L. In other embodiments, two of these are accomplished; and in yet additional embodiments, such as those depicted in each of FIGS. 3B and 3C, all three are accomplished.

Figure 10A:
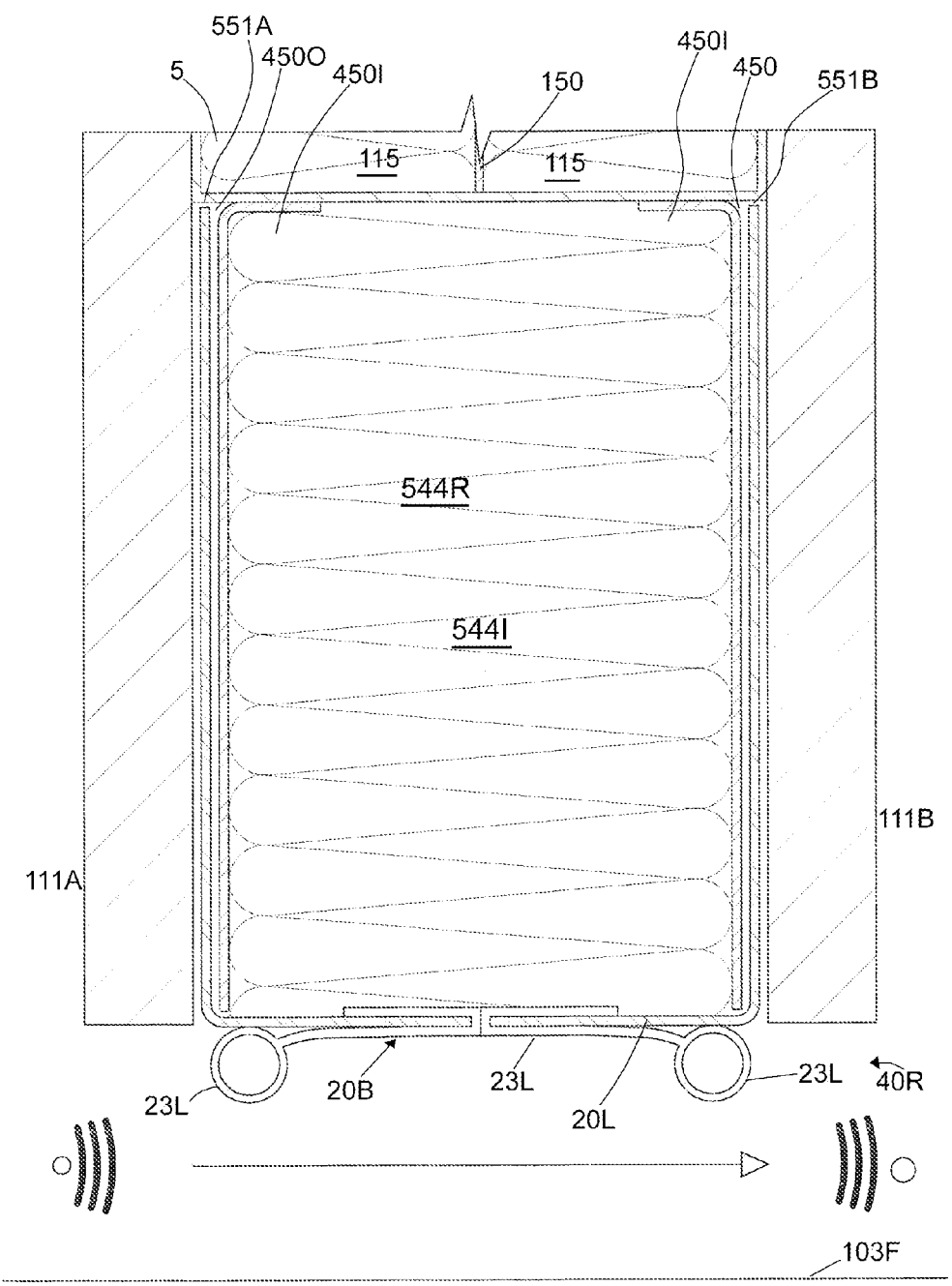
FIG. 10A is a cross-sectional view taken along axis 10A-10A' of FIG. 3D, which depicts the drop seal in its retracted position.
Figure 10B:
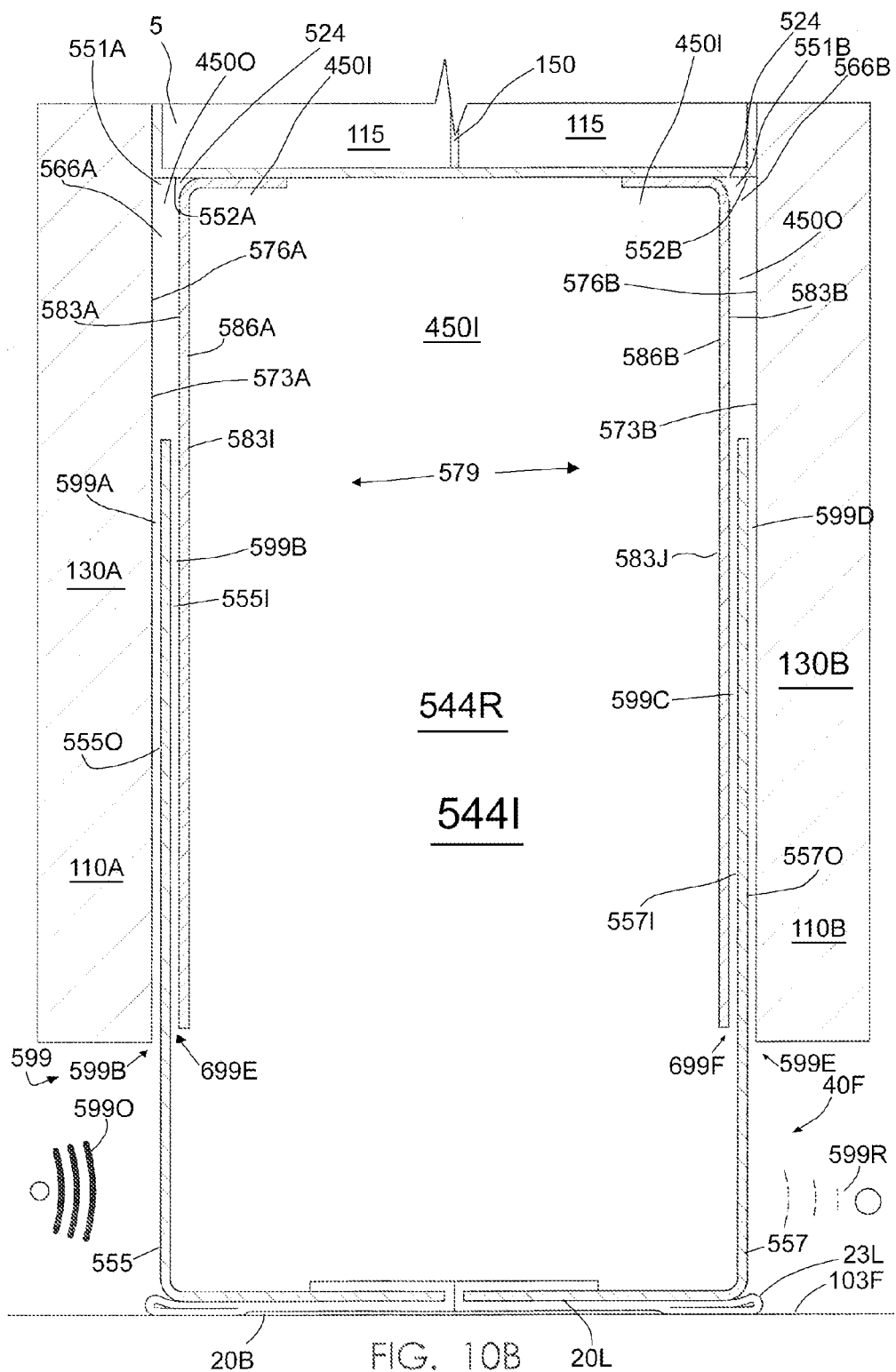
FIG. 10B is a cross-sectional view taken along axis 10B-10B' of FIG. 3A, which, among things, depicts the drop seal in an extended position against the floor and also depicts the mitigation of sound from one side of the panel/drop seal to the other.
Figure 11:
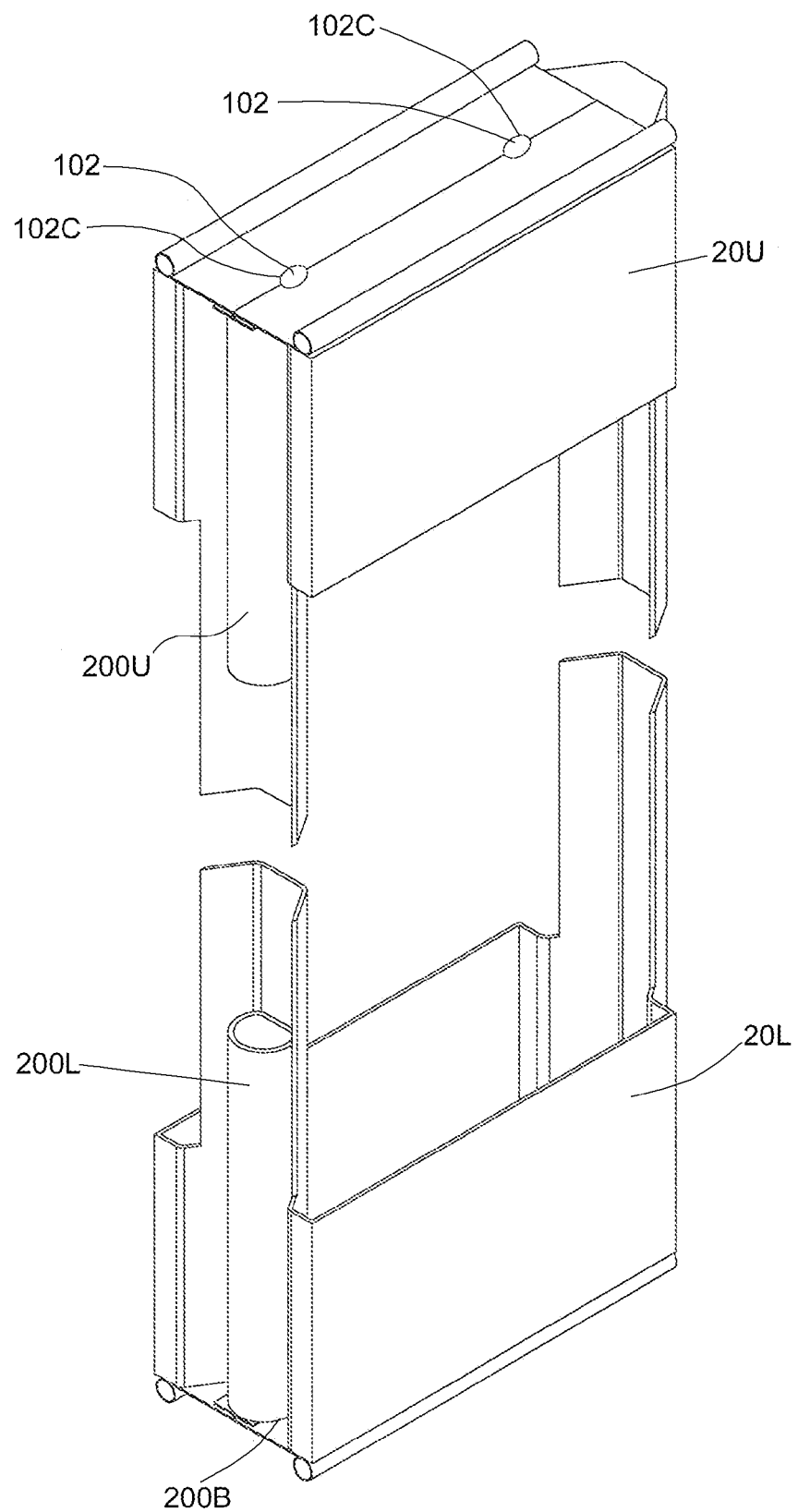
FIG. 11 is perspective view of the upper and lower drop seals.
Figure 15A:
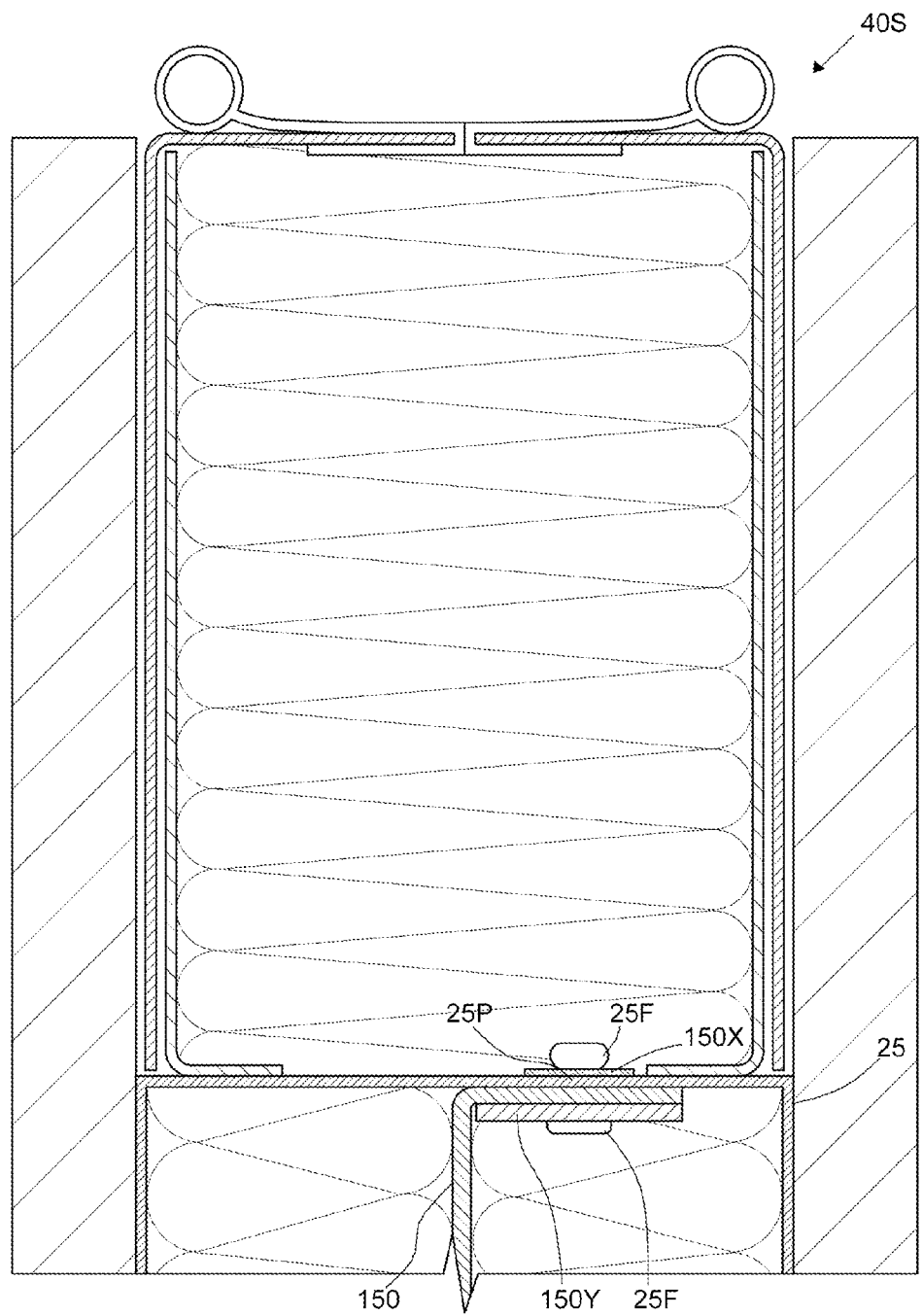
FIG. 15A is a cross-sectional view taken along axis 15A-15A' of FIG. 3D, which, among other things, depicts how the membrane is attached to the frame in some embodiments; and, FIG. 15B is perspective view of the frame and the membrane of the each of the panels depicted in FIGS. 1A and 1B.
Figure 15B:
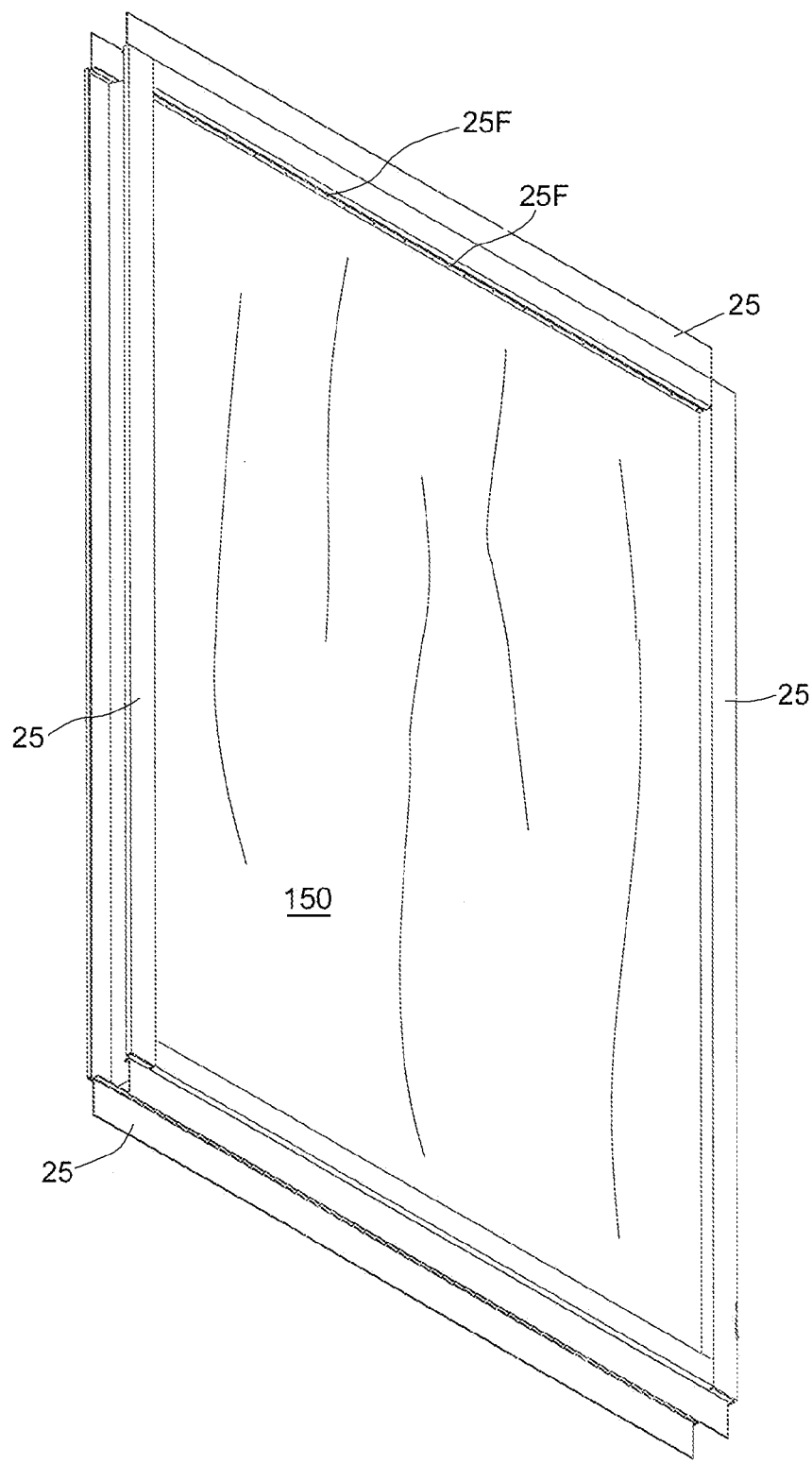

Returning again to the panel 10 shown in FIGS. 1A and 2, the frame 25 (e.g., as is also depicted in FIG. 15B) of the panel is made of metal, though those skilled in the art will readily understand that other materials sufficient to provide necessary structural integrity also could be used. Also, while the drop seals 20U, 20L (e.g., as depicted in FIGS. 10A and 10B) and the male and female members 63M, 63F are also made of metal, other materials are used in alternative embodiments. In other embodiments, one or both of the members 63M, 63F are considered part of the frame. In yet additional embodiments, one or both of the drop seals 20L, 20U are considered part of the frame.

In the panel 10 embodiment depicted in FIGS. 1A and 2, the male and female members 63M, 63F also each include a respective perforated portion 80M, 80F. As will be discussed later, each of the perforated portions 80M, 80F serve to mitigate sound (traveling by air) that enters the passage 99 (which is defined above and indicated with respect to various figures below) between the two panels 10A, 10B (which are each essentially identical to the panel 10) in the partition 169 (as shown in FIG. 3B). However, this is not the case in other embodiments. For instance, the panel 10D depicted in FIG. 1B is identical to FIG. 1A, except that the male member 163M and female member 163F do not include the perforated portion 80M, 80F. (Thus, the rear view of the panel 10D will look exactly like the panel 10 depicted in FIG. 2, except that the female member of panel 10D is not perforated, but otherwise has the same general shape of the female member of FIG. 1A). Moreover, in other embodiments, only one of the male and female elements 80M, 80F includes such a perforated section.

With respect to FIG. 1A, an outer (or first) portion 85O of a damping element 90M (which also includes inner portion 87I) is visible with respect to the male end 60M (though these perhaps can be seen more clearly in other figures). Similarly, FIG. 2 depicts an outer (or first) portion 87O of a second damping element 90F (which also includes inner portion 87I) that is visible with respect to the female end 60F. Each of these will be discussed further later. As also will be explained later, the respective outer portions 85O, 87O of the damping elements 90M, 90F also each respectively function as outer gaskets 85G, 87G by at least partially sealing/blocking the passage 99 between interfaced panels (e.g., 10A and 10B of FIG. 3B). To be clear, reference numbers 85O and 85G are used to refer to the very same component because it functions both as a damping element (with respect to sound/vibration) and also functions as a gasket (with respect the flow of sound/air); though, it serves just one of these functions in alternative embodiments. The same is true with respect to the use of reference numbers 87O and 87G, i.e., to refer to the respective damping and sealing functions of the (counterpart) component on the female end 60F. In alternative embodiments, each of the outer gaskets 85G and 87G is one part (not two distinct parts). In yet additional embodiments, only the male element has an outer gasket; and, in further embodiments, only the female element has an outer gasket.

As can be seen from various figures included herein (e.g., FIG. 9C), it will be apparent that each of the outer damping portions (which are also referred to as elements herein) and the outer gaskets (85O, 87O and 85G, 87G respectively) include two distinct parts (which are a first male outer damping element part 85A and a second male outer damping element part 85B with respect to the male outer damping element 85O; a first female outer damping element part 87A and a second female outer damping element part 87B with respect to female outer damping element 87O; a first male outer gasket part 85X and a second male outer gasket part 85Y with respect to the male outer gasket 85G; and, a first female outer gasket part 87X and a second female outer gasket part 87Y with respect to the female outer gasket 87G) that are each respectively located on more-or-less opposite sides of the male and female members 63M, 63F. Moreover, the male and female damping elements 90M, 90F also respectively include a male inner damping (or 'sandwiched') portion 85I (which is also referred to as inner damping element herein) and female inner damping (or 'sandwiched') portion 87I (which is also referred to as inner damping element herein). As was the case for the outer damping elements 85O, 87O, each of the inner damping elements 85I, 87I includes two parts: a first male inner damping element part 85C and a second male inner damping element part 85D with respect to 85I; and, a first female inner damping element part 87C and a second female inner damping element part 87D with respect to 87I). As will be explained further later, each of the four outer/inner portion pairs of parts that make up the male and female damping elements 90M, 90F cooperate to mitigate vibration of the sandwiched frame component—e.g., the male and female elements 63M, 63F respectively. While an eight-part embodiment is described herein, it should be noted that other embodiments only include the male or the female (not both) damping elements, additional embodiments only include a male and female damping element at one (i.e., same) end of the passage 99, even further embodiments include one single male damping element, and yet additional embodiments include one single female damping element (where damping element is assumed to have an inner and outer portion that sandwiches the damped component, as explained herein).

Figure 8:
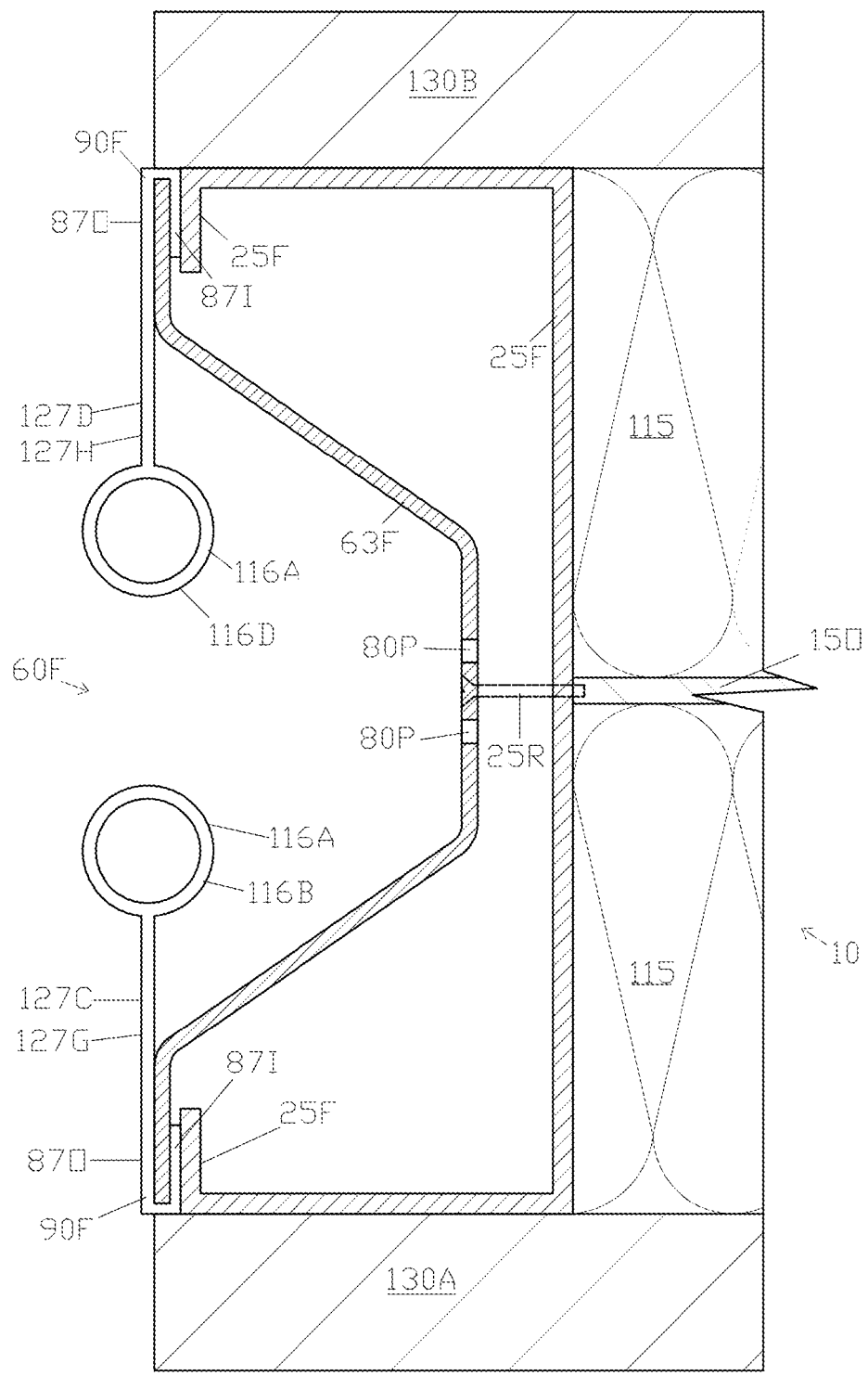
FIG. 8 is a cross-sectional view along 8-8' of FIG. 3A, which, among other things, shows an embodiment of the female end of the panel.

As will become apparent in discussions below, outer gaskets 85G and 87G are quite similar, except that the gasket 85G is on the male end 60M and the female gasket 87G is on the female end 60F and connected to another (i.e., a different type of gasket compared to outer gaskets 85G and 87G) gasket 116A—which are a pair of tubes 116B, 116C, as depicted in FIGS. 8 and 2—via connecting elements 127C, 127D. In many parts of this document the other gasket 116A is referred to as the 'inner' gasket since in some, but not all, embodiments it is positioned between what are commonly referred to herein as the 'outer' gaskets 85G, 87G when a partition of two panels is formed. However, in other embodiments, there is only an inner gasket 116A and no outer gaskets 85G, 87G; and in some additional embodiments, there are only outer gaskets 85G, 87G and no inner gasket 116A.

Figure 9A:
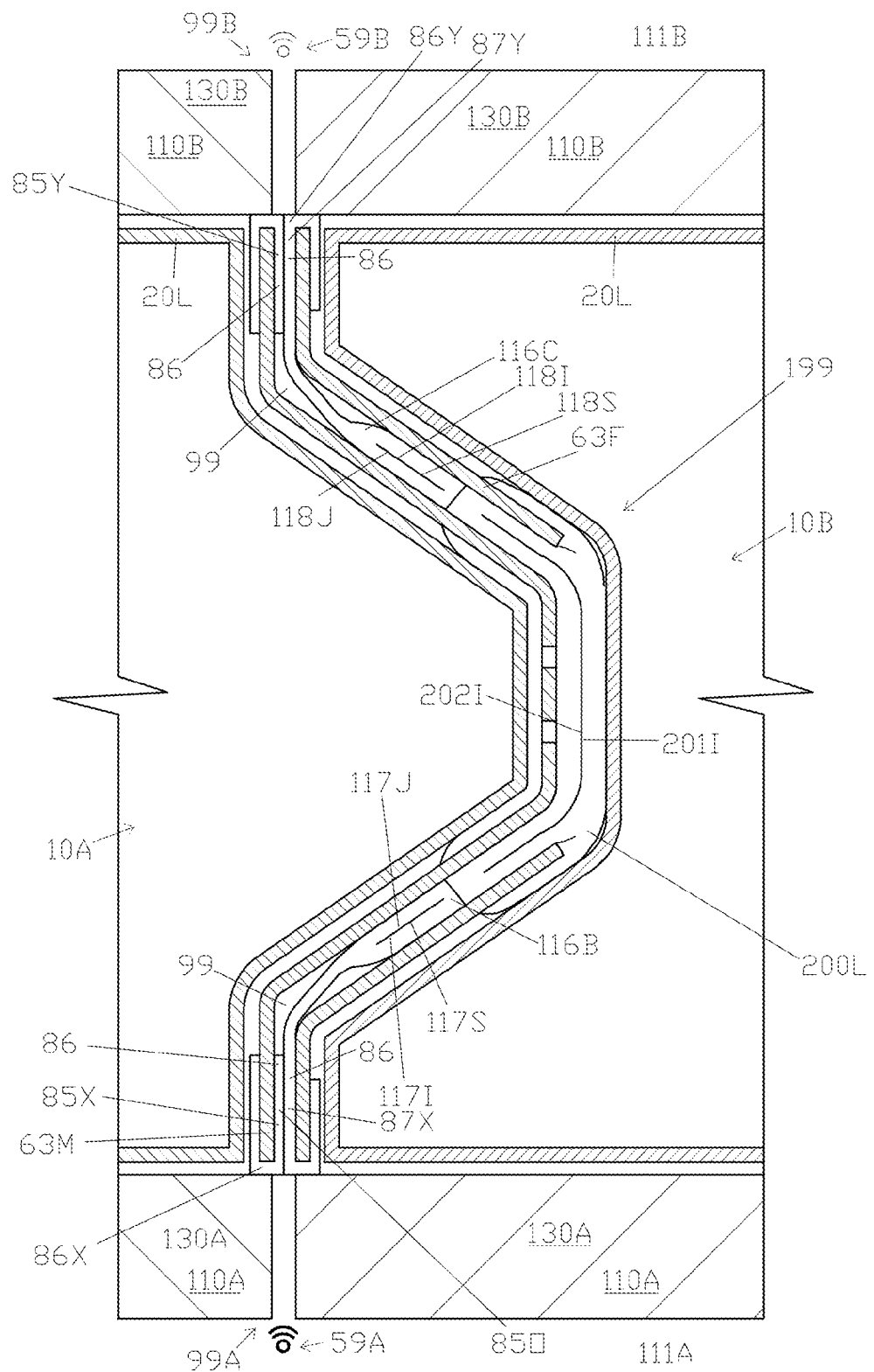
FIG. 9A is a cross-sectional view along 9A-9A' of FIG. 3B, which, among other things, shows the relationship of the two panels in the region of the lower gasket window.
Figure 9B:
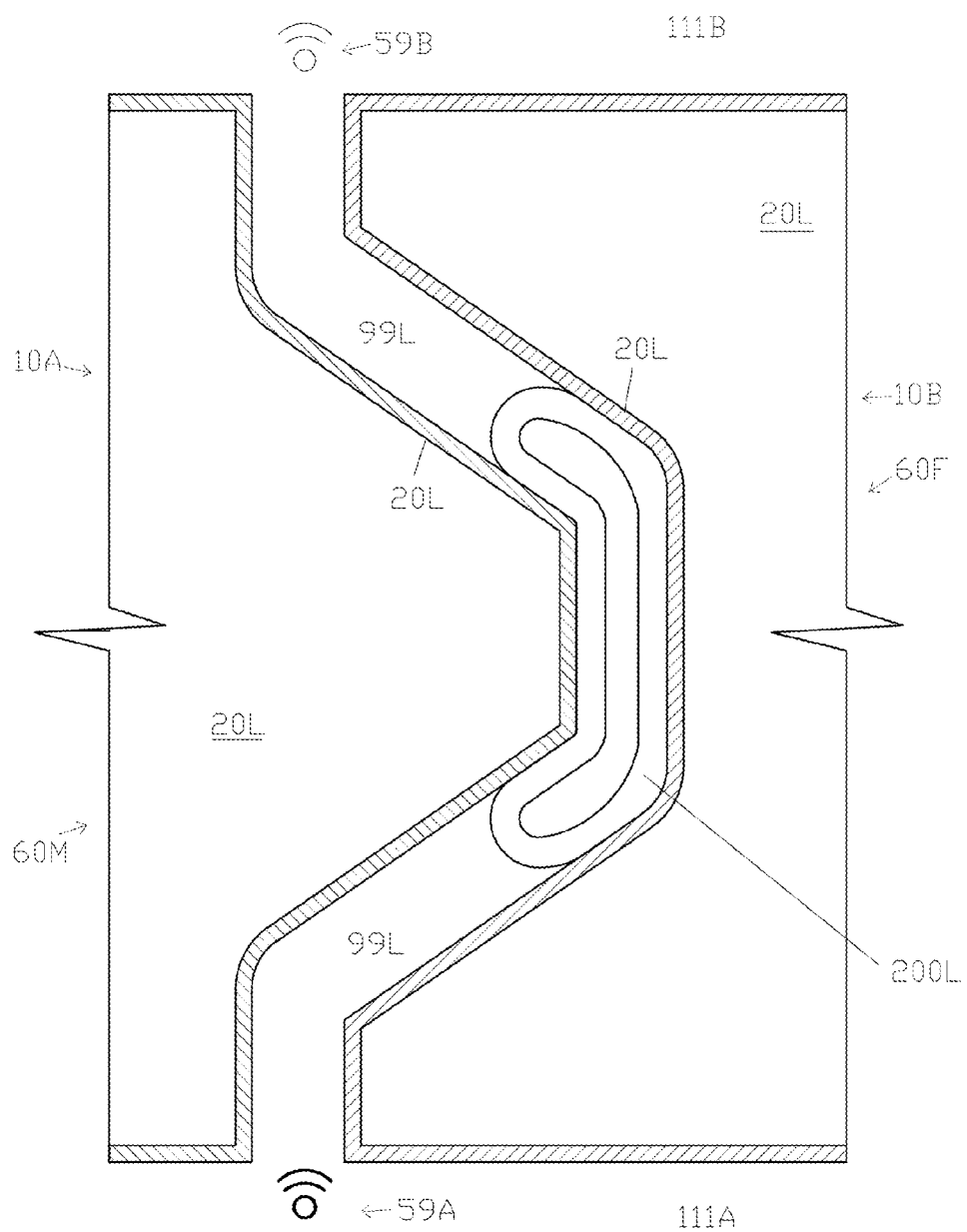
FIG. 9B is a cross-sectional view along 9B-9B' of FIG. 3B, which, among other things, shows the relationship of the two panels in the region of their respective lower drop seals.
Figure 9C:
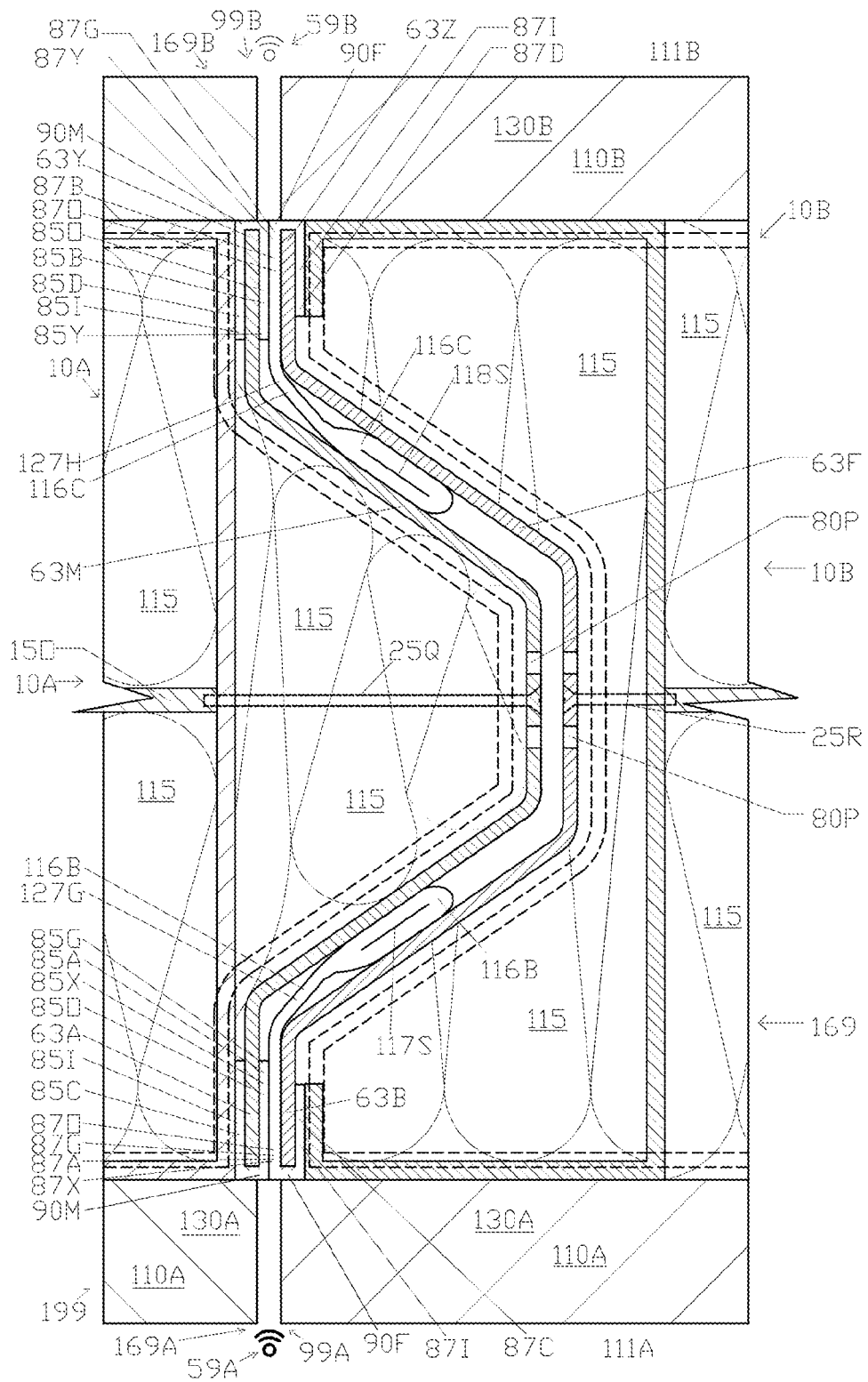
FIG. 9C is a cross-sectional view along 9C-9C' of FIG. 3B, which, among other things, shows the relationship of the two panels in the region between the upper gasket window and the lower gasket window.

In addition, in some embodiments, the connecting members 127C, 127D—which each respectively connects a portion (i.e., tubes 116B and 116C respectively) of the inner gasket 116A to a portion of the outer gasket (i.e., 87X and 87Y respectively)—serves as a connecting (i.e., a third type of) gasket 127G, 127H. Again, as above with respect to the outer gaskets and outer damping elements, each of these two components is also here being referred to with two reference numbers. That is, the first connecting member 127C is also being referred to as the first connecting gasket 127G since it not only connects the first female outer gasket 87X and first inner gasket 116B but, at least in some embodiments (like as shown in FIGS. 9A and 9C, e.g.) serves as an additional gasket (as explained below). Similarly, the second connecting member 127D is also being referred to as the second connecting gasket 127H since it not only connects the second female outer gasket 87Y and second inner gasket 116C but, at least in some embodiments (like as shown in FIGS. 9A and 9C, e.g.) serves as an additional gasket (as explained below). In terms of the two connecting members 127C, 127D functioning as the connecting gaskets 127G, 127H, this occurs in some (but not all) embodiments, at least partially due to the fact that the connecting members 127C, 127D are angled between the male and female members 63M, 63F of two panels (e.g., 10A, 10B) that have formed the partition 169 (e.g., of FIG. 3B) such that they at least partially block air/sound from flowing through a first end 99A of the passage 99 to a second end 99B of the passage 99—as well as vice versa in some embodiments—and thereby serve as the first and second connecting gaskets 127G, 127H (as well as the connecting members 127C, 127D). In other words, if the connecting members 127C, 127D were not angled here, they would not additionally serve as connecting gaskets 127G, 127H; rather, they would just serve as the connecting members 127C, 127D. However, other shapes for the connecting members 127C, 127D are used in alternative embodiments that do not require them to be angled with respect to male and female members 63M, 63F. In alternative embodiments, only one of the two connecting members 127C, 127D also functions as a connecting gasket; and, other embodiments only include one of the two connecting members 127C, 127D.

Further, (a fourth type of gasket referred to as) an upper gasket 200U and a lower gasket 200L are also shown in FIG. 2. As will be discussed in relation to various other figures below, the upper and lower gaskets 200U, 200L serve to limit the flow of air/sound between two partitioned panels (e.g., panels 10A and 10B; and, 10E and 10F, though only 10A and 10B are discussed below). As discussed further later, this is accomplished by at least one of the following: (1) limiting the flow of air between the male element 63M of the first panel 10A and the female element 63F of the second panel 10B, (2) limiting the flow of air between the male end 60M of the first panel's 10A lower drop seal 20L and female end 60F of the second panel's 10B lower drop seal 20L—which is also herein referred to as the lower passage 99L (or lower 'portion' of the passage 99)—and (3) limiting the flow of air between the male end 60M of the first panel's 10A upper drop seal 20U and female end 60F of the second panel's 10B upper drop seal 20U—which will also be referred to herein as the upper passage 99U (or upper 'portion' of the passage 99). In some embodiments, at least two of these occur; and, in other embodiments, all three occur, as is depicted in the embodiment of FIG. 9B and FIG. 9C, for example.

Additional gaskets (which reflect a fifth type of gasket) include an upper drop seal gasket 23U, which is positioned on top the upper drop seal 20U, and a lower drop seal gasket 23L which is positioned on the bottom of the lower drop seal 20L. As shown with respect to FIG. 10B below, the lower drop seal gasket 23L helps limit the flow of air between the bottom 20B of the lower drop seal 20L and floor, or other surface against which the lower drop seal 20L is positioned. Likewise, the upper drop seal 20U helps limit the flow of air between the top 20T of the upper drop seal 20U and the ceiling, or other surface against which the upper drop seal 20U is positioned and/or the panel-ceiling connector interface 103.

FIGS. 1A and 2 also show a first side 110A of the panel 10, which includes a first outer layer 130A, and second side 110B of the panel 10, which includes a second outer layer 130B. In this embodiment, both outer layers 130A, 130B are made of drywall and are secured to the frame 25 of the panel 10, as is commonly understood by those skilled in the art. Likewise, other materials such as laminate, agglomerate, or any other material commonly employed in panels and/or walls could be used instead of drywall, as will also be commonly understood.

The panel 10 further includes an inner layer 115 of sound-absorbing insulation in some, but not all, embodiments. In some of these embodiments, the insulation layer 115 is at least partially contained/kept in place by the first outer layer 130A and the second outer layer 130B.

As also will be further discussed later, some, but not all, embodiments also include a membrane layer 150. In some of these embodiments, the membrane 150 is positioned within the insulation layer 115 to help further mitigate sound, as shown in FIGS. 1A and 15A, for example; however, other embodiments do not include the insulation layer 115 but nevertheless include the membrane 150. In some embodiments, the membrane 150 is attached to the frame 25 of the body portion 5 of the panel 10, for example as shown in FIG. 15A. As can be seen there, in some embodiments the membrane 150 is attached to a portion 25P of the frame 25 by at least one clamp/fastener 25F such that it hangs downwards from there and is unencumbered with respect to both of its sides, as well as its bottom end—as is depicted in FIG. 15B, where a plurality of the clamps/fasteners 25F are employed. In fact, the membrane's 150 ability to move somewhat freely (only 'somewhat freely' because the insulation also restricts is movement somewhat, at least in embodiments that include insulation) in at least one direction, or a plurality of directions as depicted in FIGS. 15A and 15B, helps it absorb sound vibrations. In other embodiments, the membrane 150 is positioned within the insulation (i.e., at least partially surrounded) but is not attached to the panel. In yet additional embodiments, the membrane is positioned to one side of the insulation (e.g., next to the insulation).

Getting back to FIG. 15A, the membrane is essentially clamped to the frame by fastener 25F, though many other ways/components can be employed to secure the membrane. In some but not all embodiments, a first and second membrane damping element 150X, 150Y are positioned between the clamp/fastener 25F and the frame portion 25P to mitigate the effect of the membrane's vibration/movement with respect to the frame 25. It is noteworthy to point out that the size/shape of the second damping element 150Y helps the membrane fall in the chosen location, which here is essentially in the center of the insulation. Moreover, while a plurality of fasteners are depicted in FIG. 15B, in other embodiments, one fastener/clamp will be sufficient if it is large enough. Likewise, other embodiments do not include the two damping elements depicted in FIG. 15A; rather, the clamp 25F fastens the membrane to the frame 25 without the damping elements; in other embodiments only one of the damping elements is sandwiched by the fastener 25F.

Before moving on, it may be worth explaining here at least partially how the membrane 150 effectively mitigates sound. As is commonly known, two of the factors that determine a material's insulation ability/performance are weight per unit of area (e.g., surface weight as measured in pounds per square foot) and stiffness. In terms of the latter factor, it is commonly known that stiffer materials typically have relatively poor insulation performance with respect to lower frequencies of sound (since stiff materials tend to have natural resonant frequencies that are in the low frequency audible range, which easily allow the transmission of these frequencies) and tend to respond to bending waves in a way that negatively affects their insulation performance (e.g., via the coincidence effect, where the material is excited by impinging sound energy in the coincident frequency range). On the other hand, stiffer materials tend to have better insulation performance with respect higher sound frequencies.

With the above concepts in mind, a highly efficient acoustic barrier is created by attaching the layer/membrane 150 to the panel 10 (or 10D). In some embodiments, the membrane 150 is attached at/towards the top of the frame 25 so that it hangs down and is unattached (and relatively free to move relative to the frame 25) in all other directions relative to the panel. In other embodiments, the membrane is completely attached to the panel (e.g., at both sides, the top and the bottom of the frame) in an essentially (or at least largely) air tight seal-meaning that little, or no, air can flow between the membrane and the portions of the panel to which it is attached (e.g., frame of the panel). In some embodiments where the membrane 150 is largely, substantially, or completely attached to the panel 10 or 10D, the membrane is not pulled tight; rather, unattached portions of the membrane remain somewhat/relatively free to move/flow. (In other embodiments, the membrane is pulled relatively tight.) Thus, in some of these embodiments the area (e.g., length and width) of the membrane is slightly larger than the area (e.g., length and width) of the panel (e.g., frame 25) to which it is attached.

In FIG. 1A, for instance, the membrane 150 is made of a material that (a) is flexible/limp (i.e., having a relatively low stiffness, i.e., where stiffness relates to the composition of the material), (b) has a relatively high surface weight (e.g., from 6 kg/m$^2$ to 9 kg/m$^2$, though this is not meant to be limiting in any way; in fact, others could even range from as low as 3 Kg/m2 to as high as 20 kg/m$^2$, or more, and still be quite effective in mitigating low frequency sound) and (c) has an overall non-uniform density in some, but not all, embodiments. For instance, some materials that fill these criteria include mass loaded vinyl, non-mass loaded vinyl, polyurethane, some bituminous reinforced materials, and other mass loaded and/or non-mass loaded materials that will be readily identified by those skilled in the field. Moreover, in other embodiments, the membrane is made of material that has only one of these three characteristics; and, in other embodiments, the membrane is made of material accomplishes two of these three characteristics. Further still, the membrane 150 is one layer of material in some embodiments, and in other embodiments the membrane 150 is two or more layers, wherein some of these embodiments the two or more layers are different (e.g., made of different material(s)).

With the above criteria in mind, the membrane 150 does several things. First, because of its limpness/flexibility, the membrane 150 significantly damps low frequency sound, which is generally difficult to reduce, by transforming the acoustic energy into heat (and, as a result, also minimizes the coincident effect at the low frequency range, which further increases the insulation at these frequencies). Second, because of its relatively high surface weight, the membrane 150 improves (as reflected by the mass law) its insulation capabilities and thus also the overall insulation ability/transmission loss of the panel 10 and/or 10D (compared to embodiments of the panel that do not include the membrane 150). Third, since the membrane's 150 material has a non-uniform density, this means that it does not have a marked natural resonant frequency—which would otherwise allow coincident waves to easily pass from one side/face of the membrane to the other side/face—and thus further means that the membrane 150 is also capable of better damping low, medium and high frequency range sounds/energy. In other words, the membrane 150 functions as an additional acoustical barrier (i.e., 'additional' since the panel 10, without the membrane, functions as an acoustic barrier) that converts acoustical energy that reaches it (from at least one side of the panel 10, and both sides in some embodiments, like FIGS. 1A and/or 1D) into kinetic energy and heat—thereby reducing the transmitted energy and thus substantially increasing the sound insulation of the panel 10 and/or 10D as a whole. In turn, this drastically mitigates the coincidence dip effect(s) that would otherwise occur—and which are typically associated with prior art panels and partitions, particularly those that are lightweight and movable.

In light of the above, a significant increase in insulation/sound mitigation is achieved. While this occurs across much of the audible spectrum generally, the membrane's 150 ability to mitigate low frequency sound waves is particularly notable since these tend to be more difficult to insulate/damp in the context of a panel and/or partition. In some embodiments, the increase in low frequency insulation attributable to the acoustic barrier is in the 5 dB to 15 dB range; though, in others the effect is between 10 db and 15 db; and in others it is greater than 15 dB; and in yet other embodiments, where less ideal material(s) is used, it is in the 1 dB-5 dB range. In any event, the ranges provided here, and anywhere else in this document with respect to any other measured factor and/or result, are not meant as limiting. More generally, while the membrane 150 does increase insulation of non-low frequencies in some, but not all embodiments, the increase in low frequency insulation is not only particularly significant but notable since one of the main weakness of many prior art movable panels/partitions, especially lightweight ones, is their poor insulation of low frequencies.

Accordingly, one or more aspects of the various panels/partitions described herein are particularly effective in common everyday modern commercial settings, such as those involving multimedia systems—which are being used ever-more frequently in the hospitality, educational, recreational and corporate industries, for example. In other words, where many prior art panels/partitions tend to be designed to cope with transmission loss in the human voice range, the various panel/partition embodiments disclosed herein not only mitigate voice frequencies but also effectively mitigate the (often powerful feeling to the human ear) low frequency waves (e.g., by the inner limp membrane 150), upper high frequency waves (e.g., by the drop seals 20L, 20U disclosed herein) and the mid-range frequency waves (e.g., by the perforated sections 80M, 80F disclosed herein) that generally go hand-in-hand with multimedia content. (As is commonly known, the frequency range of the human voice is generally in the 125 Hz to 8 KHz range; and multimedia sound may run from 20 Hz to 20 KHz, which is basically all the audible spectrum but the way the accompanying music is mixed, the low frequencies are often emphasized.) Moreover, one or more of the damping elements disclosed herein tend to mitigate/affect most, if not all, sound frequencies. Further still, a number of the various gaskets disclosed help form an essentially airtight seal between partitioned panels, which in some embodiments also form a suction which, in effect, helps bond them together (e.g., as discussed below).

Before going further, it also should be noted again that the panel 10D shown in FIG. 1B is the exact same panel 10 depicted in FIG. 1A, except that the male 163M and female members 163F of the panel 10D are not perforated. Accordingly, when two of the panels 10D are interfaced to form a (non-perforated) partition 169D—which often will be referred to as panels 10E and 10F in discussions pertaining to the partition 169D—in FIG. 3C, the (non-perforated) partition 169D will be exactly like the partition 169 of the two panels 10A, 10B depicted in FIG. 3B with one exception: neither of the elements 163M, 163F of the interface 199D of the two panels 10E, 10F are perforated.

In this light, some embodiments of the (non-perforated) partition 169D thus behave slightly differently than the partition 169 (which is often referred to herein as the 'perforated' partition, where the partition 169D is often referred to as the 'non-perforated' partition). That is, since air is not able to flow out of the passage 99D of the (non-perforated) partition 169D by perforations/holes of a perforated section (since the elements 163M, 163F do not include a perforated section) there will be some suction between the two panels 10E, 10F in the (non-perforated) partition 169D in some, but not all, (non-perforated) partition 169D embodiments.

Figure 9D:
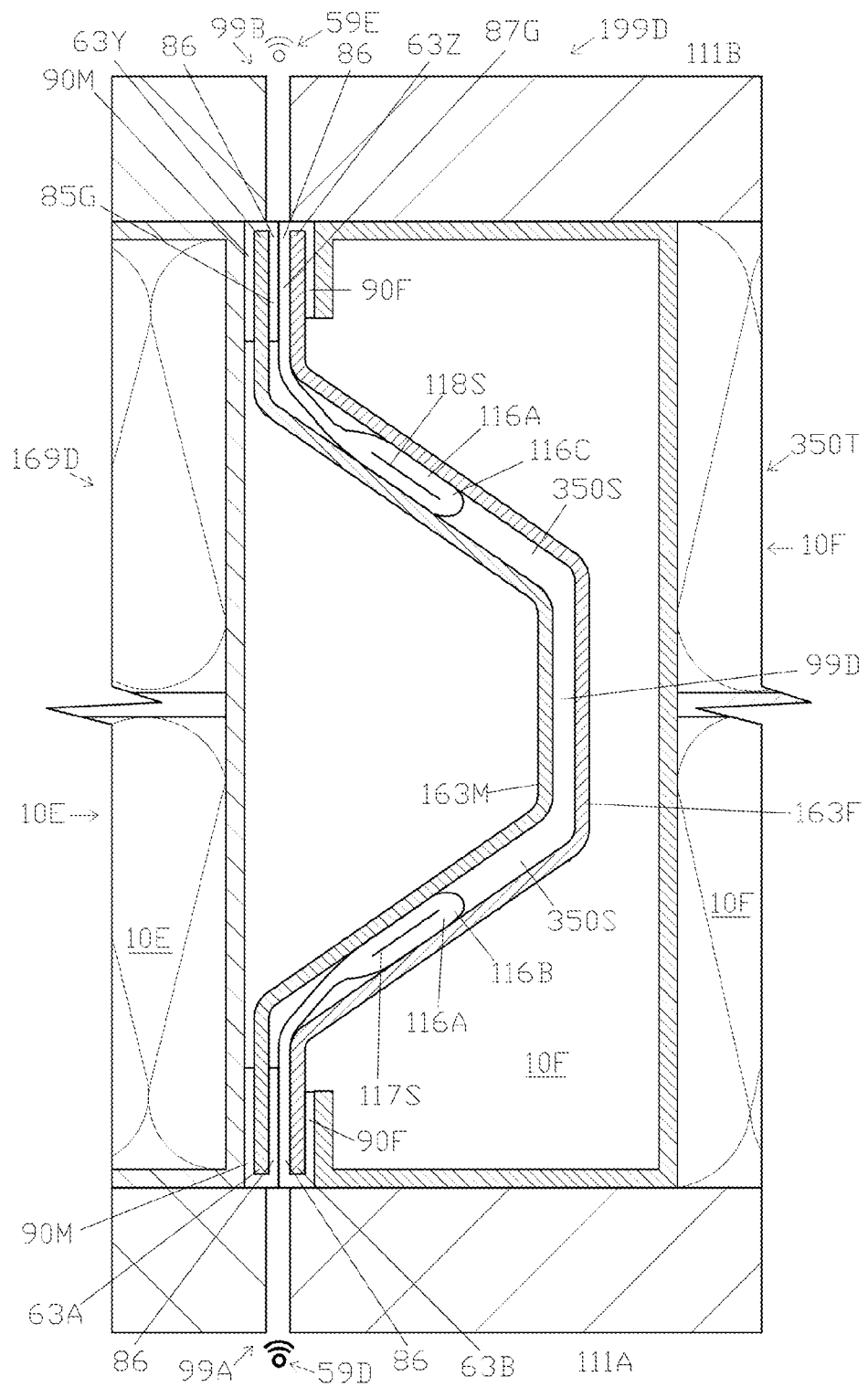
FIG. 9D is a cross-sectional view along 9D-9D' of FIG. 3C, which, among other things, shows the relationship of the two (non-perforated) panels in the region between the upper gasket window and the lower gasket window.

More specifically, the suction occurs in a suction region 350S that is at least partially defined by (1) the upper gasket 200U and (2) lower gasket 200L, which are not depicted in FIG. 9D. In some embodiments, the suction region 350S is also at least partially defined by (3) the inner gasket 116A, (4) the male member 163M and (5) the female member 163F—like as also shown in FIG. 9D. In yet further embodiments, (6) one or more of the outer gaskets 85G, 87G helps create and/or enhance suction in the suction region 350S. In yet other embodiments, one or more of the outer gaskets 85G, 87G partially defines the suction region—e.g., in embodiments that do not include the inner gasket 116A. In other embodiments, at least one of the six mentioned components partially defines the suction region; in yet other embodiments, at least two of the six mentioned components partially define the suction region; in further embodiments, at least three of the six components partially define the suction region; in yet further embodiments, at least four of the six components partially define the suction region; in some embodiments, five of the six; and in some embodiments, all six define the suction region.

The inherent nature of the above-mentioned suction tends to help keep the two panels together as a partition and, in many but not all embodiments, the suction would have to be released (by human or other force) in order to separate the two partitioned panels 10E, 10F. In other words, when the drop seals are extended, typically the partitioned panels 10E, 10F more-or-less stay in place; but, the suction keeps their adjacency (especially in the passage 99D area) close/tight, which serves to limit air from entering the passage. While other prior art systems use expensive and heavy magnets to keep panels together to achieve a similar objective, the lightweight and inexpensive nature of the suction system 350T (inherent in the suction area 350S described above) is thus advantageous.

Figure 3A:
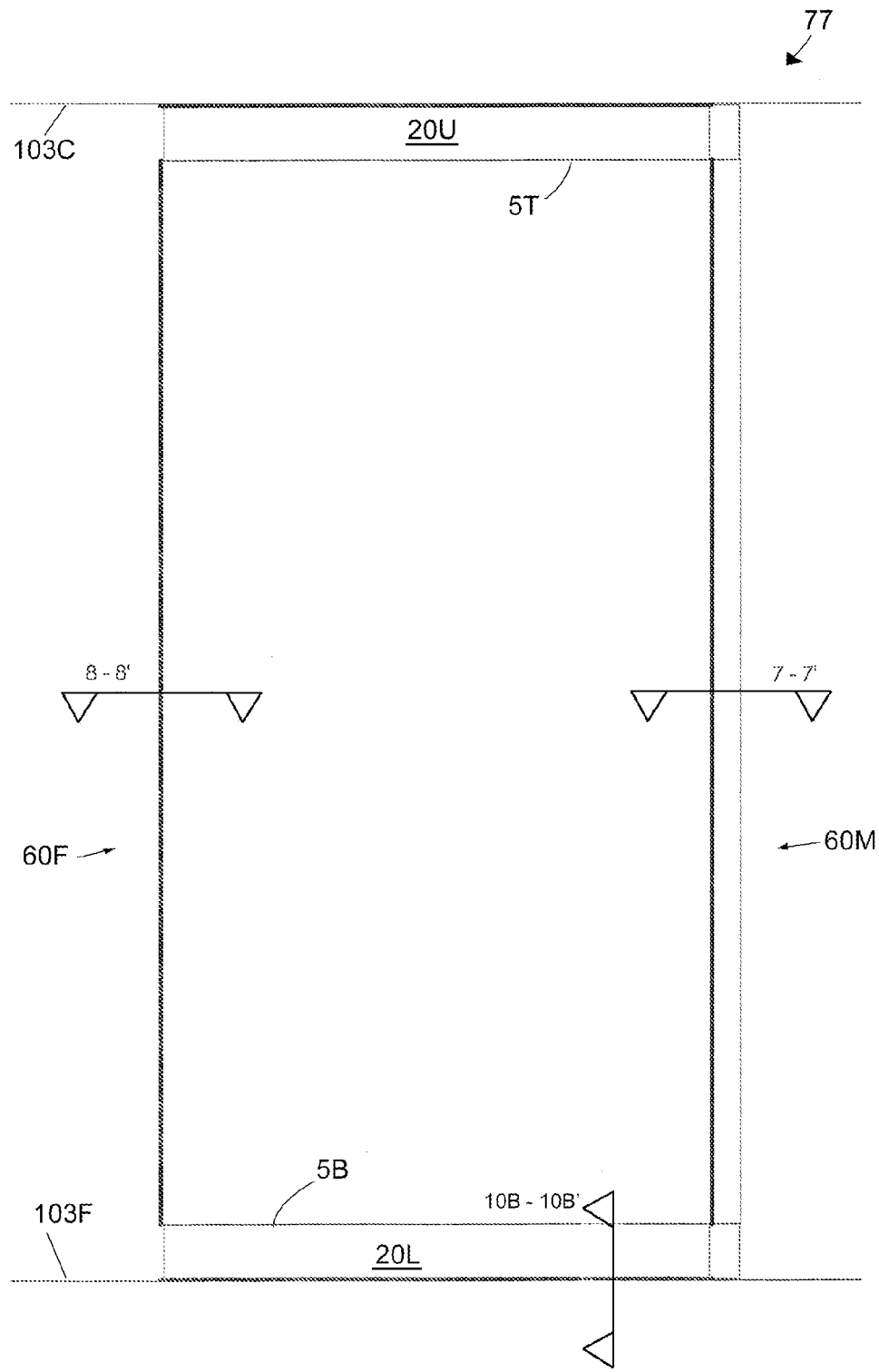
FIG. 3A is a side view of the embodiment the acoustic panel depicted in FIG. 1A, where the panel is depicted with each of its two drop seals in an extended position.
Figure 3B:
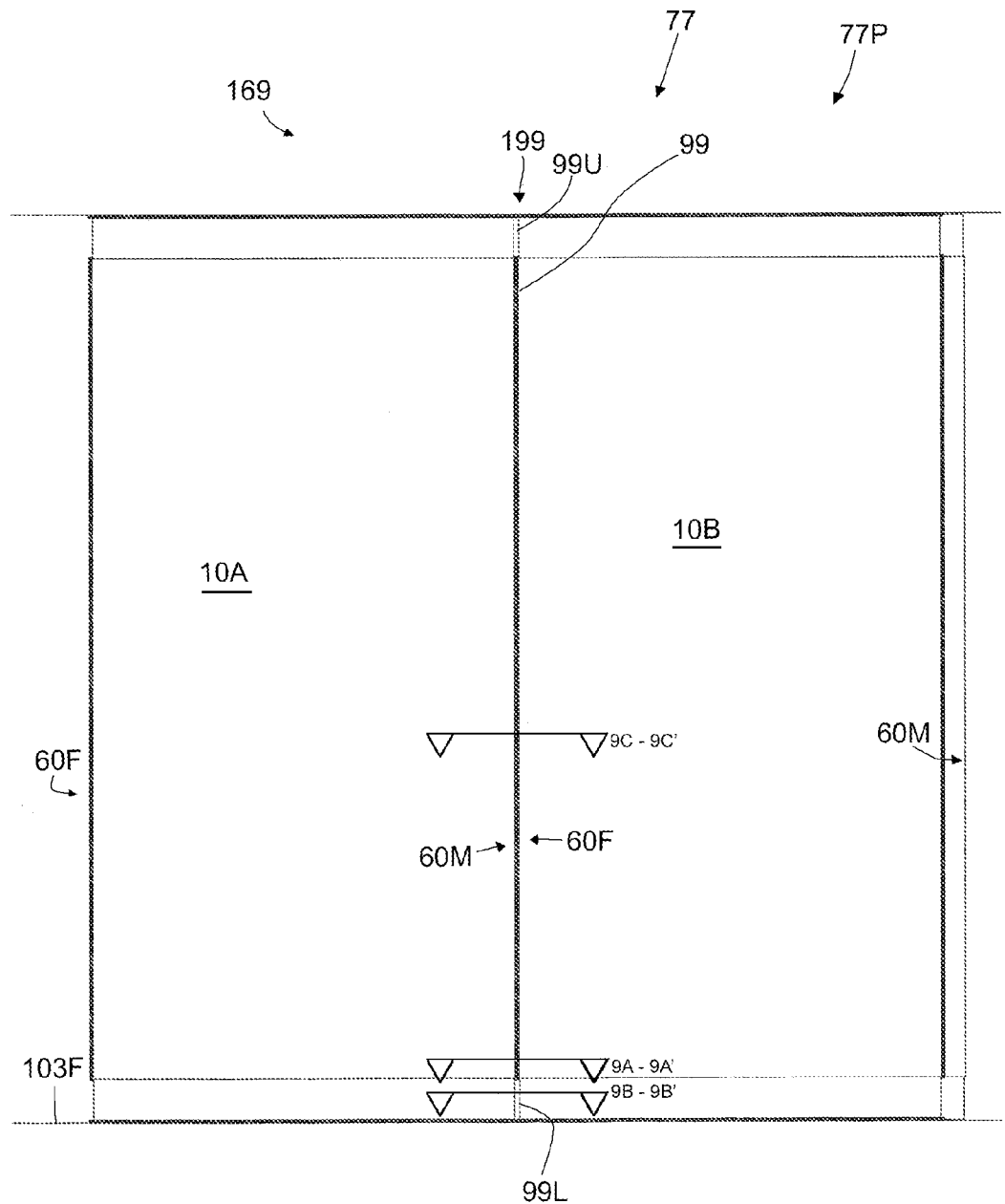
FIG. 3B is a side view of an embodiment of a partition that includes two of the acoustic panels depicted in FIG. 3A, where the first/male end of the first panel (on the left side of the figure) is adjacent to the second/female end of the second panel (on the right side of the figure), and where both panels are depicted with each of their two drop seals in an extended position.
Figure 3C:
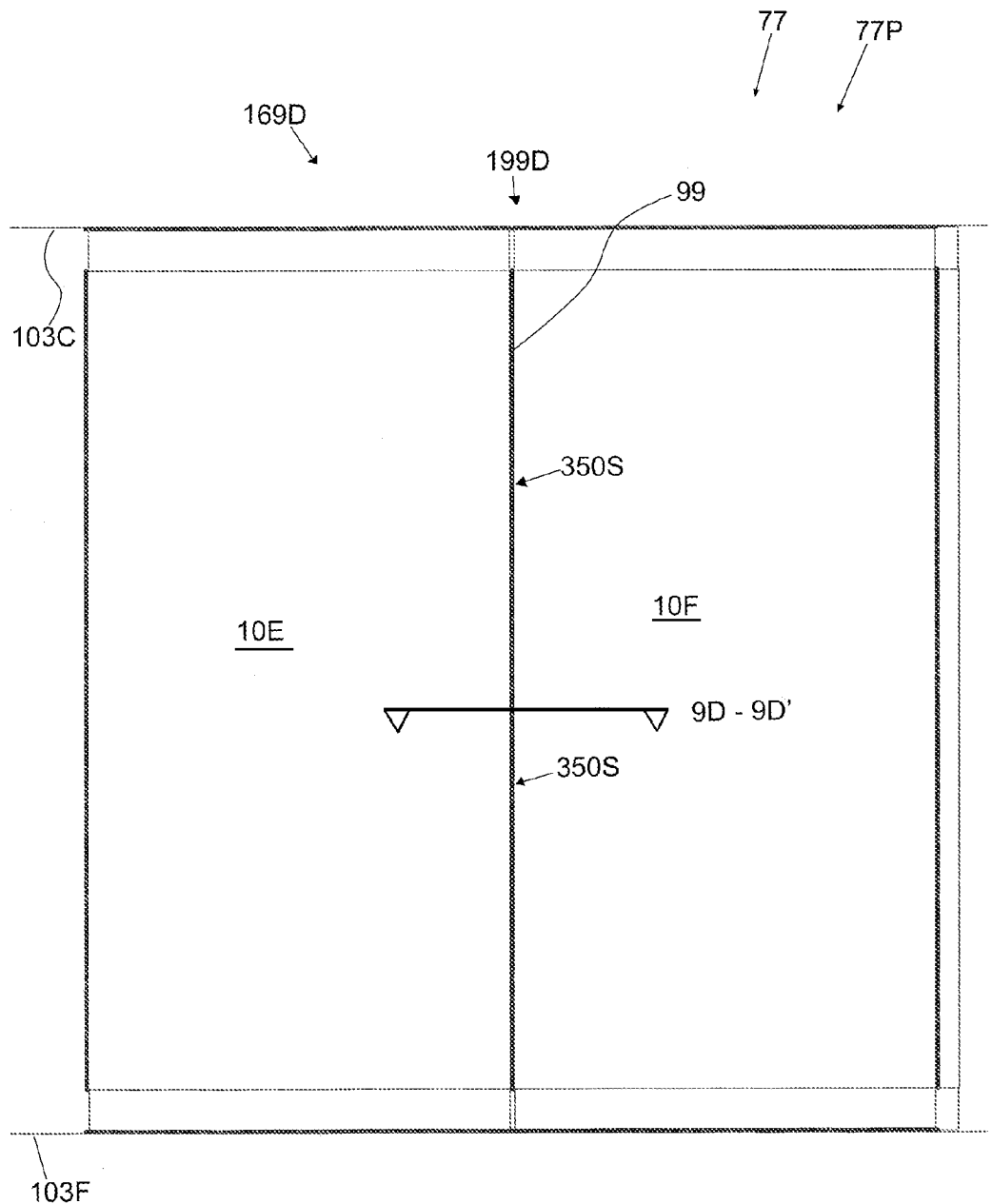
FIG. 3C is a side view of an embodiment of a partition that includes two of the (non-perforated) acoustic panels depicted in FIG. 1B, where the first/male end of the first panel (on the left side of the figure) is adjacent to the second/female end of the second panel (on the right side of the figure), and where both panels are depicted with each of their two drop seals in an extended position.

FIG. 3A is a side view of the embodiment of the acoustic panel 10 shown in FIGS. 1A and 2. In the embodiment shown in FIG. 3A, the height is roughly 2.40 meters, the length is roughly 1.20 meters, though these and the width will typically depend on the design requirements. In other words, it will be commonly understood that each of these three metrics will vary considerably based on the design needs of each situation; thus, the numbers provided are simply intended to be illustrative and not intended to be limiting in any way (as will be readily understood by those skilled in the art).

FIG. 3B is a side view of two of the panels 10 (shown in FIG. 3A) that are interfaced as the partition 169, where the male end 60M of the first panel 10A (on the left-hand side of FIG. 3B that, once again, is exactly like the panel 10 depicted in FIGS. 1A and 3A) and the female end 60F of a second panel 10B (on the right-hand side of FIG. 3B that, once again, is exactly like the panel 10 depicted in FIGS. 1A and 3A) are interfacing. The two panels 10A, 10B depicted in FIG. 3B are thus not only identical but have similar dimensions. However, in other embodiments the two panels may have different dimensions with respect to each other; and, in further embodiments the two panels are not identical.

Figure 3D:
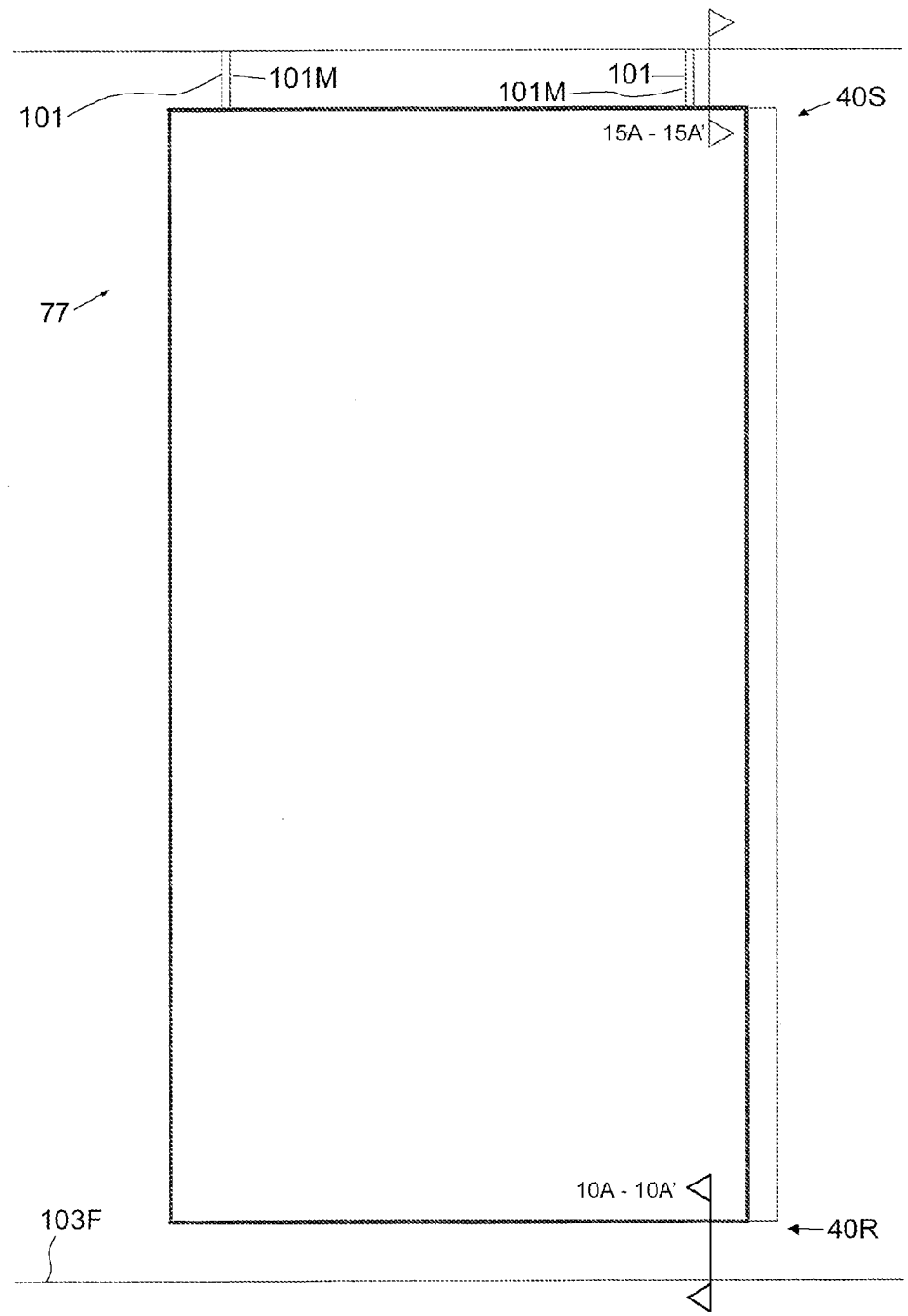
FIG. 3D is a side view of an embodiment of the panel depicted in FIG. 1A, where the panel is depicted with each of its two drop seals in a retracted position.

FIG. 3C is the same as FIG. 3B, except the two panels partitioned are both non-perforated panels. And, FIG. 3D depicts exactly what is depicted in 3A, except that upper drop seal 20U and lower drop seal 20L of the panel 10 are each shown in its respective retracted position 40R, 40S.

Figure 4A:
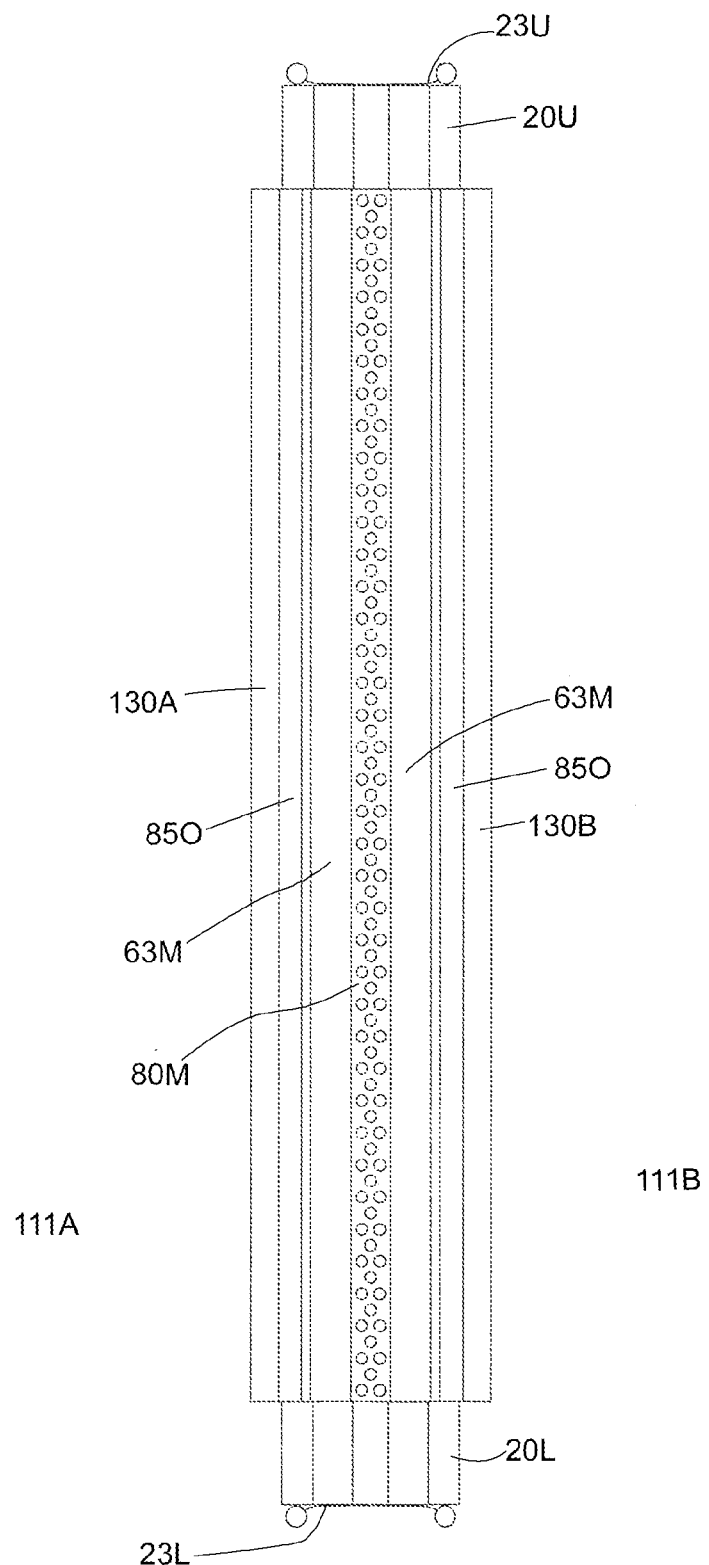
FIG. 4A is a front view of the embodiment of the acoustic panel depicted in FIG. 1A, which depicts the partially perforated first/male end.
Figure 4B:
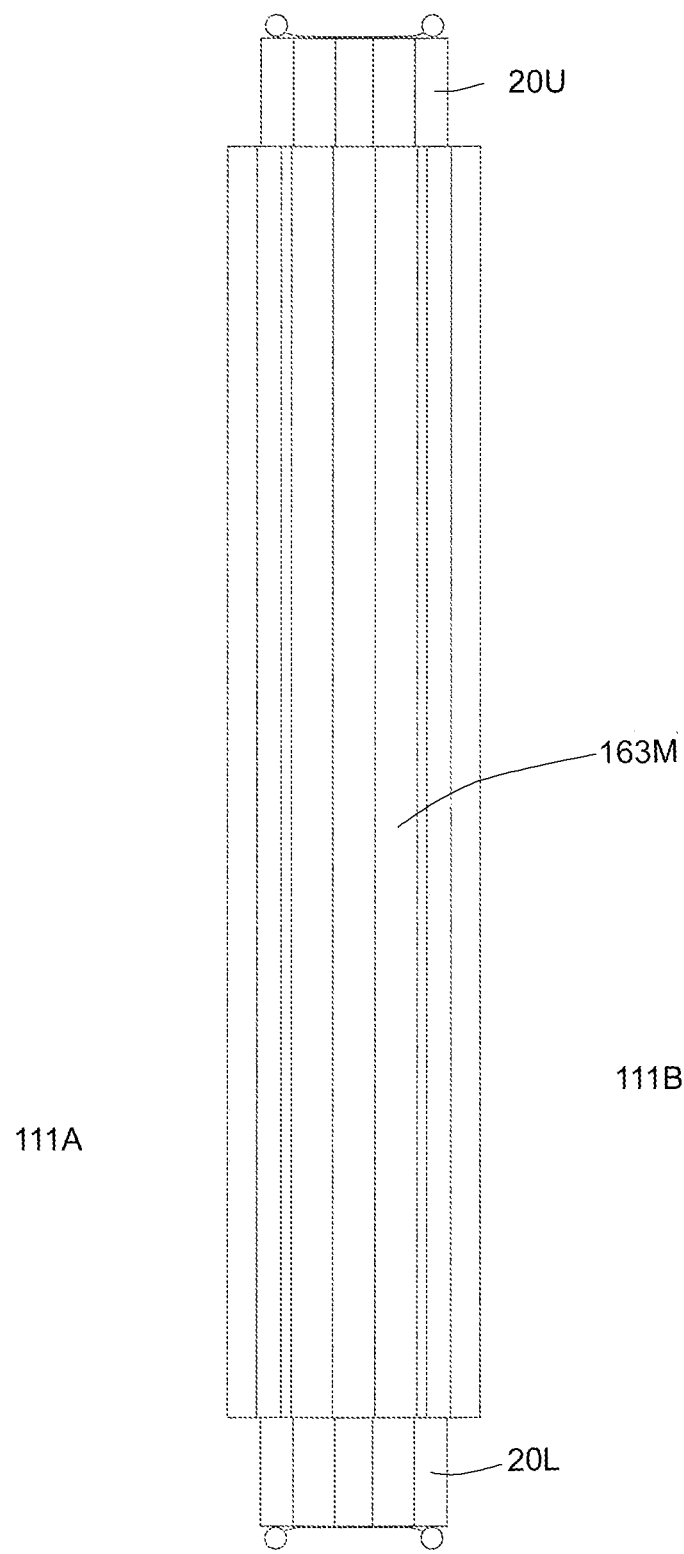
FIG. 4B is a front view of an embodiment of the acoustic panel depicted in FIG. 1B, which depicts the non-perforated first/male end.
Figure 5A:
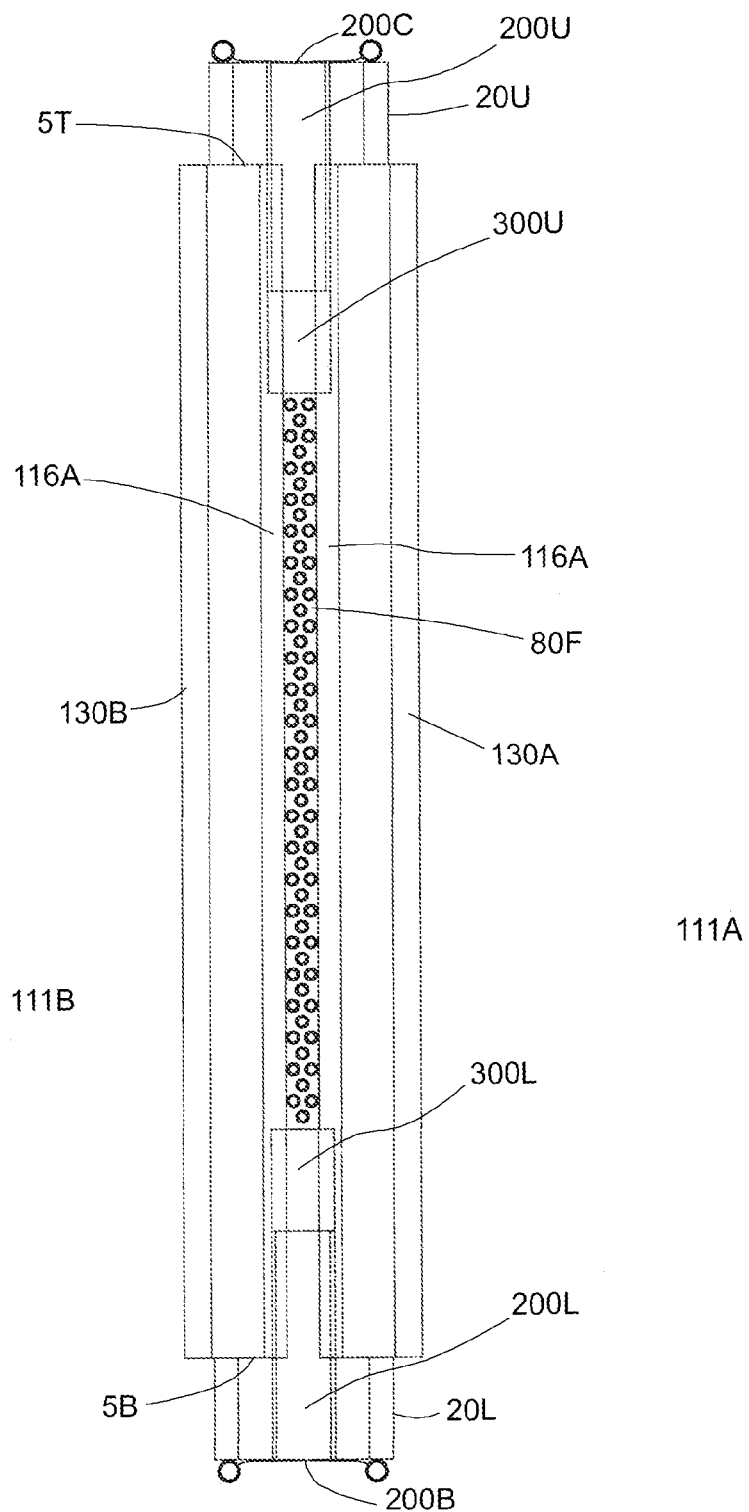
FIG. 5A is a back view of an embodiment of the acoustic panel of FIG. 1A, which depicts the partially perforated second/female end.
Figure 5B:
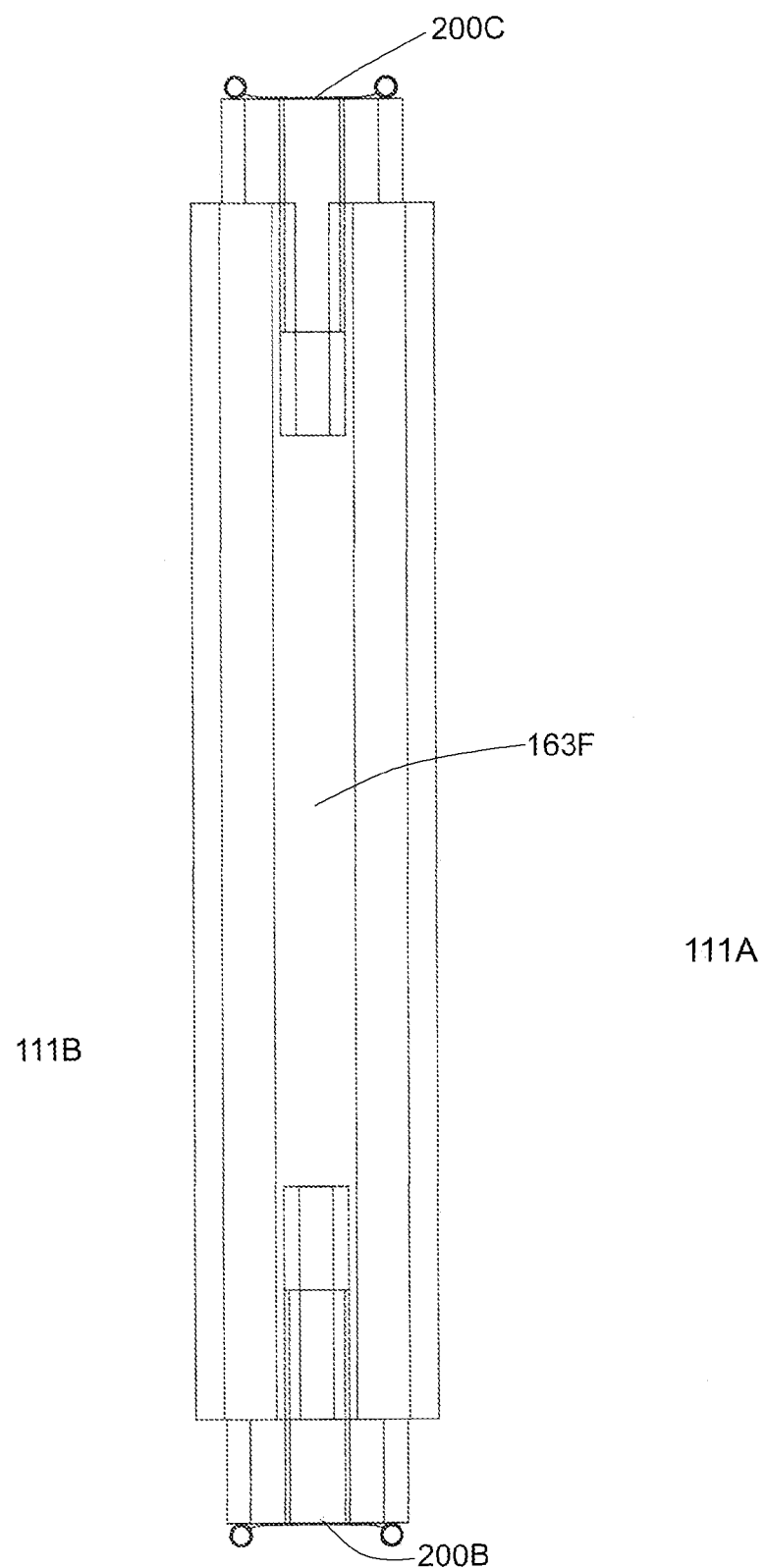
FIG. 5B is a back view of an embodiment of the acoustic panel of FIG. 1A, which depicts the partially non-perforated second/female end.

FIGS. 4A, 5A, 6A and 6B respectively show front, rear, a first top view, and a second top view (which is the same as the first top view of FIG. 6A, except that the gasket of the upper drop seal 23U is removed only for the purpose of making it easier to see the components underneath it) of the panel 10 depicted in FIG. 1A and FIG. 2. In turn, FIGS. 4B and 5B depict the panel 10D in FIG. 1B. (The top view of the panel 10D depicted in FIG. 1B is not included because it will be clearly understood that the top view of the (non-perforated) panel 10D will look exactly like FIGS. 6A and 6B, except that the male and female members 163M, 163F are not perforated.) While most components depicted in these figures should be pretty self-evident from the discussion of FIGS. 1A, 1B and 2, one of the components worth highlighting in FIG. 5A (which is also seen in FIG. 5B) are the gasket windows 300U, 300L of the female element 63F (which, along with some edges of the upper and lower gaskets 200U, 200L, are partially depicted with dotted lines, since, for example, from the viewing angle of these figures the inner gasket 116A is partially blocking a direct view of them). Specifically, the gasket windows 300U, 300L enable the upper and lower gaskets 200U, 200L to respectively extend out from the upper and lower drop seals 20U, 20L (to which each are respectively attached—for example, by being bonded or riveted to the bodies of the respective drop seals 20U, 20L) which would not be possible but for the respective gasket windows 300U, 300L. This is because, as can be seen in various figures, in some embodiments the drop seal 20L is at least partially inside a cavity 450O of the panel body 5 that is partially defined by the female element 63F. For roughly similar reasons, the dimensions of each gasket window 300U, 300L also permit the respective upper and lower gaskets 200U, 200L to move with the respective drop seals 20U, 20L (e.g., as the drop seals are retracted and extended).

Figure 7A:
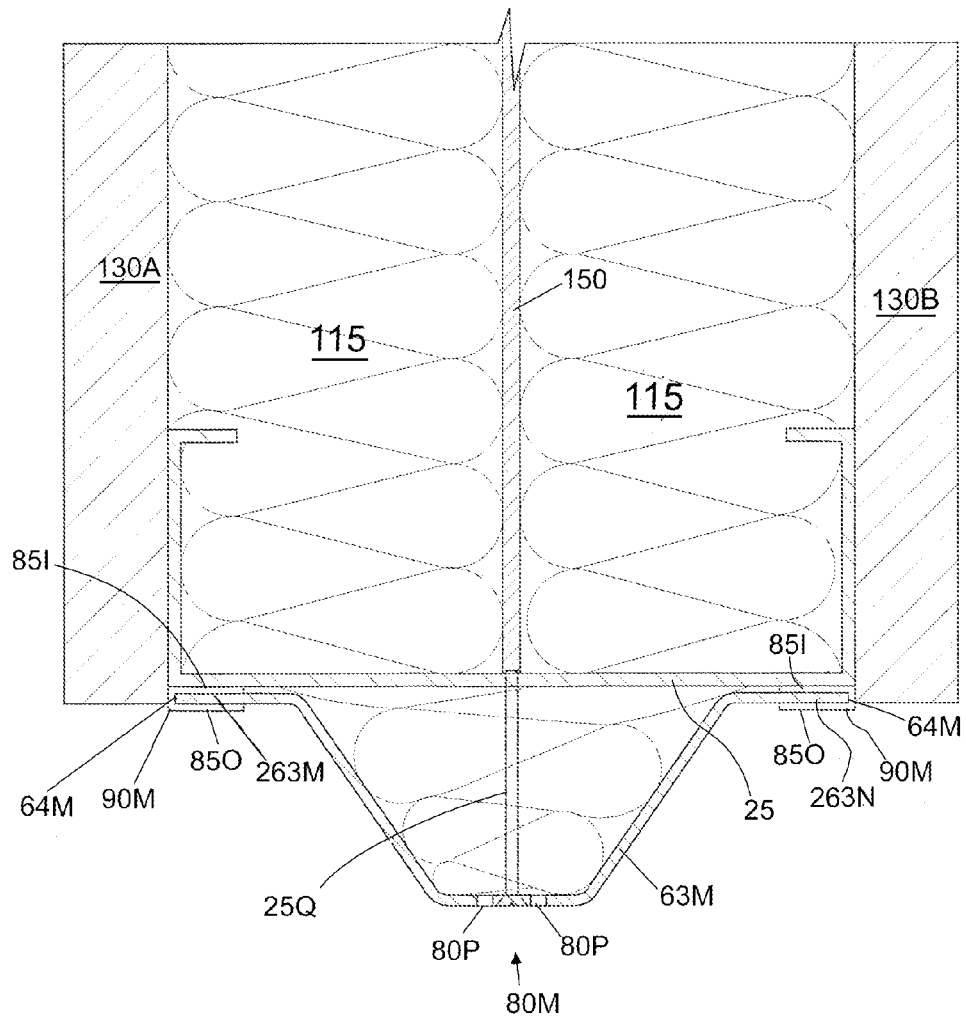
FIG. 7A is a cross-sectional view taken along 7-7' of FIG. 3A, which among other things shows an embodiment of the male end of the panel and the damping system of FIG. 1A.

FIG. 7A shows a cross-sectional view reflective of the 7-7' line of FIG. 3A. Among other things, this figure provides an informative view of the male end 60M of the panel 10 and the damping element 90M—and particularly the (sandwiched) inner portion 85I of the damping element 90M. As can be seen, the inner portion 85I of the damping element is sandwiched between the male member 63M and the male bracket 25M (by a fastener 25Q, such as screw). As can further be seen, the damping element 90M is not only positioned on two sides (i.e., front and back) of the male member 63M, but it is wrapped around an edge 64M of the male member 63M. In other embodiments, the inner portion 85I of the damping element 90M and the outer portion 85O are distinct/unconnected components; for example, where it is not wrapped around the edge 64M. (It should also be noted that this cross-sectional view of the male end is not shown with respect to the panel 10D depicted in FIG. 1B because it would look identical to FIG. 7A—except for the perforations 80P—and it is shown in the context of FIG. 9D. The same holds true with respect to a cross-sectional view of the female end of the panel 10D depicted in FIG. 1B, i.e., where the perforated version is shown in FIG. 8, among other figures, and the non-perforated version is seen in FIG. 9D.) Again, the function of the damping elements is to damp vibration (e.g., related to sound waves) in the component (e.g. male element and/or female element) that they sandwich and, at least in some embodiments, on which they apply pressure.

In some embodiments, the fact that there are such adjacencies—as described above—does not necessarily mean that the distance between the male element 63M and male bracket 25M—e.g., as reflected by the thickness of the (sandwiched) inner portion 85I of the damping element 90M—is not capable being reduced, at least temporarily, when the two panels, e.g., panels 10A, 10B in FIG. 3B (and/or panels 10E, 10F in FIG. 3C), are forced together to form the partition 169. That is, in some but not all embodiments, each of the two ends 263M, 263N of the male element 63M (i.e., that are adjacent to the inner damping element portion 85I) are movable (and do move) slightly towards the male bracket 25M when the partition 169 is formed. In other words, the fact that the distance between the male element 63M and the male bracket 25M is capable of being reduced in this way—which in many such embodiments implies that the male member is at least flexible, and in additional embodiments it is also resilient—enables pressure/force to be placed on the inner damping element 85I, which in turn causes the inner damping element 85I to exert a counterforce on the male member 63M. Accordingly, at least in some embodiments like FIG. 3B, when the respective male and female members 63M of panel 10A and 63F of 10B are positioned to mate with sufficient force (e.g., by moving the two panels together), not only will the outer damping element portion 85O be pressed (e.g., by the female damping element portion 87O in some but not all embodiments) against the male mating member 63M (causing it to bend a bit in some embodiments) but the inner damping element portion 85I will also be—as a result—effectively pressed against the male (mating) member 63M. Moreover, in such embodiments, this occurs at least in part because the inner damping element portion 85I is backed by the male bracket 25M, which serves to prevent (or mitigate in other embodiments) the movement of the inner portion 85I of the damping element 90M away from the male member 63M. Moreover, essentially the same thing occurs with respect to the female bracket 63F, the female damping element 90F, the female bracket 25F, and the female fastener 25R (which are all depicted in FIG. 8.)

However, in other embodiments that include the partitions in FIGS. 3B and 3C, but not all embodiments, prior to forming the partition the inner damping element 85I is essentially squeezed/compressed between the bracket 25M and the male member 63M by fastener 25Q (e.g., a screw or some other fastener that does not have such a rough surface, such as a rod-like cylinder member, with ends that are wider than the cylinder to fasten the rod-like cylinder member between the member and the bracket; those skilled in the art will appreciate that many other alternatives exist and the fastener examples disclosed are not meant to be limiting in any way). Thus, in such embodiments, pushing/forcing the panels together (to form a partition) results in additional force being placed on the inner damping element portion 85I.

It should be noted that in embodiments where the inner damping element portion 85I is squeezed/compressed prior to the formation of the partition, it is nevertheless important in some but not all embodiments that the panels (such as panels 10A, 10B) interface so that force (resulting from the female end 63F of the second panel 10B) is applied to the outer damping element portion 85O—i.e., in order for it, in turn, to press against the male element 63M. More generally, in most but not all embodiments, some pressure—whether in advance of the formation of the partition, as a result of the formation of the partition, or both of these, where the latter is depicted in FIGS. 3B and 3C—will be applied to both the outer damping element portion 85O and the inner damping element portion 85I since applying sandwiched damping pressure (e.g., to the male element 63M) is much more effective (in damping vibration) than applying pressure from only on one side, and even more effective than not applying pressure to either side (e.g., of the male element 63M). Again, as mentioned above, this is also true with respect to the female element 63F of the panel 10; further, to be clear, this is also true with respect to the male and female sides of the non-perforated panel 10D.

In other words, while the above discussion is not included herein with respect to FIG. 8 it will be readily understood by those skilled in the art that applies pretty much equally to FIG. 8. Moreover, most all that is said in this entire document with respect to the panel 10 will apply equally to the (non-perforated) panel 10D. And, most all that is said herein with respect to the partition 169 will apply equally to the (non-perforated) partition 169D. That said, not all that is said herein with respect to the (perforated) panel 10 and/or (perforated) partition 169 will apply to the (non-perforated) panel 10D and/or partition (non-perforated) 169D. Clearly, common sense must prevail, particularly when it comes to the capabilities of the perforations (of the perforated sections) and the suction achievable by non-perforated embodiments.

Also, the thickness of (each of the two parts of) the inner damping element portions 85I, 87I is 5-10 mm and the thickness of (each of the two parts of) the outer damping element portions 85O, 87O is 5-10 mm. However, in alternative embodiments the thickness of the inner damping element portions 85I, 87I and thickness of the outer damping element portions 85O, 87) could range from 0.1 mm to 50 mm or more. That said, none of these numbers are meant to be limiting; in essence, any thickness that is sufficient to damp vibration is possible in various alternative embodiments—as will be commonly understood by those skilled in the art. Also, the respective thicknesses of the inner damping element portions 85I, 87I and the thickness of the outer damping element portions 85O, 87O are relatively the same in some embodiments and different in other embodiments, which is similarly true with respect to the various parts that make up each of the damping element portions 85I, 87I, 85O, 87O. Moreover, in some embodiments, these have low friction surfaces, and in further embodiments they are made of lightweight material.

Figure 7B:
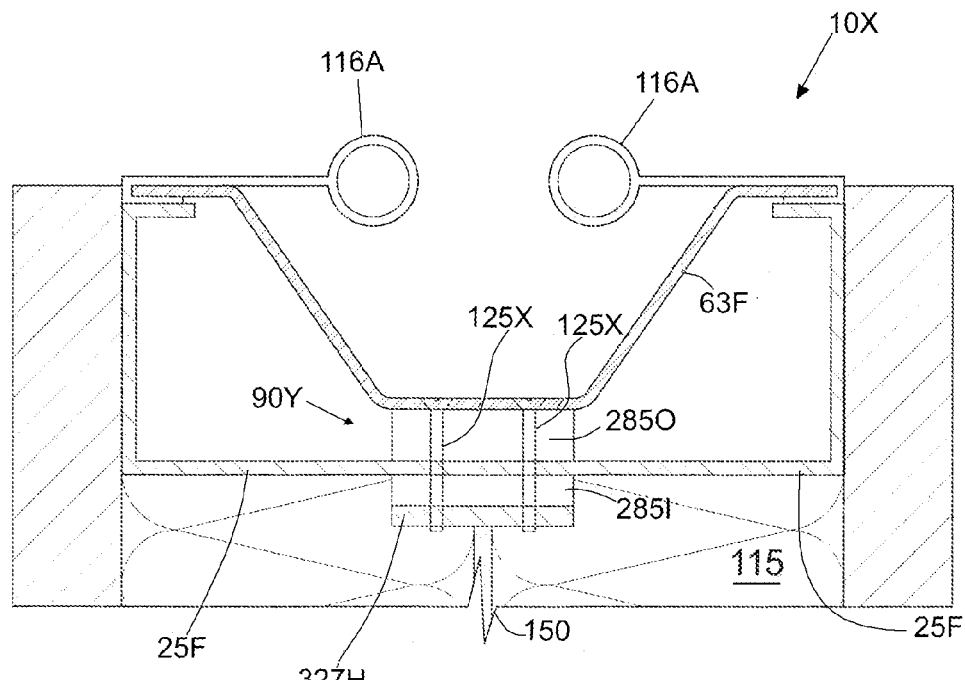
Figure 7B:
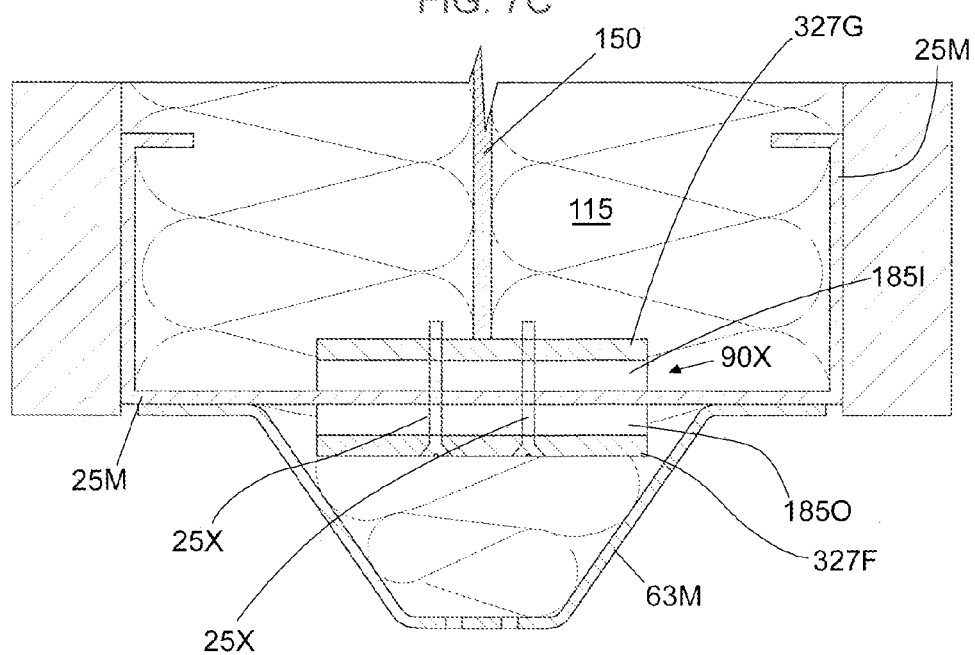

FIGS. 7B and 7C depict an alternative panel 10X, which are just like the view of panel 10 depicted in FIG. 7A and the view depicted in FIG. 8 except the panel 10X has another (i.e., different from some of the others described herein) damping element 90X and 90Y, where the former is comprised of damping elements 185I and 185O, and where the latter is comprised of damping elements 285I and 285O and does not include damping element 90M. As can be seen, a fastener 25X and a fastener 125X is included to keep these respective damping elements respectively sandwiched around the male bracket 25M and female bracket 25F. These two fasteners are each essentially comparable to the fastener 25Q depicted in FIG. 7A, though the length may be different due to design considerations, as will be readily understood by those skilled in the art. In FIGS. 7B and 7C, the fasteners are tight enough (e.g., in some but not all embodiments as a result of their length) so that they enable the respective damping elements to effectively apply pressure to the male/female elements respectively and thus damp vibration in those elements. On the male end of panel 10X, such force is, in some but not all embodiments, supplemented when the male end is partitioned with (e.g., female end of) a second panel. It also should be noted that in some additional embodiments that the male damping element 90M described with respect to the panel 10 and the damping element 90X described here with respect to the panel 10X are both included in the panel 10—which allows for both the male element 63M and the male bracket 25M to be sandwiched by damping pressure. In additional embodiments, the female damping element 90F described with respect to the panel 10 and the damping element 90Y described here with respect to the panel 10X are both included in the panel 10—which allows for both the female element 63F and the female bracket 25F to be sandwiched by damping pressure. (It also should be mentioned that the damping elements in FIGS. 7B and 7C are sandwiched by pieces of material 327F, 327G, and 327H that help keep the respective fasteners in place around the respective damping elements vis-à-vis the respective fasteners. While they are metal here, they could be many other materials as those skilled in the art would appreciate.

FIG. 8 shows a cross-section view along 8-8' line of FIG. 3A. Among other things, this view provides an informative view of the female side 60F of the panel 10, as well as the female member 63F, the inner damping element 87I, the outer damping element 87O, the perforated portion 80F of the female member 63F, the inner gasket 116A, and the connecting elements 127C, 127D (which also function as connecting gaskets 127G, 127H). As was the case with respect to FIG. 7A, the female element 63F is attached to the female bracket 25F (e.g., by a fastener 25R, such as a screw, but many other fasteners could be used as will commonly be understood by those skilled in the art; thus, this is not meant to be limiting in any way) and the inner damping element (or 'portion' as it is sometimes referred to herein) 87I is sandwiched in between them.

In addition, FIG. 8 indicates the rounded and hollow nature of the two tubes 116B, 116C of the inner gasket 116A, as is the case in some but not all embodiments. For instance, in some embodiments the tube(s) are not hollow. Further still, while the tubes of FIG. 8 are depicted as roughly circular, in other embodiments they have more of an oval shape. In yet other embodiments, other shapes, such as polygons, triangles, etc. are used. Also, in some embodiments there is only one tube (e.g., 116B), though in yet other embodiments there are more than two tubes.

Generally speaking and without intending to limit the scope of the inner gasket 116A or any gasket disclosed herein, rounded shapes (like the circular shape shown in FIG. 8) tend to be particularly able to—e.g., when compressed by the (e.g., male) end of a second panel (e.g. 10B)—'morph' well to effectively fill in and/or at least partially block a portion of the passage 99 between two mated panels (of a partition). For example, because each of the tubes 116B, 166C is hollow and compressible (and in some embodiments flexible and/or resilient), the circular shape of each of the two tubes relatively easily becomes more oval-like (and flattened to some degree) when the two panels are interfaced/partitioned (as shown in other figures included herein). Likewise, if the surfaces of the male and/or female members 63M, 63F are not flat and/or have any deformations (e.g., pits, cracks, dents, etc.) the round and flexible nature of the tubes (and the material of the tubes) 116B, 166C typically helps it/them fill these in and/or cover such in a way that prevents air from passing through the passage 99. Moreover, in the embodiment shown in FIG. 8, at least some of the air in the uncompressed tubes is pushed out—i.e., upwards and downwards respectively—when the tubes are compressed in the process of mating/interfacing two panels (e.g., 10A, 10B).

As will be discussed below, in some embodiments (as shown in FIGS. 9A, 9C, and 9D, for example) at least two portions of an inner surface 117S, 118S of the each of the tubes 116B, 116C (though, in some embodiments, this occurs with respect to only one tube) touch each other when the tubes are compressed (by the interfacing of two panels). In additional embodiments, the entire inner surface of at least one of the (and in some embodiments both of the) tubes is completely touching (as shown with respect to inner tube surfaces 117S, 118S in FIGS. 9A, 9C, and 9D, for example); and, in some further embodiments this leads to the formation of a suction between the inner surface portions 117I, 117J of the tube 116B and/or a suction between the inner surface portions 118I, 118J of the tube 116C. In fact, a similar inner surface touching and suction occurs with respect to the lower gasket 200L and/or upper gasket 200U in some, but not all, embodiments (as discussed below, e.g., as shown in FIGS. 9A and 9D, for example).

Figure 6A:
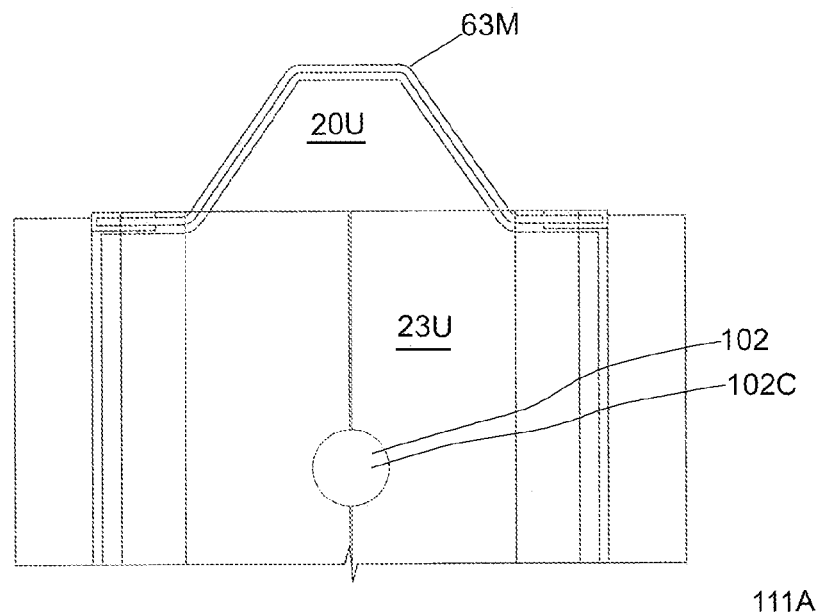
FIG. 6A is a top view of the embodiment the acoustic panel shown in FIG. 1A.
Figure 6A:
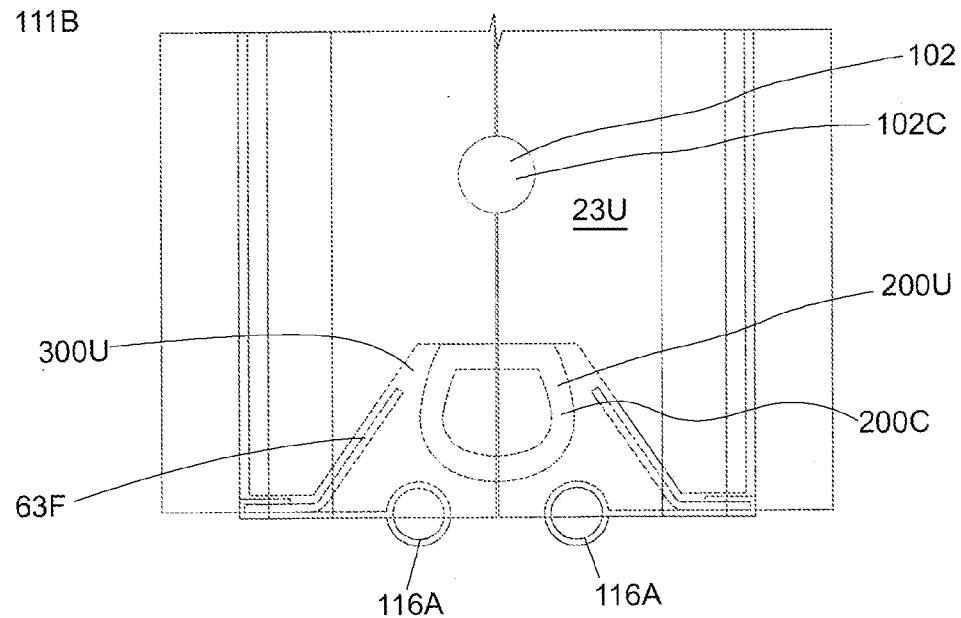
Figure 6B:
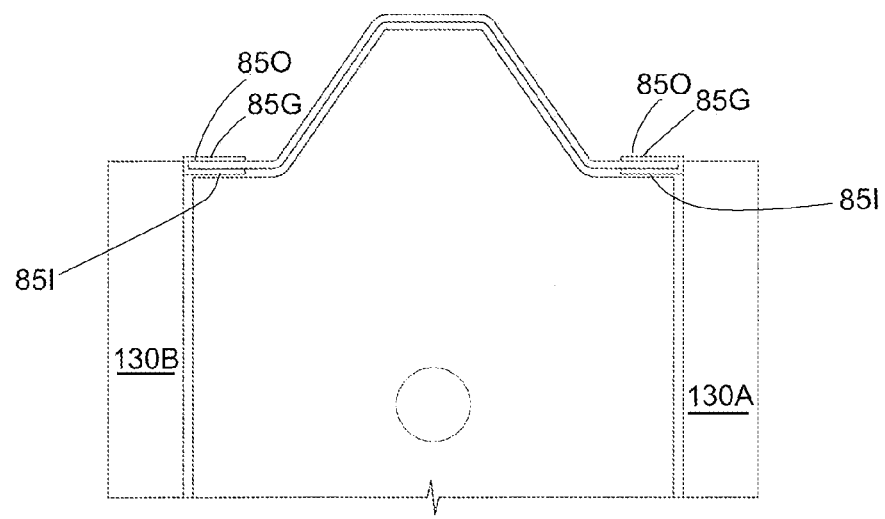
FIG. 6B is the top view of the embodiment the acoustic panel shown in FIG. 6A but with the gasket of the upper drop seal removed to better show various portions of the panel that are covered, or partially covered, by the gasket of the upper drop seal in FIG. 6A.
Figure 6B:
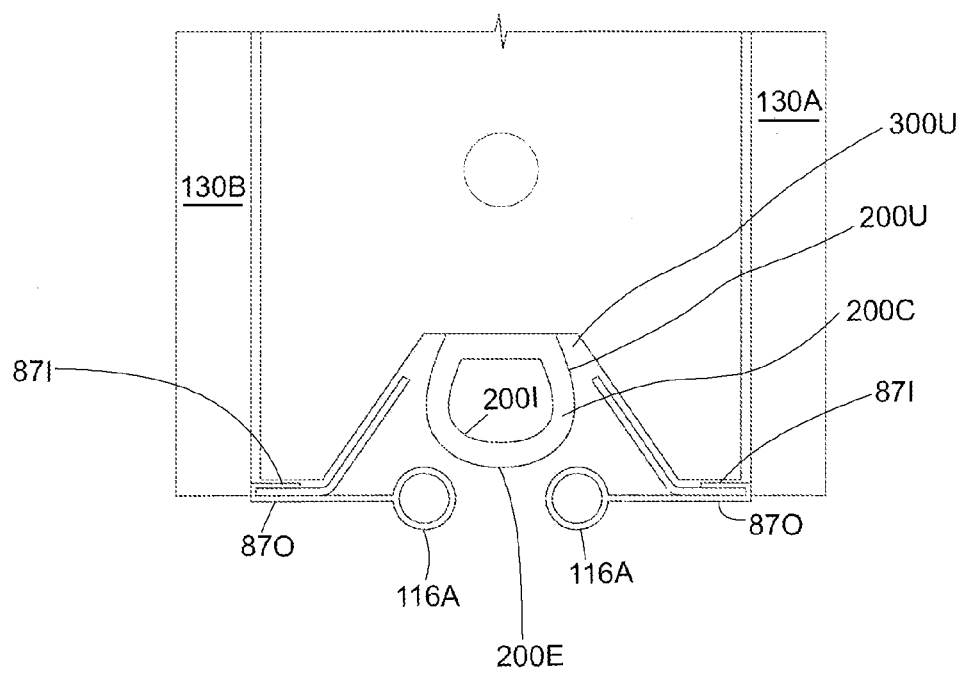

Since the upper gasket 200U is easily seen in FIG. 6B, it merits returning to FIG. 6B to look at its uncompressed shape—i.e., before its compressed shape(s) in FIGS. 9A-9D is discussed further. (It should be self-evident that what is said in this entire document about the lower gasket 200L is, at least for the most part, true for the upper gasket 200U—and vice versa—though, common sense should always prevail in light of all of the figures and discussions included herein. Moreover, some embodiments of the invention only include the lower gasket or the upper gasket, but not both. And, some include (a) the inner gasket 116A or (b) the upper and lower gaskets, but not both.) As can be seen in FIG. 6B, like the inner gasket 116A, the upper gasket 200U is also hollow in some (but not all) embodiments. While it is not exactly circular as shown here, it has an at least partially rounded exterior surface 200E and at least partially rounded interior surface 200I. Though other shapes, such as circles, polygons, triangles, etc. are used in other embodiments for the upper 200U and/or lower gasket 200L (rather than the horseshoe or letter 'D'-like shape of FIG. 6B), rounded shapes (such as the horseshoe shape depicted in FIG. 6B) tend to be able to, when compressed (e.g. by the male end of a second panel) change shape relatively easily, which helps the upper gasket 200L at least partially fill in/block the passage 99 between two mated panels (of a partition) and/or the lower passage 99U (where the lower gasket 200L would, of course do the same with respect to the lower passage 99L instead, as shown in FIG. 9B). This idea, as well as other aspects of the lower/upper gaskets 200L/200U, will be explained further in the figures below. For example, because the lower gasket is hollow and compressible, the letter 'D'-like shape of the lower gasket 200L becomes more (roughly speaking) letter 'C'-shaped when the two panels are interfaced (e.g., as shown in FIGS. 9A and 9B). In some embodiments, like the one shown in FIG. 6A/6B, the lower gasket 200L is also flexible and resilient; in other embodiments, it is just flexible. While the thickness of the upper gasket 200U (i.e., its outer perimeter relative to its inner perimeter) is shown to be thicker than each of the tubes 166B, 166C (i.e., each of their respective outer perimeters relative to each of their respective inner perimeters) of the inner gasket 166A in FIG. 6D, the thickness of the tubes 166B, 166C could be equal or greater than that of the upper gasket 200U in other embodiments.

Moreover, in some but not all embodiments, when the upper and lower gaskets 200U, 200L of the embodiments shown in FIGS. 1A and/or 1B are compressed as the two panels interface, at least some of the air inside the passage 99 is at least partially exited through the bottom 200B of the lower gasket 200L and at least partially at the top 200C of the upper gasket 200U. Also, in some embodiments, when the panels 10A, 10B are interfaced, a first inner surface 201I of the lower gasket 200L becomes adjacent to/touches a second inner surface 202I of the lower gasket 200L, as depicted in FIG. 9A. In additional embodiments, the touching of the two inner surfaces 200I, 202I results in suction between them. Again, though the upper gasket 200U is not shown in FIG. 9A or 9D, the same occurs with respect to the upper gasket 200U in these embodiments; though, it does not occur in some other embodiments.

FIGS. 9A, 9B, and 9C represent cross-sectional views of the pair of panels, i.e., the partition 169, depicted in FIG. 3B. (Likewise, FIG. 9D depicts the partition 169D shown in FIG. 3C; and, most but not all, as mentioned various times, of what is discussed with respect to the partition 169 applies to the non-perforated panel 169D.) Among other things, the compression of the various components shown implies that some force has brought the male end 63M of the first panel 10A and the female end 63F of the second panel 10B together, such that the panels have formed an interface (as defined above). In some cases, the force is human force, and in other cases it is mechanical and/or electrical; though, it could be any force, as will commonly be understood by those skilled in the art. Further, as will also be commonly understood, the weight of each of the panels is typically sufficient such that once the panels are appropriately interfaced they will not readily drift apart in most embodiments. That said, in other embodiments, a component or device (not shown) is employed to keep the two panels appropriately interfaced, as further will be commonly understood by those skilled in the art.

With respect to the male end 60M of the first panel 10A, and as discussed above, the force applied in interfacing/partitioning the two panels results in the outer male damping element portion 85O applying force/pressure to one side of the male element 63M and the male inner damping element portion 85I applying force/pressure to the other side of the male element 63M, which perhaps can be best visualized in FIG. 9C. (Moreover, as mentioned above, the fact that the male bracket 25A essentially backs the inner damping element 85I helps keep the inner damping element 85I in place, which helps it effectively apply pressure to the male element 63M. As will be self-evident from that same figure and therefore will not be discussed in detail, the same is true with respect to the female element 63F, relative to the outer and inner female damping element portions 87I, 87O and the female bracket 25F. It should also be remembered that the fasteners 25Q, 25R discussed above also apply damping element pressure to the respective male and female members 63M, 63F, vis-à-vis the respective damping elements, as described above.) In any event, with regards to FIG. 9C (though the damping elements are depicted in FIGS. 9A and 9D as well), vibration, for example from a sound 59A on one side 99A of the passage 99, that the male element 63M experiences will be damped by the male damping element 90M so that an attenuated sound/vibration 59B results on the other side of the passage 99B. In other words, by applying pressure/force to two (e.g., opposite) sides of the male element 63M, vibration (e.g., from sound) is reduced by the damping elements 85I, 85O, and thus sound 59A is attenuated by the time it reaches the other side of the panel as the attenuated sound 59B. Since the same thing occurs with respect to the female side, the attenuate sound symbol 59B is meant to depict the sound that has been attenuated by the female damping element 90F as well; though, in some other embodiments only the male element 63M or the female element 63F performs such damping, not both.

More generally, it should also be underscored that the attenuated sound symbol 59B in this FIG. 9C reflects any and all attenuation/mitigation of sound that is accomplished in the passage 99 region—whether by mitigating air flow as a result of one or more of the gaskets, by vibration mitigation of the damping elements, and/or the sound attenuation through the perforated region (which are discussed further below). In some embodiments, only one of these occurs; in some two of these occurs; and in some (like FIG. 3C) all three occur. Additionally, the mitigated signal symbols shown in FIGS. 9C and 9D also reflect the damping effect of the membrane 150, which is discussed in more detail below. In regards to FIG. 9D, the sound source 59D is attenuated to achieve an attenuated sound 59E just like FIG. 9C, except there is no sound attenuation through the perforated region because FIG. 9D depicts the non-perforated partition 169D. That said, in light of the suction effect (described below) it is likely that there is even less air flowing through the passage 99D of FIG. 9D. (It should be noted that while fastening elements 25R, 25Q are not depicted in FIG. 9D, they are implied there; i.e., since they are shown in FIG. 9C, and FIG. 9D is exactly the same except for not having the perforations of the two panels 10 depicted in the partition 169 of FIG. 9C.)

The above discussion should also be considered in view of the fact that some embodiments of the panel 10 have metal frames, e.g., cold rolled sheet or aluminum as non-limiting examples, which are good transmitters of vibration (e.g., vibration related to sound). Accordingly, in some embodiments the damping elements 90M, 90F are made of neoprene, rubber, or any other material(s) or combination of materials with damping abilities/characteristics that would enable the damping elements 90M, 90F to serve as a vibration/energy sink. In some embodiments, each of the damping elements 90M, 90F is capable of decreasing (and does decrease) the amplitude of the vibration transmitted from a first side 63A, 63B of the element to a second side 63Y, 63Z of the element by potentially roughly 90%. That said, the amount of vibration damping depends on the pressure applied by the damping elements against the panel's structural frame and the material of the damping element, among other potential factors. Accordingly, the damping mitigation could range from 0.1% to 90% or more; though, these numbers are not intended to be limiting.

In light of the above, it is worth emphasizing that each of the damping elements 90M, 90F (or other damping elements mentioned related to FIGS. 7B and 7C) function to damp vibration when it is applying some force/pressure to the transmission component—e.g., the male element 63M, the female element, 63F, and the male bracket 25A (in FIGS. 7B and 7C embodiments). If the damping element (e.g., 90M, 90F) is simply touching the transmission component (e.g., 63M, 63F) but not pressed against it (or vice versa), the damping element will change the frequency of the vibration but not necessarily damp (i.e., reduce) its amplitude, as is commonly understood to those skilled in the art.

In addition to its vibration damping abilities, as mentioned above the outer male damping element 85O also functions as the outer gasket 85G; and, the outer female damping element 87O likewise functions as the outer gasket 87G; though in other embodiments they are at least partially separate or distinct components. In this light, the formation of the interface 199 implies that the male and female gaskets 85G, 87G are positioned adjacent to each other, which further implies that the flow of ambient air through the passage 99 is at least partially blocked (e.g., at both ends of the passage 99A, 99B). In other words, the male and female gaskets 85G, 87G cooperate and function as a single gasket 86—which in some but not all embodiments, includes a first side 86X (which includes male gasket part 85X and female gasket part 87X) and a second side 86Y (which includes male gasket part 85Y and female gasket part 87Y)—to limit air from entering (and/or leaving) the passage 99 of the panels 10A, 10B. (As mentioned in other portions of this document, some alternative embodiments only include a male gasket 85G; likewise, in additional embodiments the male gasket includes one part, rather than two distinct parts 85X, 85Y.)

Additionally, when the two panels 10A, 10B form the partition 169, the inner gasket 116A is compressed. Accordingly, each of the pair of compressed tubes 116B, 116C that longitudinally extend along the passage 99—i.e., each of the tubes 116B, 116C extend from slightly above the top 5T of the panel's body 5 to slightly below the bottom 5B of the panel's body—serve as a further obstacle to the passage of air (or anything else, like other gasses or even liquids in some embodiments) from one side 99A of the passage 99 to the other side 99B.

Similarly, the upper gasket 200U (which is not shown in FIG. 9) and the lower gasket 200L each compress when the interface is formed; this accomplishes at least one of, and in some embodiments, several things. For example, in some embodiments, at least one of the following occurs: a portion of each of the gaskets 200U, 200L at least partially seals the passage 99; the upper gasket 200U at least partially seals the upper passage 99U; and, the lower gasket 200L at least partially seals the lower passage 99L—where in the embodiment shown in FIG. 9A, all three of these occur. In fact, the latter two seals are particularly useful since the tubes 116B, 116C of the inner gasket 166A do not extend much above or below the panel body 5, the outer gaskets 85G, 87G do not extend above or below the panel body 5, and (in some but not all embodiments) each of the respective distances (a) between the upper drop seal 20U of the first panel 10A and the upper drop seal 20U of the second panel 10B and (b) between the lower drop seal 20L of the first panel 10A and the lower drop seal 20L of the second panel 10B is greater that the distance between the male member 63M of the first panel 10A and the female member 63F of the second panel 10B. Further, while FIG. 9B depicts the shape of the lower gasket 200L in the region of the lower drop seal 20L, it will be self-evident that the appearance of the upper gasket 200U will be similar in the region of the upper drop seal 20U.)

As mentioned above, FIG. 9C also depicts what happens to at least some of the sound/acoustic energy (traveling by air) that manages to enter the passage 99, e.g., despite the presence of the one or more (inner 116A and/or outer 85G, 87G) gaskets in embodiments that include such gaskets (since some embodiments of the panel do not include any gaskets of any sort). More specifically, via FIG. 9C one can easily envision the entered air/sound leaving the passage 99 via (the one or more perforations 80P in each of) the perforated sections 80M, 80F (of the male and female members 63M, 63F). In other words, each of the one or more perforations 80P that make up the perforated sections 80M, 80F is essentially a channel/hole by which sound can flow out of the passage 99. In some embodiments, the air flows both out of the passage 99 and into one or more of the panels 10A, 10B. (In some embodiments, air can also flow from inside one or more of the panels 10A, 10B and into the passage 99.) As shown in FIG. 9C, this is true with respect to both panels 10A, 10B. Further, in some but not all embodiments, (at least one of) the two interfaced panels 10A, 10B include the sound-absorbing material 115, and accordingly the sound/acoustic energy that flows through the perforated sections 80M, 80F thus flows into the insulation/insulated area 115, via air, and is at least partially absorbed there. Preferably, each of the male and female members includes a respective perforated section 80M, 80F, but in other embodiments only one of the two members (i.e., the male or female member but not both) has a perforated section. (To repeat, in general, but not always, the discussions herein about air imply sound. As is generally understood, sound can travel by air, but sound is different than air. For example, when air/sound pass through the perforated sections 80M, 80F most of the sound will be absorbed, though potentially the air may flow back into the passage 99.)

While the size, shape, and number of perforations 80P can vary, in some embodiments the perforations are roughly between 1 mm and 8 mm in width, though they can range from 0.5 mm to 12 mm and still be quite effective. In fact, smaller and greater widths are possible in additional embodiments, and the dimensions provided are not meant to be limiting in any way. Additionally, if the percentage of the perforated sections 80M, 80F that is actually perforated (i.e., is a perforation 80P) reflects at least 30% of (the area of) the perforated section, a broad band absorption (with respect to the audible spectrum) is achievable by the absorptive material.

That is, when there is roughly more than a 30% 'hole to non-hole' ratio, the area of the perforated section (e.g., 80M, 80F) is almost sound transparent, and thus the absorption, vis-à-vis the absorption material 115 behind the holes 80P, is a broad band one. On the other hand, when the design calls for addressing a problematic frequency range, one can design the size of holes to take into account various factors like the size, shape, and number of holes 80P, the volume of insulation 115 that the air/sound will encounter after flowing through the holes/perforations, and/or the thickness of the perforated material, for example, in order to tune the specific frequency range of interest.

In other words, the size, shape, and/or number of the perforations can be designed to meet the expected wavelength of sound that is expected in the passage 99 and/or not being sufficiently mitigated by other aspects of the partition; and, those skilled in the art will know how to 'tune' the perforated section(s) to appropriately target various wavelengths. Accordingly, with reference to FIG. 9C, a sound wave (traveling by air) that originates on a first side 169A of the partition 169 and manages to get past the outer gaskets 85X, 87X and the first (of the two) tube(s) 116B is attenuated by the perforated sections 80M, 80F. The sound attenuated by the perforated sections (or section in embodiments that only have one) then must still somehow pass by the second tube 116C and the outer gaskets 85Y, 87Y to make it to the second side 169B of the panel 169. (As a reminder, in some embodiments the damping elements 90M, 90F are also simultaneously working to mitigate the vibration of sound from the first side 169A of the partition 169 to minimize the attenuated sound at the second side 169B.) In other words, any residual sound 59B that 'survives' this journey (so to speak) will be significantly smaller compared with the original sound 59A. In some embodiments, the attenuated sound 59B is 90% less than the original waveform 59A. In other embodiments and under various scenarios, the percentage can be even greater or may be less; partly, it depends on the frequency being targeted. (Moreover, what has been explained to occur from the first side 169A of the partition 169 with respect to the second side 169B of the partition 169 also occurs in a vice-versa manner with respect to sound that originates on the second side 169B of the partition; that is, it too is attenuated with similar efficiency before arriving on the first side 169A of the partition 169.)

In order to impede the flow of air and thus sound traveling by air (where, generally speaking, when this document speaks of air it is generally meant to specifically imply sound traveling by air, and sometimes will be described as 'air/sound' or 'sound/air') between the body 5 of the panel 10 and the floor (or other surface) and between the body 5 of the panel 10 and the ceiling (or other surface)—and thereby impede the flow of sound from the first area 111A on one side of the panel 10 to the second area 111B on the other side of the panel—the panel 10 includes the upper and drop seal 20U and lower drop seal 20L. While FIGS. 10A and 10B depict the lower drop seal 20L, the upper drop seal 20U is essentially identical in design; thus, the discussion herein concerning the lower drop seal 20L, at least for the most part, applies equally to the upper drop seal 20U. FIG. 15 shows the upper drop seal 20U, though it is not discussed in detail.

Moreover, the main difference between FIGS. 10A and 10B is that the former shows the drop seal in a retracted position and the latter shows the drop seal in an extended position, as discussed earlier. The drop seal 20L is thus movable (and moves) with respect to at least two cavities in embodiments that include both the outer cavity 450O and the inner cavity 450I, as depicted in FIGS. 10A and 10B. That said, in other embodiments, the drop seal 20L is moveable (and moves) with respect to at least one cavity—that is, the outer cavity 450O in embodiments that do not include the inner cavity 450I, or the inner cavity 450I in embodiments that do not include the outer cavity 450O. Before moving on, it should be noted that the insulation hatch lines are not shown in FIG. 10B simply for ease of viewing; however, the insulation 544I is in the same location in FIG. 10B as is shown in FIG. 10A, and is so marked on FIG. 10B.

Figure 12:
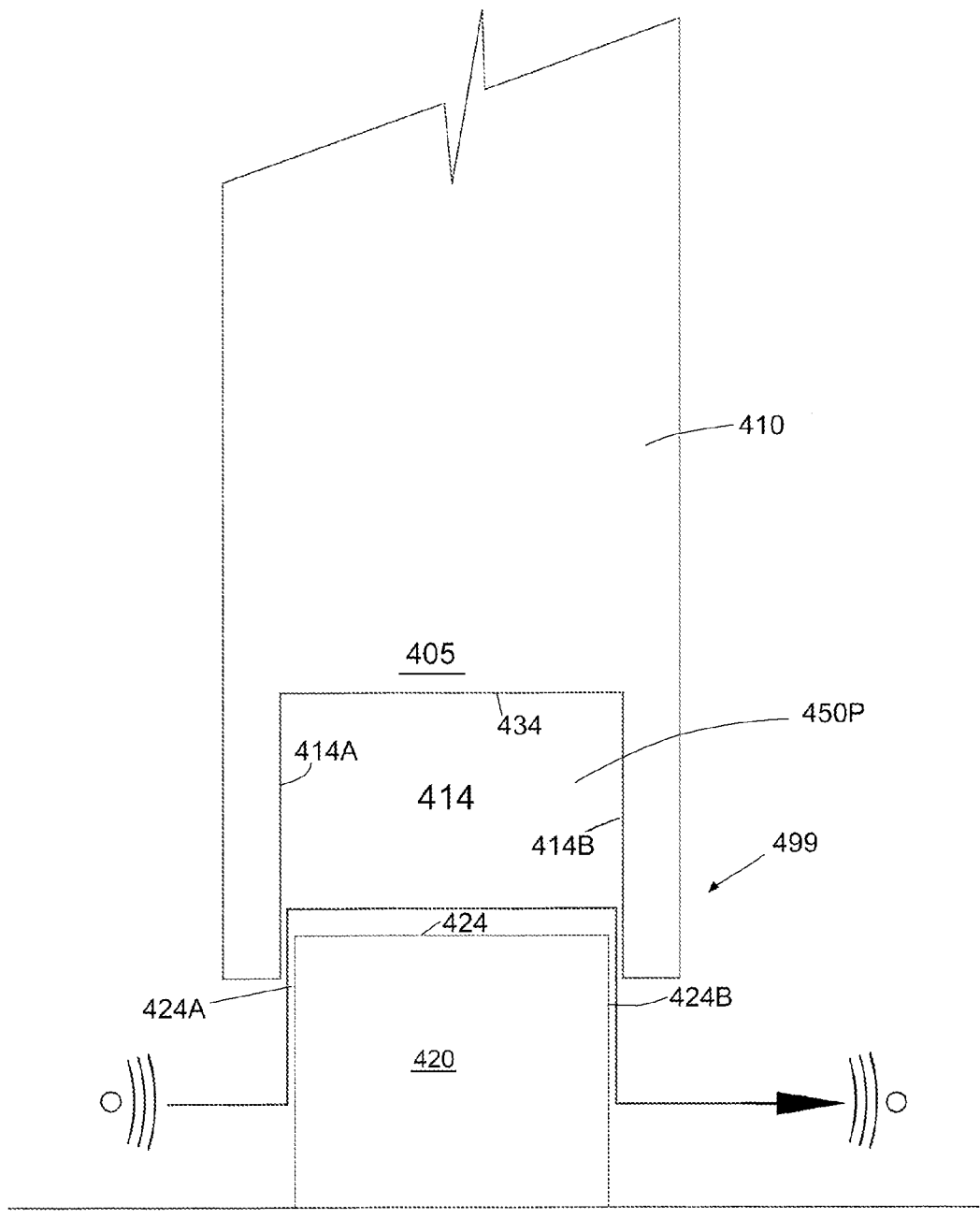
FIG. 12 is a front view of a prior art drop seal of a prior art acoustic panel.

The cross-sectional view of the drop seal 20L shown in FIGS. 10A and 10B differ from prior art, such as the prior art panel 410 and prior art drop seal 420 depicted in FIG. 12, in various ways. As can be seen in FIG. 12, when the prior art drop seal 420 is extended (as shown) to attempt to limit the flow of air between the drop seal 420 and the floor, a passageway 414 opens, or opens much further, between the drop seal 420 and the body 405 of the panel 410. Clearly, the passageway 414 allows air to flow relatively unobstructed between the drop seal and the panel via the passageway/gap 414 when the drop seal 420 is extended—which is exactly when the prior art drop seal 420 is supposed to be preventing air from flowing from one side of the panel 410 to the other. In contrast, the design of the drop seal 20L disclosed herein and/or its relationship with (other parts of) the panel 10, tend to minimize (both generally and relative to prior art) the opportunity for air (and thus sound) to travel between the drop seal 20L and the body 5 of the panel 10. Again, it should be self-evident that all that is discussed (or at least most of what is discussed) herein with respect to the lower drop seal 20L applies to the upper drop seal 20U as well, i.e., in embodiments that include two drop seals 20L, 20U (since some embodiments only include one drop seal.)

Comparing the prior art drop seal 410 with the lower drop seal 20L, FIG. 12 shows that part of the prior art passageway/gap 414 is defined by an upper surface 424 of the prior art drop seal 420 and another portion of the passageway 414 is defined by an upper surface 434 of a cavity 450P in which the prior art drop seal resides and relative to which the drop seal 420 retracts and extends. Among many other differences, the drop seal embodiment 20L depicted in FIGS. 10A and 10B does not have any upper surface like the upper surface 424 of the prior art drop seal 410. Rather, the drop seal 20L is generally concave with respect to the cavity 450O within the panel body 5.

Additionally, in contrast to the uninterrupted upper surface 434 of the cavity 450P in FIG. 12, FIGS. 10A and 10B depict an upper surface 524 of an outer concavity 450O, within which the drop seal retracts and extends, that is interrupted (so to speak) by a first inner cavity member 586A and a second inner cavity member 586B, which define an inner cavity 450I. Thus, unlike the prior art panel 410 where air can flow along the upper cavity surface 434 freely, air/sound thus is unable to flow along the upper surface 524 of the outer cavity 450O without encountering any obstacles—e.g., the first and second inner cavity members 586A, 586B. [The arrowed line in FIG. 12 is merely meant to show the path of air/sound flow in very general terms; it is not meant to be limiting in any way, as should be commonly understood by those skilled in the art.]

Beyond these differences, since the prior art drop seal in FIG. 12 is 'closed' (e.g., not concave with respect to the cavity 450P) even if sound insulation were to be placed inside the prior art drop seal 410 it would have no effect. In sharp contrast, the insulation 544I that is placed inside the drop seal 20L of FIG. 10B will encounter sound, and will be at least partially absorbed by it. While some embodiments do not include insulation, the embodiment shown in FIG. 10B—which has an 'open' drop seal 20L with respect to the outer cavity 450O—allows for insulation to be placed in it and assures any air/sound that attempts to travel between the drop seal 20L and the panel body 5 (from one side of the panel 10 to the other) will encounter the insulation 544I.

More generally, but also in contrast to the prior art drop seal-panel interface 499, an interface 599 of the drop seal 20L with the body 5 (which includes the outer cavity 450O and inner cavity 450I) of the panel 10 has sort of a labyrinth-like configuration. The term 'interface' in this context is referring to the portions of the drop seal and panel body that are adjacent to one another (where in some cases they are touching and, if not, they are near each other). The various sections of the labyrinth will be discussed below.

More specifically, the drop seal 20L has a first drop seal member 555 and second drop seal member 557 that each respectively interface/engage—by moving at least partially in and/or moving at least partially out of/away from—with each with a first slot 566A and a second slot 566B of the panel 5. The first slot 566A is defined by an inner surface 573A of a first outer cavity member 576A (e.g., associated with the panel body 5, such as the first outer layer 130A as shown) and an outer surface 583A of a first inner cavity member 586A (e.g., associated with the panel body 5). In turn, the second slot 566B is defined by an inner surface 573B of a second outer cavity member 576B (e.g., associated with the panel body 5, such as the second outer layer 130B as shown) and an outer surface 583B of a second inner cavity member 586B. In other words, the outer cavity 450O is defined by the inner surface 573A of the first outer cavity member 576A and the inner surface 573B of the second outer member 576B; and, the inner cavity 450I is defined by the inner surface 583I of the first inner cavity member 586A and the inner surface 583J of the second inner cavity member 586B.

In some embodiments, the engaging/interfacing of the two drop seal members 555, 557 with respect to the two slots 566A, 566B is a 'slideable' engaging/engagement. By 'slideable' it is meant that one or more of the surfaces associated with the two drop seal members 555, 557 slide along—which is meant to imply at least some touching—one or more of the counterpart surfaces associated with the two slots 566A, 566B. In other embodiments, a plurality of the surfaces associated with the two drop seal members 555, 557 slide along a plurality of the counterpart surfaces associated with the two slots 566A, 566B. In still further embodiments, all of the surfaces associated with the two drop seal members 555, 557 slide along a plurality of the counterpart surfaces associated with the two slots 566A, 566B. (In other embodiments, the interfacing/engaging occurs without any touching.)

Accordingly, in some embodiments this means that an outer surface 5550 of the first drop seal member 555 touches (at least a portion of) the inner surface 573A of the first outer cavity member 576A as the drop seal 20L moves from the retracted position 40R (shown in FIG. 10A) to the extended position 40F (shown in FIG. 10B) and/or vice versa. As another example, it means that the inner surface 555I of the first drop seal member 555 touches (at least a portion of) the outer surface 583A of the first inner cavity member 586A as the drop seal 10L moves from retracted to extended positions and/or vice versa. In further scenarios, it means that the first drop seal member 555 touches (at least a portion of) both adjacent surfaces 573A, 583A as the drop seal 20L moves from retracted to extended positions and/or vice versa. In yet other cases, it means that first drop seal member 555 touches at least one of its adjacent surfaces 573A, 583A and the second drop seal member 557 touches at least one of its respective adjacent surfaces 573B, 583B as the drop seal 20L moves from retracted to extended positions and/or vice versa. And, in additional cases the two drop seal 20L members 555, 557 touch surfaces 573A, 583A and 573B, 583B respectively as the drop seal 20L moves from retracted to extended positions and/or vice versa.

Another way of looking at the relationship of the slots 566A, 566B and drop seal 20L is that in some embodiments at least one of the two slots 566A or 556B (at least partially) restricts the movement of the drop seal 20L; and, in other embodiments each of the two slots 556A and 556B restricts the movement of the drop seal 20L. In some embodiments, the restriction (by either one or both slots) limits the movement of the drop seal 20L towards the first side/face 110A of the panel 10; in other embodiments, the panel's movement towards the second side/face 110B of the panel 10 is restricted; and, in additional embodiments the drop seal's 20L movement is restricted in both directions. In some of these various embodiments and/or other embodiments, the first inner cavity member 586A restricts the drop seal from moving towards the second side/face 110B of the panel 10; in others the second inner cavity member 586B restricts the drop seal 20L from moving towards the first side/face 110A of the panel 10; and, in yet others the first inner member 586A is restricting the drop seal from moving towards the second side/face 110B of the panel 10 and the second inner member 586B is restricting the drop seal 20L from moving towards the first side/face 110A of the panel 10. Likewise, in some embodiments, the first inner cavity member 586A can be viewed as guiding the drop seal as it moves from retracted to extended positions and/or vice versa; in additional embodiments, the second inner cavity member 586B can be viewed as guiding the drop seal as it moves from retracted to extended positions and/or vice versa; and in yet further embodiments, each the first inner cavity member 586A and the second inner cavity member 586B can be viewed as guiding the drop seal as it moves from retracted to extended positions and/or vice versa.

In light of the design/configuration described above, in order to travel from the first side 111A of the panel 10 to the second side 111B of the panel 10 by passing between the drop seal 20L and the panel body 5, a sound wave 599O (that travels through air) must make it from a beginning 599B of a labyrinth 579 of channels to an end 599E of the labyrinth 579. In other words, the sound 599O must travel through (a) a first channel 599A between the outer surface 5550 of the first drop seal member 555 and the inner surface 573A of the first outer cavity member 576A, (b) a second channel 599B between the inner surface 555I of the first drop seal member 555 and the outer surface 583A of the first inner cavity member 586A, (c) an area/region 544R containing the sound insulation 544I (that in some embodiments is between the drop seal 20L and the inner cavity 450I, though in embodiments without the inner cavity 450I the insulated area 544 is between the drop seal 20L and the outer cavity 450O; and, in other embodiments that do not include insulation 544I the area 544 does not have insulation), (d) through a third channel 599C between the inner surface 557I of the second drop seal member 557 and the outer surface 583B of the second inner cavity member 586B, and (e) through a fourth channel 599D between the outer surface 5570 of the second drop seal member 557 and the inner surface 573B of the second outer cavity member 576B—or vice versa if the air/sound is flowing in the other direction—in order for any residual sound 599R to make it to the other side (with respect to the side from which the air/sound originated). For self-evident reasons, it is generally best for the tolerances between the various adjacent surfaces each that make up the labyrinth be minimized since smaller tolerances permit less air to move through the channels and/or slow air speed.

Beyond the number of channels described above, it is clear that their alignment relative to each other also plays a role mitigating the flow of air/sound. In contrast to the prior art drop seal-panel interface 499 shown in FIG. 12, it is also clear that the that total distance the air/sound must travel to pass through the drop seal-panel interface 599 in FIG. 10B is almost twice the distance air/sound would need to travel to pass through the prior art drop seal-panel interface 499 (assuming drop seals of comparable dimensions), not to mention that in some embodiments (like FIG. 10B) the air/sound is forced to travel through the insulation region 544R.

Accordingly, another way of looking at the path air/sound must take in FIG. 10B is that the air/sound 599O starts off in a first direction in the first channel 599A, changes its course (essentially 180 degrees) a first time to move in a second direction in the second channel 599B, changes its course a second time move in a third direction (which is likely not a straight line) from an exit 699E of the second channel 599B to an entrance 699F of the third channel 599C, changes its course a third time to move in a fourth direction in the third channel 599C, and changes its course (essentially 180 degrees) a fourth time to move in a fifth direction in the fourth channel 599D, before leaving the fourth channel 599E at an exit of the fourth channel 599D. It also should be pointed out that above the first drop seal member 555 (where the sound changes its course 180 degrees for the first time) and above the second drop seal member 557 (where the sound changes its course 180 degrees for the second time) are two respective 'dead end' regions 551A, 551B—each of which includes at least a dead end surface 552A, 552B that are respectively associated with the first slot 556A and second slot 556B—which, in essence, help force the air/sound to change direction.

In other words, when the drop seal 20L is moved from its retracted position to its extended position, the first drop seal member 555 is moved partially out of the first slot 566A and the first dead end region 551A—which is defined by the first dead end surface 552A, a portion of the inner surface 573A of the first outer cavity member 576A, and a portion of the outer surface 555O of the first inner member 555—grows until the drop seal 20L is in its extended position. (Likewise, the same is true with respect to the second dead end region 551B, and its defining surfaces will be apparent from FIGS. 10A and 10B.) Comparing FIG. 10A with 10B, it is clear how the dead end region 551A is larger in the figure that depicts the extended drop seal, namely FIG. 10B.

In yet other words, the inner cavity 450I resembles an upside-down somewhat 'U'-shaped concavity-which is partially embodied by the two inner cavity members 586A, 586B, outside of which there is a somewhat 'U'-shaped drop seal 20L. In the embodiment shown in FIGS. 10A and 10B, a portion of the panel (i.e., outer members 576A, 576B) partially defines a third somewhat (upside-down) 'U'-shaped structure that is on the outside of the 'U'-shaped drop seal 20L. Moreover, in some embodiments, like the one shown in FIGS. 10A and 10B, it can be said that the relationship between the drop seal and the panel body is one where the drop seal is able to move, and does move, essentially telescopically.

In fact, some embodiments of the invention do not include any inner cavity members 568A, 586B. In such embodiments, the drop seal's 20L movement is merely restricted and/or guided by the walls 573A, 573B of the cavity 450O. In other words, in such embodiments, there are no slots 566A, 566B and the members 555, 557 of the drop seal move relative to the walls 573A, 573B of the cavity 450O. In any event, in most embodiments the distance between the upper surface (e.g., 552A, 552B) of the cavity 450O and the inner bottom surface 521 of the drop seal 20L increases when the drop seal is extended from its retracted position into its extended position, and likewise reduced when the drop seal 20L is retracted from its extended position into its retracted position.

In some embodiments, the sound absorption material 544I in the insulation region 544R that is partially defined by the drop seal 20L is compressible, expandable, and/or resilient. For example, in such embodiments, when the drop seal 20L is deactivated/retracted such that the drop seal is (at least largely) positioned inside the panel, the material 544I in the insulation region 544R becomes compressed so that the drop seal can be easily positioned in its retracted position. Likewise, after (or as) the drop seal is activated/extended, the material 544I at least partially expands, at least in some embodiments. Moreover, in some but not all embodiments the insulation 544I in the drop seal 20L is the same type of insulation 115 in the panel body 5.

It may be helpful to highlight the performance achievable by various embodiments disclosed herein. Before doing so, it is worth examining a typical panel-drop seal gap found in prior art, like the one shown in FIG. 12, particularly when two prior art panels are placed next to each other, and each panel is also positioned next to a wall. Visualizing this based on FIG. 12, one will notice that there are two lateral gaps that are respectively between the respective side surfaces 424A, 424B of the prior art drop seal 420 and the respective sides 414A, 414B of each of the two the panels' 410 cavities 450P—where each is typically about 0.2 cm all along the length of each panel. Also, while not shown in FIG. 12, when two panels are placed next to each other, there is a 'panel-to-panel space' and two 'panel-to-wall' spaces that are all roughly 0.4 cm wide by 5 cm high, with respect to each of the upper and lower sections of the panel. Even more specifically, in a partition of two prior art panels there would be six gaps—two gaps respectively between the extended upper and lower drop seals, and four more gaps respectively between the two panels and the two end walls that equal roughly 12 cm2 (i.e., six gaps that are each roughly 5 cm×0.4 cm). There would also be a lateral gap related to the bottom drop seal that alone would equal about 96 cm$^2$ (i.e., with 2 panels of 120 cm width, the lateral bottom leak area along the panels is 240 cm times 0.2 cm, and the top leak also is 240 times 0.2 cm). Finally, there would also be a gap between each of the mated upper and lower drop seals, which would be roughly 110 cm2.

In comparison to such examples of prior art drop seals, some embodiments of the invention are thus much more effective in minimizing transmission losses/sound leakage. For example, when the prior panel of FIG. 12 and the embodiment shown in FIG. 10B each configured as two-panel partitions with respective dimensions in accordance with minimum standards of ASTM E90-09—i.e., an area of 2.40 meters by 2.40 meters (i.e., 57600 cm$^2$)—the prior art partition yields a sound leak of at least 0.002%. In contrast, the panel depicted in 10B has a relatively insignificant, or a much smaller leak, by comparison (as further explained below).

It is commonly understood that the impact of sound leaks on transmission loss (TL) is related to overall TL of the partition (or panel). That said, a non-limiting example is included here simply to illustrate how much of an impact the above-mentioned difference can make in certain scenarios. Specifically, if both the prior art partition and the partition 169 (or 169D) respectively had an 'ideal' TL (i.e., assuming zero leaks) of 60 dB, the 0.002% sound leak resulting from the various gaps inherent in the prior art drop seal's design (i.e., collectively in each of the two panels in the prior art partition) would reduce its TL to roughly 48 dB. In contrast, the elimination or near elimination of sound leaks of the partition 169D, which reflects the better design of the drop seals 20L, 20U disclosed herein, would render a TL of 57 dB (based on almost zero or very minor leaks) which would make the partition 169 (or 169D) roughly 9 dB more effective. When one considers that a TL increase of 10 dB is equivalent to reducing the volume of perceived sound by 50%, the design of the panels/partitions disclosed herein has significant practical impact.

Moreover, whatever TL improvement is achievable over prior art drop seals depicted in FIG. 12 (e.g., 9 dB in the above scenario) can be further improved by roughly 4 dB by a combination of the internal membrane, various gaskets, the vibration dampers on the frames—for a total difference of roughly 13 db. Further, when the perforated sections are added to the comparison, it is possible for the partition 169 to achieve attenuated sound (on the other side of the panel from which it emanates) that is roughly 14 dB less than a typical prior art panel (e.g., as partly reflected in FIG. 12)

Figure 13A:
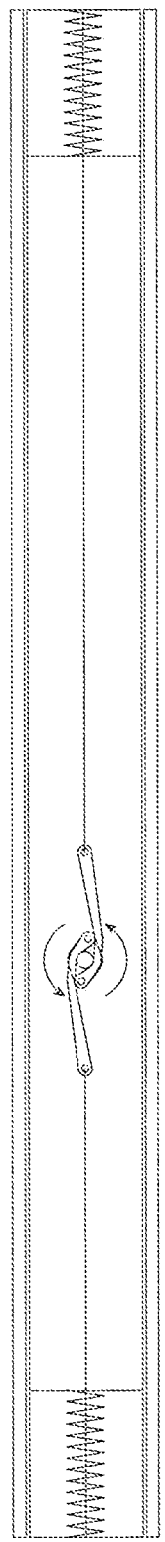
FIGS. 13A and 13B are views of a mechanism used in some panel embodiments and in some partition embodiments, which serves to extend and retract the drop seal(s)
Figure 13B:
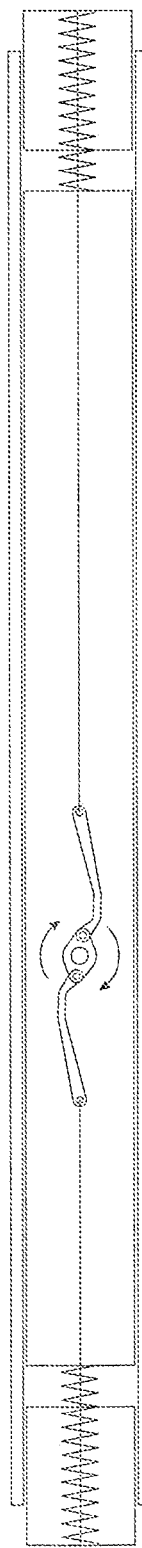

FIGS. 13A and 13B depict an example of a rudimentary mechanism that is used in some panel and/or partition embodiments for raising and lowering the drop seals 20U, 20L. Since such mechanisms are commonly used and known, it will not be discussed in detail; and, in fact, the figures are in a somewhat symbolic/rudimentary style. Moreover, it will be commonly understood that there are many mechanisms, devices, ways, etc. to raise and lower the drop seal(s) known to those skilled in the art, and design and budgetary considerations should guide this choice. Accordingly, the figures of this mechanism were more-or-less merely provided as an illustrative and non-limiting example. As is self-evident from these figures, the spring can be compressed by turning the knob in one direction, and the spring can be released by turning the knob in the other direction.

Figure 14:
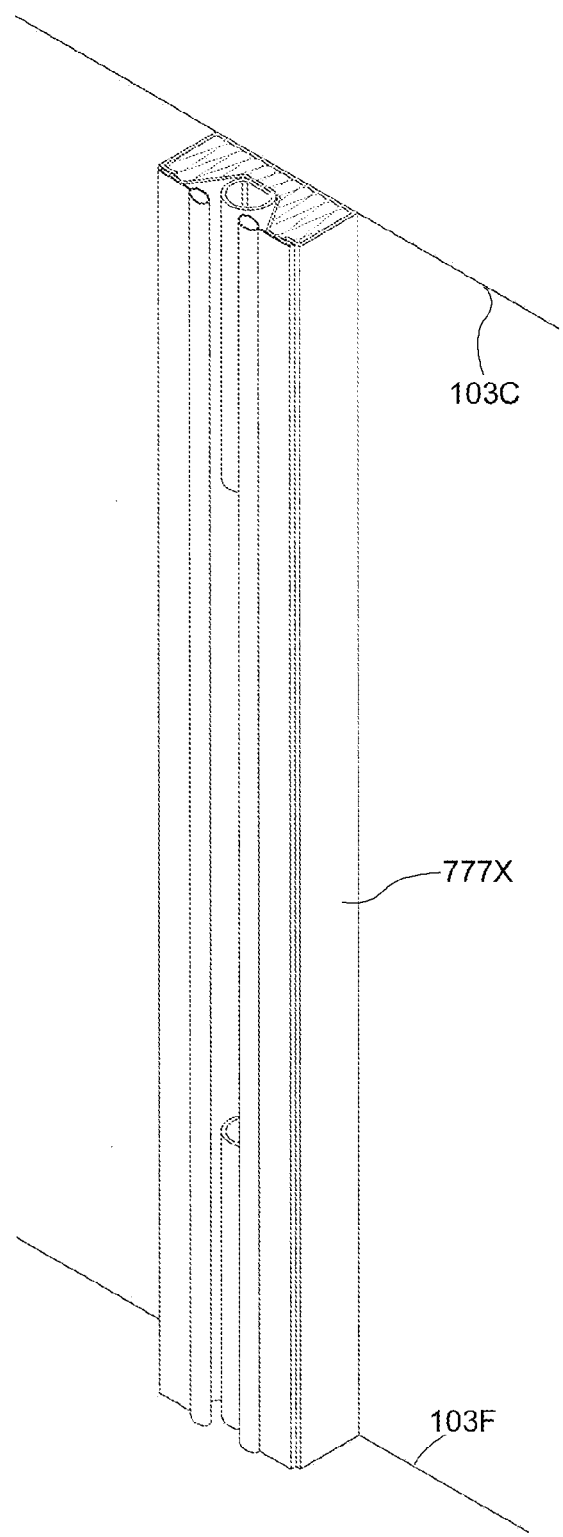
FIG. 14 is a perspective view of an embodiment of a wall interface with which the first/male end of the panel interfaces.

FIG. 14 depicts a wall interface 777X for the panel 10 or 10D, such as to enable the panel 10 or 10D, as well as the partition 169 or 169, to be interfaced with it. As is self-evident, the wall interface 777X is connected to a wall and has an end that resembles the female side 60F of the panel 10. In other embodiments, the wall interface resembles the male end 60M instead. Likewise, the wall interface resembles one of the ends of the non-perforated panel 10D instead in other embodiments.

Finally, the above embodiments are intended to be illustrative rather than restrictive. Accordingly, variations may be apparent to those appropriately skilled in the art without departing from the spirit and scope of the invention/inventions described and/or claimed herein. For instance, alternative panel system, panel, and/or partition embodiments do not connect (directly or indirectly) to the ceiling. For example, some embodiments of the panel connect to the floor, while others are movable by wheels. In yet other embodiments, the panel(s) and/or partition are not readily movable; for instance, the panel 10 (or 10D) may be incorporated into a wall that is not designed to be moved. In some such wall embodiments, the panel does not include the upper or lower drop seals 20U, 20L but does include at least one of the various gaskets (i.e., any number of the gaskets disclosed herein), the perforated section, and/or the membrane.

The invention claimed is:

1. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
   (i) a first panel of the at least two movable panels that includes:
      (a) a first panel body portion that includes:
         (1) a first end of the first panel that includes a first panel member;
         (2) a second end of the first panel; and,
         (3) a first panel sound insulation area between the two ends of the first panel;
      (b) a first panel lower drop seal that is positionable with respect to the first panel body portion; and,
      (c) a first panel upper drop seal that is positionable with respect to the first panel body portion;
   (ii) a second panel of the at least two movable panels that includes:
      (a) a second panel body portion that includes:
         (1) a first end of the second panel;
         (2) a second end of the second panel that includes a second panel member; and,
         (3) a second panel sound insulation area between the two ends of the second panel;
      (b) a second panel lower drop seal that is positionable with respect to the second panel body portion; and,
      (c) a second panel upper drop seal that is positionable with respect to the second panel body portion;
   (iii) a first gasket that includes a first portion and a second portion, wherein the first gasket is connected to one of the two lower drop seals of the two panels;
   (iv) a second gasket that includes a first portion and a second portion, wherein the second gasket is connected to one of the two upper drop seals of the two panels;
   (v) a third gasket that is connected to one of the body portions of the two panels;
   (vi) a fourth gasket that is connected to one of the body portions of the two panels;
   wherein when (a) the two panels are hung between the two surfaces and positioned such that the first end of the first panel touches the second end of the second panel, (b) the first panel lower drop seal is in an extended position relative to the first panel body portion, (c) the second panel lower drop seal is in an extended position relative to the second panel body portion, (d) the first panel upper drop seal is in an extended position relative to the first panel body portion, and (e) the second panel upper drop seal is in an extended position relative to the second panel body portion:
   (vii) the first gasket is positioned such that the first portion of the first gasket is in a lower passage, wherein the lower passage is between the first panel lower drop seal and the second panel lower drop seal;
   (viii) the first portion of the first gasket impedes the flow of the sound wave via the lower passage;
   (ix) the second gasket is positioned such that the first portion of the second gasket is in an upper passage, wherein the upper passage is between the first panel upper drop seal and the second panel upper drop seal;
   (x) the first portion of the second gasket impedes the flow of the sound wave via the upper passage;
   (xi) there is a passage between the first panel member of the first panel and the second panel member of the second panel;
   (xii) the third gasket impedes the flow of the sound wave via the passage;
   (xiii) the fourth gasket impedes the flow of the sound wave via the passage;
   (xiv) the second portion of the first gasket is positioned between the third and fourth gaskets;
   (xv) the second portion of the second gasket is positioned between the third and fourth gaskets; and,
   (xvi) there is a substantially airtight seal that at least partially includes the second portion of the first gasket, the second portion of the second gasket, the third gasket, the fourth gasket, the first panel member of the first panel, and the second panel member of the second panel, wherein the seal at least substantially impedes air from entering an area that is between the first panel member of the first panel and the second panel member of the second panel.

2. The system of claim 1, wherein: when (a) the two panels are hung between the two surfaces and positioned such that the first end of the first panel touches the second end of the second panel, (b) the two lower drop seals are in their respective extended positions, and (c) the two upper drop seals are in their respective extended positions: the area between the first panel member of the first panel and the second panel member of the second panel is a suction area, wherein the suction area is at least partially defined by the second portion of the first gasket, the second portion of the second gasket, the third gasket, the fourth gasket, the first panel member of the first panel, and the second panel member of the second panel.

3. The system of claim 1, wherein: when (a) the two panels are hung between the two surfaces and positioned such that the first end of the first panel touches the second end of the second panel, (b) the two lower drop seals are in their respective extended positions, and (c) the two upper drop seals are in their respective extended positions:
   (i) the second portion of the first gasket touches both the first and second panel members;

(ii) the second portion of the second gasket touches both the first and second panel members;

(iii) the first portion of the first gasket touches both the first panel lower drop seal and the second panel lower drop seal;

(iv) the first portion of the second gasket touches both the first panel upper drop seal and the second panel upper drop seal;

(v) the third gasket touches both the first and second panel members; and, (vi) the fourth gasket touches both the first and second panel members.

4. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
- (i) a first panel of the at least two movable panels that includes:
  - (a) a first panel body portion that includes:
    - (1) a first end of the first panel that includes a first panel member;
    - (2) a second end of the first panel; and,
    - (3) a first panel sound insulation area between the two ends of the first panel; and,
  - (b) a first panel lower drop seal that is positionable with respect to the first panel body portion; and,
- (ii) a second panel of the at least two movable panels that includes:
  - (a) a second panel body portion that includes:
    - (1) a first end of the second panel;
    - (2) a second end of the second panel that includes a second panel member; and,
    - (3) a second panel sound insulation area between the two ends of the second panel; and
  - (b) a second panel lower drop seal that is positionable with respect to the second panel body portion; and,
- (iii) a first gasket that includes a first portion, wherein the first gasket is connected to one of the two lower drop seals of the two panels; and, wherein when (a) the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:

(iv) the first portion of the first gasket is positioned in a lower passage, wherein the lower passage is between the first panel lower drop seal and the second panel lower drop seal;

(v) the first portion of the first gasket impedes the flow of the sound wave via the lower passage;

(vi) there is a passage between the first panel member of the first panel and second panel member of the second panel;

(vii) a third gasket, which is connected to one of the body portions of the two panels via a first connecting member and is positioned in the passage, impedes the flow of the sound wave via the passage;

(viii) a fourth gasket, which is connected to one of the body portions of the two panels via a second connecting member and is positioned in the passage, impedes the flow of the sound wave via the passage;

(ix) a fifth gasket, which is connected to the one of the body portions of the two panels to which the third gasket is connected and which is connected to the third gasket by the first connecting member, impedes the flow of the sound wave via the passage;

(x) the fifth gasket is also a first portion of a first damping element that is able to damp vibration associated with the sound wave in one of the two panel members;

(xi) a sixth gasket, which is connected to the one of the body portions of the two panels to which the fourth gasket is connected and which is connected to the fourth gasket by the second connecting member, impedes the flow of the sound wave via the passage; and, (xii) the sixth gasket is also a first portion of a second damping element that is able to damp vibration associated with the sound wave in one of the two panel members.

5. The system of claim 4, wherein: when the two panels are hung between the two surfaces and positioned such that the first end of the first panel touches the second end of the second panel:

(i) the first connecting member is also a seventh gasket that impedes the flow of the sound wave via the passage; and, (ii) the second connecting member is also an eighth gasket that impedes the flow of the sound wave via the passage.

6. The system of claim 4, wherein: (a) when the two panels are hung between the two surfaces but (b) prior to the two panels being positioned such that the first end of the first panel touches the second end of the second panel:

(i) neither the third gasket nor the fourth gasket touches either of the two panels; and, (ii) the two connecting members are in a first position; and, wherein after the two panels have been positioned such that the first end of the first panel touches the second end of the second panel:

(i) the third and fourth gaskets touch both of the two panels; and, (ii) the two connecting members are in a second position.

7. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
- (i) a first panel of the at least two movable panels that includes:
  - (a) a first panel body portion that includes:
    - (1) a first end of the first panel that includes a first panel member;
    - (2) a second end of the first panel; and,
    - (3) a first panel sound insulation area between the two ends of the first panel; and,
  - (b) a first panel lower drop seal that is positionable with respect to the first panel body portion; and,
- (ii) a second panel of the at least two movable panels that includes:
  - (a) a second panel body portion that includes:
    - (1) a first end of the second panel;
    - (2) a second end of the second panel that includes a second panel member; and,
    - (3) a second panel sound insulation area between the two ends of the second panel; and
  - (b) a second panel lower drop seal that is positionable with respect to the second panel body portion; and, (iii) a first gasket that includes a first portion, wherein the first gasket is connected to one of the two lower drop seals of the two panels;

wherein when (a) the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:

(iv) the first portion of the first gasket is positioned in a lower passage, wherein the lower passage is between the first panel lower drop seal and the second panel lower drop seal;

(v) the first portion of the first gasket impedes the flow of the sound wave via the lower passage; and, (vi) there is a passage between the first panel member of the first panel and second panel member of the second panel; and, further including:

(vii) a first fastener that fastens the first panel member to a section of the first panel body portion; and, (viii) a damping element, wherein the first fastener essentially causes a portion of the damping element, which is sandwiched between a portion of the first panel member and the first panel body portion, to apply a pressure to the portion of the first panel member such that the pressure that is essentially applied by the portion of the damping element to the portion of the first panel member is able to at least alter a vibration, associated with the sound wave, that may occur in the first panel member.

8. The system of claim 7, wherein: when the two panels are hung between the two surfaces and positioned such that the first end of the first panel touches the second end of the second panel:

(i) another portion of the damping element applies another pressure to the portion of the first panel member;

(ii) the portion of the first panel member is sandwiched between the portion of the damping element and the other portion of the damping element; and, (iii) the sandwich-like pressure collectively applied by the portion of the damping element and the other portion of the damping element to the portion of the first panel member is able to damp the vibration, associated with the sound wave, that may occur in the first panel member.

9. The system of claim 8, wherein: the fastener, and/or a second fastener, causes two portions of another damping element to apply another sandwich-like pressure to the section of the first panel body portion, wherein the other sandwich-like pressure applied by the two portions of the other damping element is able to damp a vibration, associated with the sound wave, that may occur in the section of the first panel body portion.

10. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:

(i) a first panel of the at least two movable panels that includes:
(a) a first panel body portion that includes:
(1) a first end of the first panel that includes a first panel member;
(2) a second end of the first panel; and,
(3) a first panel sound insulation area between the two ends of the first panel; and,
(b) a first panel lower drop seal that is positionable with respect to the first panel body portion; and, (ii) a second panel of the at least two movable panels that includes:
(a) a second panel body portion that includes:
(1) a first end of the second panel;
(2) a second end of the second panel that includes a second panel member; and,
(3) a second panel sound insulation area between the two ends of the second panel; and
(b) a second panel lower drop seal that is positionable with respect to the second panel body portion; and, (iii) a first gasket that includes a first portion, wherein the first gasket is connected to one of the two lower drop seals of the two panels;

wherein one of the two panel members of the two panels includes a perforated section that includes one or more perforations; and, wherein when (a) the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:

(iv) the first portion of the first gasket is positioned in a lower passage, wherein the lower passage is between the first panel lower drop seal and the second panel lower drop seal;

(v) the first portion of the first gasket impedes the flow of the sound wave via the lower passage;

(vi) there is a passage between the first panel member of the first panel and second panel member of the second panel; and, (vii) the perforated section enables a portion of the sound wave that may be in the passage to exit the passage via the perforated section, which, in effect, serves to impede the flow of the sound wave via the passage.

11. The system of claim 10, further including: a sound insulation area that is associated with the one of the two panel members (of the two panels) that includes the perforated section, wherein the sound insulation area contains a sound-absorbing material, and wherein: the perforated section is between the sound insulation area and the passage such that the portion of the sound wave that has exited the passage via the perforated section may be at least partially absorbed by the sound-absorbing material in the sound insulation area.

12. The system of claim 11, wherein:
(i) the sound insulation area associated with the one of the two panels includes a first sound insulation area and a second sound insulation area; and,
(ii) a membrane is positioned between the first sound insulation area and the second sound insulation area, wherein the membrane is one of: a mass loaded material, a non-mass loaded material, a polyurethane, and a bituminous reinforced material.

13. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
(i) a first panel of the at least two movable panels that includes:

(a) a first panel body portion that includes:
  (1) a first end of the first panel that includes a first panel member;
  (2) a second end of the first panel; and,
  (3) a first panel sound insulation area between the two ends of the first panel; and,
(b) a first panel lower drop seal that is positionable with respect to the first panel body portion;
(c) a first gasket that includes a first portion and a second portion, wherein the first gasket is connected to the first panel lower drop seal; and,
(ii) a second panel of the at least two movable panels that includes:
(a) a second panel body portion that includes:
  (1) a first end of the second panel;
  (2) a second end of the second panel that includes a second panel member; and,
  (3) a second panel sound insulation area between the two ends of the second panel; and
(b) a second panel lower drop seal that is positionable with respect to the second panel body portion; and,
wherein when the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:
(iii) there is a passage between the first panel member of the first panel and the second panel member of the second panel;
(iv) the first portion of the first gasket is positioned in a lower passage, wherein the lower passage is between the first panel lower drop seal and the second panel lower drop seal; and,
(v) the first portion of the first gasket impedes the flow of the sound wave via the lower passage; and,
wherein:
(a) the first portion of the first gasket is hollow; and,
(b) the second portion of the first gasket is hollow.

14. The system of 13, wherein: (a) when the two panels are hung between the two surfaces and (b) as the two panels are positioned such that the first end of the first panel touches the second of the second panel: the hollow first portion of the first gasket and the hollow second portion of the first gasket enable air from the passage to flow from the passage through the hollow first portion of the first gasket and through the hollow second portion of the first gasket.

15. The system of claim 14, wherein: (a) when the two panels are hung between the two surfaces and (b) as the two panels are being positioned such that the first end of the first panel touches the second end of the second panel: the air from the passage is forced out of the passage through the hollow first portion of the first gasket and the hollow second portion of the first gasket.

16. The system of claim 15, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: at least one of the two portions of the first gasket is of a compressed shape as a result of being compressed between the first panel and the second panel, wherein the compressed shape is different than a first shape the at least one of the two portions of the first gasket had (i) after the two panels have been hung between the two surfaces but (ii) prior to the two panels being positioned such that the first end of the first panel touches the second end of the second panel.

17. The system of claim 16, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: the compressed shape of the at least one of the two portions of the first gasket substantially prevents the forced-out air from reentering the passage via the first gasket, wherein the first shape of the at least one of the two portions of the first gasket would not be able to substantially prevent the forced-out air from reentering the passage via the first gasket.

18. The system of claim 17, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: the compressed shape of the at least one of the two portions of the first gasket includes a first inner surface associated with the at least one of the two portions of the first gasket being adjacent to a second inner surface associated with the at least one of the two portions of the first gasket, wherein the first inner surface and the second inner surface are not adjacent when the at least one of the two portions of the first gasket is of the first shape.

19. The system of claim 18, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: the second portion of the first gasket is positioned between (1) the first panel lower drop seal and (2) the second end of the second panel (of the second panel body portion).

20. The system of claim 19, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: the at least one of the two portions of the first gasket is the second portion of the first gasket.

21. The system of claim 13, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: the second portion of the first gasket is positioned between (1) the first panel lower drop seal and (2) the second end of the second panel (of the second panel body portion).

22. The system of claim 13, wherein when (a) the two panels have been hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion:

(i) at least a part of the first gasket is positioned in the passage; and,
(ii) the first portion of the first gasket is positioned, at least partially, in a part of the lower passage that is below the passage.

23. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
(i) a first panel of the at least two movable panels that includes:
(a) a first panel body portion that includes:
(1) a first end of the first panel that includes a first panel member;
(2) a second end of the first panel; and,
(3) a first panel sound insulation area between the two ends of the first panel; and,
(b) a first panel lower drop seal that is positionable with respect to the first panel body portion;
(c) a first gasket that includes a first portion, wherein the first gasket is connected to the first panel lower drop seal; and,
(ii) a second panel of the at least two movable panels that includes:
(a) a second panel body portion;
(1) a first end of the second panel;
(2) a second end of the second panel that includes a second panel member; and,
(3) a second panel sound insulation area between the two ends of the second panel; and
(b) a second panel lower drop seal that is positionable with respect to the second panel body portion; and,
wherein when the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:
(iii) the first portion of the first gasket is positioned in a lower passage, wherein the lower passage is between the first panel lower drop seal and the second panel lower drop seal; and,
(iv) the first portion of the first gasket impedes the flow of the sound wave via the lower passage; and,
wherein: the first gasket includes a hollow portion.

24. The system of claim 23, wherein (a) when the two panels are hung between the two surfaces and (b) before the two panels are positioned such that the first end of the first panel touches the second end of the second panel: air is able is able to pass through the hollow portion.

25. The system of claim 24, wherein: when the two panels are hung between the two surfaces and positioned such that the first end of the first panel touches the second end of the second panel: the hollow portion of the first gasket becomes compressed and, as a result of the two panels being positioned such that the first end of the first panel touches the second end of the second panel, mitigates an ability of the passed-through air to pass back through the hollow portion of the first gasket, as compared to a relatively greater ability the passed-through air would otherwise have with respect to passing back through the hollow portion of the first gasket if not for the hollow portion of the first gasket having become compressed.

26. The system of claim 25, wherein when (a) the two panels have been hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: a second portion of the first gasket is positioned between (1) the first panel lower drop seal and (2) the second panel member (of the second panel body portion of the second panel).

27. A movable acoustic partition system that is able to impede a flow of a sound wave from a first side of at least two panels of the movable acoustic partition system towards a second side of the two panels, wherein each of the two panels is hangable between a first surface and a second surface as well as movable between the first surface and the second surface via a connector, including:
(i) a first panel of the at least two movable panels that includes:
(a) a first panel body portion that includes:
(1) a first end of the first panel that includes a first panel member;
(2) a second end of the first panel; and,
(3) a first panel sound insulation area between the two ends of the first panel; and,
(b) a first panel lower drop seal that is positionable with respect to the first panel body portion;
(c) a first gasket that includes a first portion, wherein the first gasket is connected to the first panel lower drop seal; and,
(ii) a second panel of the at least two movable panels that includes:
(a) a second panel body portion;
(1) a first end of the second panel;
(2) a second end of the second panel that includes a second panel member; and,
(3) a second panel sound insulation area between the two ends of the second panel; and
(b) a second panel lower drop seal that is positionable with respect to the second panel body portion; and,
wherein when the two panels are hung between the two surfaces and positioned such that the first end of the first panel touches the second end of the second panel, (b) the first panel lower drop seal is in an extended position relative to the first panel body portion, and (c) the second panel lower drop seal is in an extended position relative to the second panel body portion:
(iii) there is a passage between the first panel member of the first panel and the second panel member of the second panel;
(iv) the first portion of the first gasket is positioned in a lower passage, wherein the lower passage is between the first panel lower drop seal and the second panel lower drop seal; and,
(v) the first portion of the first gasket impedes the flow of the sound wave via the lower passage; and,
wherein: the first gasket includes a portion that enables air to pass at least partially through the portion of the first gasket.

28. The system of claim 27, wherein: (a) when the two panels are hung between the two surfaces and (b) as the two panels are positioned such that the first end of the first panel touches the second end of the second panel: the portion of the first gasket enables air from the passage to flow at least partially through the portion of the first gasket.

29. The system of claim 27, wherein: when the two panels are hung between the two surfaces and (b) as the two panels are positioned such that the first end of the first panel touches the second end of the second panel: air in the passage is forced to exit the passage through the portion of the first gasket.

30. The system of claim 29, wherein: (a) when the two panels are hung between the two surfaces and (b) as the two panels are positioned such that the first end of the first panel touches the second end of the second panel: air in the lower passage is forced to exit the lower passage through the portion of the first gasket.

31. The system of claim 30, wherein when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: another portion of the first gasket at least substantially prevents air from entering at least a portion of the lower passage via flowing through the portion of the first gasket.

32. The system of claim 29, wherein: when (a) the two panels are hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: another portion of the first gasket at least substantially prevents air from entering the passage via flowing through the portion of the first gasket.

33. The system of claim 27, wherein when (a) the two panels have been hung between the two surfaces and positioned such that the first end of the first panel touches the second end of the second panel, (b) the first panel lower drop seal is in the extended position relative to the first panel body portion, and (c) the second panel lower drop seal is in the extended position relative to the second panel body portion: a second portion of the first gasket is positioned between (1) the first panel lower drop seal and (2) the second panel member (of the second panel body portion of the second panel).

* * * * *